US00RE49148E

(19) United States
(12) Reissued Patent
Colgrove et al.

(10) Patent Number: US RE49,148 E
(45) Date of Reissued Patent: *Jul. 26, 2022

(54) RECLAIMING SPACE OCCUPIED BY DUPLICATED DATA IN A STORAGE SYSTEM

(71) Applicant: Pure Storage, Inc., Mountain View, CA (US)

(72) Inventors: John Colgrove, Los Altos, CA (US); John Hayes, Mountain View, CA (US); Ethan Miller, Santa Cruz, CA (US); Cary Sandvig, Palo Alto, CA (US); Joseph S. Hasbani, Palo Alto, CA (US); Feng Wang, Sunnyvale, CA (US)

(73) Assignee: Pure Storage, Inc., Mountain View, CA (US)

( * ) Notice: This patent is subject to a terminal disclaimer.

(21) Appl. No.: 15/885,500

(22) Filed: Jan. 31, 2018

Related U.S. Patent Documents

Reissue of:
(64) Patent No.: 9,251,066
Issued: Feb. 2, 2016
Appl. No.: 14/537,709
Filed: Nov. 10, 2014

U.S. Applications:
(63) Continuation of application No. 14/015,308, filed on Aug. 30, 2013, now Pat. No. 8,886,691, which is a (Continued)

(51) Int. Cl.
*G06F 12/02* (2006.01)
*G06F 3/06* (2006.01)
*G06F 16/174* (2019.01)

(52) U.S. Cl.
CPC ..... *G06F 3/0688* (2013.01); *G06F 3/0608* (2013.01); *G06F 3/0641* (2013.01); *G06F 16/1748* (2019.01)

(58) Field of Classification Search
CPC ..... G06F 12/0253; G06F 12/0261; G06F 12/0269; G06F 12/0276
See application file for complete search history.

(56) References Cited

U.S. PATENT DOCUMENTS 4,989,134 A 1/1991 Shaw
5,136,706 A 8/1992 Courts
(Continued)

FOREIGN PATENT DOCUMENTS

WO WO 2013049319 A1 * 4/2013 ..... G06F 3/06
WO WO 2013056220 A1 * 4/2013 ..... G06F 3/06

OTHER PUBLICATIONS

Debnath, B., S. Sengupta and J. Li "ChunkStash: Speeding Up Inline Storage Deduplication Using Flash Memory", Proceedings of the 2010 USENIX Annual Technical Conference (ATC '10), Jun. 23-25, 2010, pp. 1-15.*

(Continued)

*Primary Examiner* — Luke S Wassum

(57) ABSTRACT

A system and method for performing garbage collection. A system includes a storage medium, a first table including entries which map a virtual address to locations in the storage medium, and a second table with entries which include a reverse mapping of a physical address in a data storage medium to one or more virtual addresses. A storage controller is configured to perform garbage collection. During garbage collection, the controller is configured to identify one or more entries in the second table which correspond to a segment to be garbage collected. In response to determining the first table includes a valid mapping for a virtual address included in an entry of the one of the one or more entries, the controller is configured to copy data from a first location identified in the entry to a second location in the data storage medium, and reclaim the first storage location.

17 Claims, 31 Drawing Sheets

Related U.S. Application Data continuation of application No. 13/340,119, filed on Dec. 29, 2011, now Pat. No. 8,527,544, which is a continuation-in-part of application No. 13/250,570, filed on Sep. 30, 2011, now Pat. No. 8,930,307, and a continuation-in-part of application No. 13/208,094, filed on Aug. 11, 2011, now Pat. No. 8,788,788, and a continuation-in-part of application No. 13/211,288, filed on Aug. 16, 2011, now Pat. No. 8,806,160, and a continuation-in-part of application No. 13/250,579, filed on Sep. 30, 2011, now Pat. No. 8,793,467, and a continuation-in-part of application No. 13/273,858, filed on Oct. 14, 2011, now Pat. No. 8,589,640.

(56) References Cited

U.S. PATENT DOCUMENTS

| | | | | |
|---|---|---|---|---|
| 5,355,483 | A | 10/1994 | Serlet | |
| 5,551,003 | A | 8/1996 | Mattson et al. | |
| 5,561,786 | A | 10/1996 | Morse | |
| 5,652,883 | A | 7/1997 | Adcock | |
| 5,751,613 | A | 5/1998 | Doty et al. | |
| 5,897,664 | A * | 4/1999 | Nesheim | G06F 12/0284 711/147 |
| 6,081,665 | A | 6/2000 | Nilsen et al. | |
| 6,300,962 | B1 | 10/2001 | Wishoff et al. | |
| 6,470,361 | B1 | 10/2002 | Alpern et al. | |
| 6,526,422 | B1 | 2/2003 | Flood et al. | |
| 6,560,619 | B1 | 5/2003 | Flood et al. | |
| 6,567,905 | B2 * | 5/2003 | Otis | G06F 12/0276 707/999.202 |
| 6,738,875 | B1 * | 5/2004 | Wang | G06F 12/0269 707/999.202 |
| 6,760,815 | B1 | 7/2004 | Traversat et al. | |
| 6,763,440 | B1 | 7/2004 | Traversat et al. | G06F 12/0276 707/999.202 |
| 6,804,762 | B1 | 10/2004 | Dussud et al. | |
| 6,823,351 | B1 | 11/2004 | Flood et al. | |
| 6,826,583 | B1 | 11/2004 | Flood et al. | |
| 6,839,725 | B2 | 1/2005 | Agesen et al. | |
| 6,865,585 | B1 | 3/2005 | Dussud | G06F 12/0269 711/E12.011 |
| 6,868,488 | B2 | 3/2005 | Garthwaite | |
| 6,901,587 | B2 | 5/2005 | Kramskoy et al. | |
| 6,931,423 | B2 | 8/2005 | Sexton et al. | |
| 6,996,590 | B2 | 2/2006 | Borman | |
| 7,010,555 | B2 | 3/2006 | Blandy et al. | |
| 7,016,923 | B2 | 3/2006 | Garthwaite | |
| 7,017,162 | B2 | 3/2006 | Smith et al. | |
| 7,024,436 | B2 | 4/2006 | Kolodner et al. | |
| 7,031,990 | B2 | 4/2006 | Garthwaite | |
| 7,051,056 | B2 | 5/2006 | Rodriguez-Rivera | |
| 7,065,617 | B2 | 6/2006 | Wang | |
| 7,069,280 | B2 | 6/2006 | Garthwaite | |
| 7,337,201 | B1 * | 2/2008 | Yellin | G06F 12/0276 711/118 |
| 7,412,466 | B1 | 8/2008 | Garthwaite | |
| 7,480,782 | B2 | 1/2009 | Garthwaite | |
| 7,779,054 | B1 | 8/2010 | Printezis et al. | |
| 8,417,904 | B2 * | 4/2013 | Goss | G06F 12/0253 711/159 |
| 8,527,544 | B1 | 9/2013 | Colgrove et al. | G06F 3/0608 707/791 |
| 8,589,640 | B2 * | 11/2013 | Colgrove | G06F 3/0608 711/156 |
| 8,788,788 | B2 * | 7/2014 | Colgrove | G06F 3/0608 711/206 |
| 8,793,467 | B2 * | 7/2014 | Colgrove | G06F 3/0608 711/206 |
| 8,806,160 | B2 * | 8/2014 | Colgrove | G06F 3/0608 711/162 |
| 8,886,691 | B2 | 11/2014 | Colgrove et al. | G06F 3/0608 707/818 |
| 8,930,307 | B2 * | 1/2015 | Colgrove | G06F 3/0608 707/610 |
| 2004/0039759 | A1 | 2/2004 | Detlefs et al. | |
| 2004/0078381 | A1 | 4/2004 | Blandy et al. | |
| 2004/0111445 | A1 | 6/2004 | Garthwaite et al. | |
| 2004/0111718 | A1 | 6/2004 | Detlefs | |
| 2004/0128329 | A1 | 7/2004 | Ben-Yitzhak et al. | |
| 2004/0162860 | A1 | 8/2004 | Detlefs | |
| 2004/0162861 | A1 | 8/2004 | Detlefs | |
| 2005/0132374 | A1 | 6/2005 | Flood et al. | |
| 2005/0149686 | A1 | 7/2005 | Bacon et al. | |
| 2005/0166028 | A1 | 7/2005 | Chung et al. | |
| 2005/0198079 | A1 | 9/2005 | Heeb | |
| 2005/0235120 | A1 | 10/2005 | Dussud | |
| 2005/0240943 | A1 | 10/2005 | Smith et al. | |
| 2005/0273567 | A1 | 12/2005 | Blandy | |
| 2005/0278497 | A1 | 12/2005 | Pliss et al. | |
| 2006/0059453 | A1 | 3/2006 | Kuck et al. | |
| 2006/0092161 | A1 | 5/2006 | Meeker | |
| 2006/0173939 | A1 * | 8/2006 | Yin | G06F 12/0253 711/E12.009 |
| 2006/0206658 | A1 * | 9/2006 | Hendel | G06F 9/544 711/6 |
| 2007/0016633 | A1 * | 1/2007 | Lindholm | G06F 12/0269 711/170 |
| 2007/0208790 | A1 * | 9/2007 | Reuter | G06F 12/0253 707/999.206 |
| 2008/0155184 | A1 * | 6/2008 | Gorobets | G06F 3/0613 711/103 |
| 2010/0031000 | A1 * | 2/2010 | Flynn et al. | G06F 16/9014 711/216 |
| 2011/0231623 | A1 * | 9/2011 | Goss | G06F 12/0253 711/159 |
| 2011/0276780 | A1 * | 11/2011 | Sengupta | G06F 12/0862 711/216 |

OTHER PUBLICATIONS

Agesen et al., "Mixed-mode By1ecode Execution", Jun. 2000, 16 pages, Sun Microsystems, Inc., Mountain View, CA, USA.

Larose et al., "A Compacting Incremental Collector and its Performance in a Production Quality Compiler", Proceedings of the 1st International Symposium on Memory Management, Oct. 1, 1998, 9 pages, vol. 34, Issue 3, ACM, New York, NY, USA.

"Garbage Collection", Cunningham & Cunningham, Inc., Sep. 27, 2004, retrieved from <http://c2.com/cgi/wiki?GarbageCollection>, pp. 1-7.

Edwards, Daniel J., "Artificial Intelligence Project—RLE and MIT Computation Center", Memo 19-LISP II Garbage Collector, Mar. 1998, pp. 1-2.

Abuaiadh et al., "An Efficient Parallel Heap Compaction Algorithm", Proceedings of the 19th Annual ACM SIGPLAN Conference on Object-oriented Programming, Systems, Languages, and Applications, Oct. 2004, p. 224-236, ACM New York, NY, USA.

Agesen et al., "An Efficient Meta-Lock for Implementing Ubiquitous Synchronization", Apr. 1999, 30 pages, Sun Microsystems, Inc., Mountain View, CA, USA.

Agesen, Ole, "GC Points in a Threaded Environment", Dec. 1998, 23 pages, Sun Microsystems, Inc., Mountain View, CA, USA.

Ben-Yitzhak, et al., "An Algorithm for Parallel Incremental Compaction", Proceedings of the 3rd International Symposium on Memory Management, Jun. 20-21, 2002, p. 100-105, ACM, New York, NY, USA.

Appel, Andrew W., "Simple Generational Garbage Collection and Fast Allocation", Software—Practice & Experience, Sep. 1988, 16 pages, John Wiley & Sons, Inc., New York, NY, USA.

Detlefs, et al. "Inlining of Virtual Methods", Proceedings of the 13th European Conference on Object-Oriented Programming, Jun. 14-18, 1999, 21 pages, Springer-Verlag, London, UK.

Flood, et al., "Parallel Garbage Collection for Shared Memory Multiprocessors", Proceedings of the 2001 Symposium on Java™ Virtual Machine Research and Technology Symposium, Apr. 2001, 10 pages, USENIX Association, Berkeley, CA, USA.

(56) References Cited

OTHER PUBLICATIONS

Wilson, Paul R.,"Uniprocessor Garbage Collection Techniques", Technical Report, University of Texas, Jan. 1994, 14 pages.
Hallenberg, et al., "Combining Region Inference and Garbage Collection", Proceedings of the ACM SIGPLAN 2002 Conference on Programming Language Design and Implementation, Jun. 17-19, 2002, pp. 141-152, ACM, New York, NY, USA.
Hudson, et al.,"Incremental Collection of Mature Objects", Proceedings of the International Workshop on Memory Management, Sep. 17, 1992, 16 pages, Springer-Verlag, London, UK.
Printezis, et al., "A Generational Mostly-Concurrent Garbage Collector", Technical Report, 2000, 12 pages, Sun Microsystems, Inc., Mountain View, CA, USA.
Lieberman, et al.,"A Real-Time Garbage Collector Based on the Lifetimes of Objects", Communications of the ACM, Jun. 1983, vol. 26, No. 6, pp. 419-429, ACM, New York, NY, USA.
Detlefs, et al., "Garbage-First Garbage Collection", Proceedings of the 4th International Symposium on Memory Management, Oct. 24-25, 2004, pp. 37-48, ACM, New York, NY, USA.
Bacon, et al., "The Metronome: A Simpler Approach to Garbage Collection in Real-Time Systems", on the Move to Meaningful Internet Systems 2003: OTM 2003 Workshops, Nov. 3-7, 2003, pp. 466-478, vol. 2889, Springer Berlin Heidelberg.
Sachindran, et al., "Mark-Copy: Fast Copying GC with Less Space Overhead", Proceedings of the 18th Annual ACM SIGPLAN Conference on Object-oriented Programing, Systems, Languages, and Applications, Oct. 26-30, 2003, 18 pages, ACM, New York, NY, USA.

* cited by examiner

RECLAIMING SPACE OCCUPIED BY DUPLICATED DATA IN A STORAGE SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. patent application Ser. No. 14/015,308, entitled "GARBAGE COLLECTION IN A STORAGE SYSTEM", filed Aug. 30, 2013, now U.S. Pat. No. 8,886,691, a continuation of U.S. patent application Ser. No. 13/340,119, entitled "GARBAGE COLLECTION IN A STORAGE SYSTEM", filed Dec. 29, 2011, now U.S. Pat. No. 8,527,544, a continuation-in-part of U.S. patent application Ser. No. 13/250,570, entitled "METHOD FOR REMOVING DUPLICATE DATA FROM A STORAGE ARRAY", filed Sep. 30, 2011, and a continuation-in-part of U.S. patent application Ser. No. 13/208,094, entitled "LOGICAL SECTOR MAPPING IN A FLASH STORAGE ARRAY", filed Aug. 11, 2011, now U.S. Pat. No. 8,788,788, and a continuation-in-part of U.S. patent application Ser. No. 13/211,288, entitled "MAPPING IN A STORAGE SYSTEM", filed Aug. 16, 2011, now U.S. Pat. No. 8,806,160, and a continuation-in-part of U.S. patent application Ser. No. 13/250,579, entitled "VARIABLE LENGTH ENCODING IN A STORAGE SYSTEM", filed Sep. 30, 2011, now U.S. Pat. No. 8,793,467, and a continuation-in-part of U.S. patent application Ser. No. 13/273,858, entitled "METHOD FOR MAINTAINING MULTIPLE FINGERPRINT TABLES IN A DEDUPLICATING STORAGE SYSTEM", filed Oct. 14, 2011, now U.S. Pat. No. 8,589,640, each of the foregoing applications being incorporated herein by reference in their entirety.

BACKGROUND

1. Field of the Invention

This invention relates to computer networks and, more particularly, to maintaining a mapping structure in a storage system.

2. Description of the Related Art

As computer memory storage and data bandwidth increase, so does the amount and complexity of data that businesses daily manage. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

The distributed storage system comprises physical volumes, which may be hard disks, solid-state devices, storage devices using another storage technology, or partitions of a storage device. Software applications, such as a logical volume manager or a disk array manager, provide a means of allocating space on mass-storage arrays. In addition, this software allows a system administrator to create units of storage groups including logical volumes. Storage virtualization provides an abstraction (separation) of logical storage from physical storage in order to access logical storage without end-users identifying physical storage.

To support storage virtualization, a volume manager performs input/output (I/O) redirection by translating incoming I/O requests using logical addresses from end-users into new requests using addresses associated with physical locations in the storage devices. As some storage devices may include additional address translation mechanisms, such as address translation layers which may be used in solid state storage devices, the translation from a logical address to another address mentioned above may not represent the only or final address translation. Redirection utilizes metadata stored in one or more mapping tables. In addition, information stored in one or more mapping tables may be used for storage deduplication and mapping virtual sectors at a specific snapshot level to physical locations. The volume manager may maintain a consistent view of mapping information for the virtualized storage. However, a supported address space may be limited by a storage capacity used to maintain a mapping table.

The technology and mechanisms associated with chosen storage disks determines the methods used by a volume manager. For example, a volume manager that provides mappings for a granularity level of a hard disk, a hard disk partition, or a logical unit number (LUN) of an external storage device is limited to redirecting, locating, removing duplicate data, and so forth, for large chunks of data. One example of another type of storage disk is a Solid-State Disk (SSD). An SSD may emulate a HDD interface, but an SSD utilizes solid-state memory to store persistent data rather than electromechanical devices as found in a HDD. For example, an SSD may comprise banks of Flash memory. Accordingly, a large supported address space by one or more mapping tables may not be achieved in systems comprising SSDs for storage while utilizing mapping table allocation algorithms developed for HDDs.

One important process related to data storage is that of garbage collection. Garbage collection is a process in which storage locations are freed and made available for reuse by the system. In the absence of garbage collection, all storage locations will eventually appear to be in use and it will no longer be possible to allocate storage. Often times, there is significant overhead associated with performing garbage collection and overall system performance can be adversely impacted. Consequently, how and when garbage collection is performed is important.

In view of the above, systems and methods for efficiently performing garbage collection in storage devices are desired.

SUMMARY OF EMBODIMENTS

Various embodiments of a computer system and methods for performing garbage collection in a data storage system are contemplated.

A system is contemplated which includes a storage medium, a first table including entries which map virtual addresses to locations in the storage medium, and a second table with entries which include reverse mappings of a physical address in a data storage medium to one or more virtual addresses. A data storage controller in the system is configured to perform garbage collection. During garbage collection, the controller is configured to identify one or more entries in the second table which correspond to a segment to be garbage collected. In response to determining the first table includes a valid mapping for a virtual address included in an entry of the one of the one or more entries, the controller is configured to copy data from a first location identified in the entry to a second location in the data storage medium, and reclaim the first storage location.

In various embodiments, the storage controller creates a sorted list of entries from the second table which is then used to build a list of data locations in the segment which are currently in use. Having identified locations which remain in use, the controller copies data in these locations to a new segment. Reclamation of the storage location may be performed at a later time.

Also contemplated are embodiments in which the controller deduplicates data corresponding to locations that are to be copied to a new segment. If the data can be deduplicated, a new entry is added to the second table which maps a virtual address to the new location. If the deduplicated data has not yet been written, it is first written to a new location.

In some embodiments, data in the first table is organized as a plurality of time ordered levels. In such embodiments, when the controller copies data from the first location to a second location, it adds a new entry corresponding to the second location to the first table in a newer time-ordered level than that containing the entry corresponding to the first location. In various embodiments, the controller is also configured to detect and correct errors in garbage collected data that is being relocated.

These and other embodiments will become apparent upon consideration of the following description and accompanying drawings.

Figure 1:
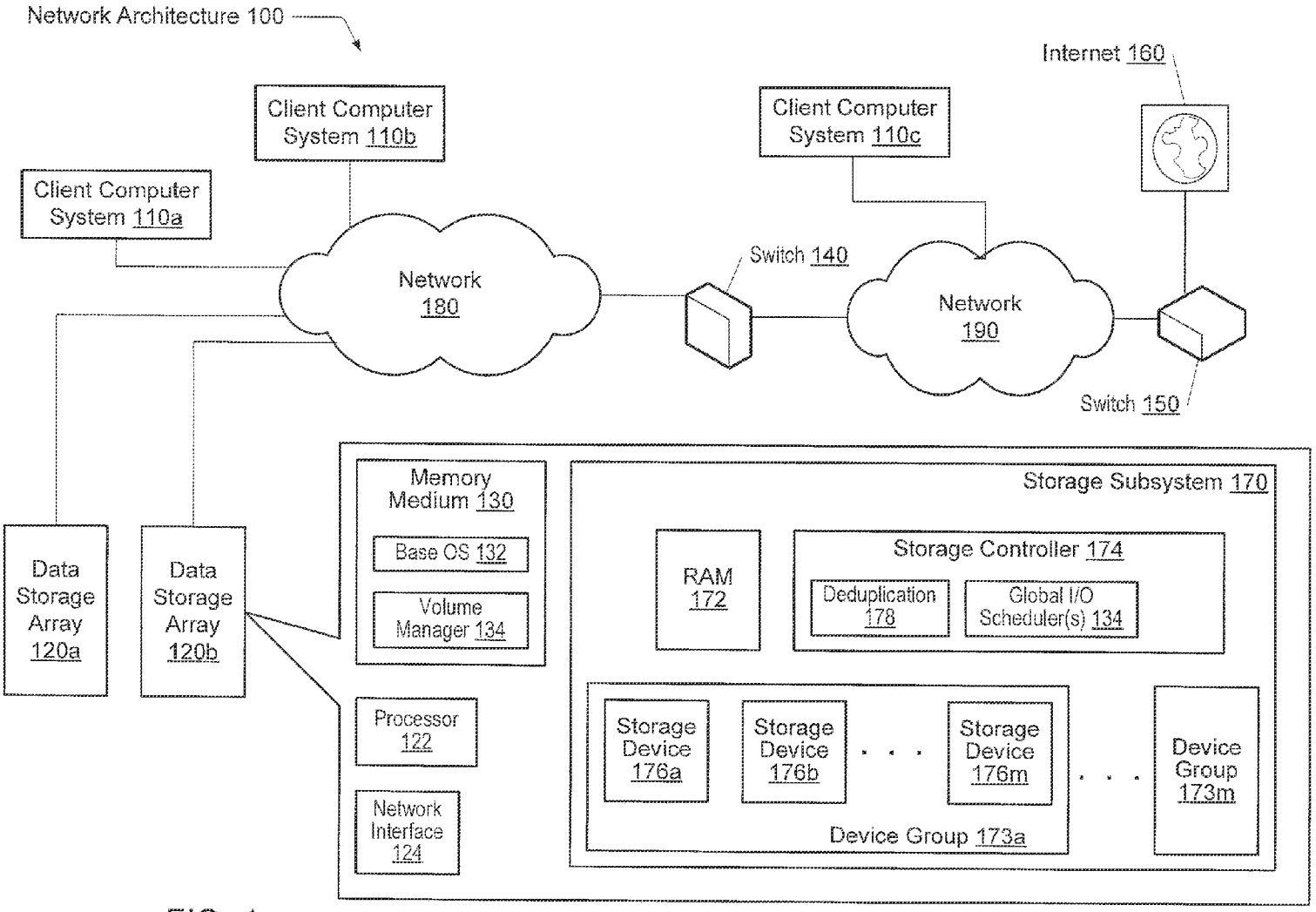
FIG. 1 is a generalized block diagram illustrating one embodiment of network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of a network architecture 100 is shown. As described further below, one embodiment of network architecture 100 includes client computer systems 110a-110b interconnected to one another through a network 180 and to data storage arrays 120a-120b. Network 180 may be coupled to a second network 190 through a switch 140. Client computer system 110c is coupled to client computer systems 110a-110b and data storage arrays 120a-120b via network 190. In addition, network 190 may be coupled to the Internet 160 or otherwise outside network through switch 150.

It is noted that in alternative embodiments, the number and type of client computers and servers, switches, networks, data storage arrays, and data storage devices is not limited to those shown in FIG. 1. At various times one or more clients may operate offline. In addition, during operation, individual client computer connection types may change as users connect, disconnect, and reconnect to network architecture 100. Further, while the present description generally discusses network attached storage, the systems and methods described herein may also be applied to directly attached storage systems and may include a host operating system configured to perform one or more aspects of the described methods. Numerous such alternatives are possible and are contemplated. A further description of each of the components shown in FIG. 1 is provided shortly. First, an overview of some of the features provided by the data storage arrays 120a-120b is described.

In the network architecture 100, each of the data storage arrays 120a-120b may be used for the sharing of data among different servers and computers, such as client computer systems 110a-110c. In addition, the data storage arrays 120a-120b may be used for disk mirroring, backup and restore, archival and retrieval of archived data, and data migration from one storage device to another. In an alternate embodiment, one or more client computer systems 110a-110c may be linked to one another through fast local area networks (LANs) in order to form a cluster. Such clients may share a storage resource, such as a cluster shared volume residing within one of data storage arrays 120a-120b.

Each of the data storage arrays 120a-120b includes a storage subsystem 170 for data storage. Storage subsystem 170 may comprise a plurality of storage devices 176a-176m. These storage devices 176a-176m may provide data storage services to client computer systems 110a-110c. Each of the storage devices 176a-176m uses a particular technology and mechanism for performing data storage. The type of technology and mechanism used within each of the storage devices 176a-176m may at least in part be used to determine the algorithms used for controlling and scheduling read and write operations to and from each of the storage devices 176a-176m. For example, the algorithms may locate particular physical locations corresponding to the operations. In addition, the algorithms may perform input/output (I/O) redirection for the operations, removal of duplicate data in the storage subsystem 170, and support one or more mapping tables used for address redirection and deduplication.

The logic used in the above algorithms may be included in one or more of a base operating system (OS) 132, a volume manager 134, within a storage subsystem controller 174, control logic within each of the storage devices 176a-176m, or otherwise. Additionally, the logic, algorithms, and control mechanisms described herein may comprise hardware and/or software.

Each of the storage devices 176a-176m may be configured to receive read and write requests and comprise a plurality of data storage locations, each data storage location being addressable as rows and columns in an array. In one embodiment, the data storage locations within the storage devices 176a-176m may be arranged into logical, redundant storage containers or RAID arrays (redundant arrays of inexpensive/independent disks).

In some embodiments, each of the storage devices 176a-176m may utilize technology for data storage that is different from a conventional hard disk drive (HDD). For example, one or more of the storage devices 176a-176m may include or be further coupled to storage consisting of solid-state memory to store persistent data. In other embodiments, one or more of the storage devices 176a-176m may include or be further coupled to storage using other technologies such as spin torque transfer technique, magnetoresistive random access memory (MRAM) technique, shingled disks, memristors, phase change memory, or other storage technologies. These different storage techniques and technologies may lead to differing I/O characteristics between storage devices.

In one embodiment, the included solid-state memory comprises solid-state drive (SSD) technology. The differences in technology and mechanisms between HDD technology and SDD technology may lead to differences in input/output (I/O) characteristics of the data storage devices 176a-176m. A Solid-State Disk (SSD) may also be referred to as a Solid-State Drive. Without moving parts or mechanical delays, an SSD may have a lower read access time and latency than a HDD. However, the write performance of SSDs is generally slower than the read performance and may be significantly impacted by the availability of free, programmable blocks within the SSD.

Storage array efficiency may be improved by creating a storage virtualization layer between user storage and physical locations within storage devices 176a-176m. In one embodiment, a virtual layer of a volume manager is placed in a device-driver stack of an operating system (OS), rather than within storage devices or in a network. Many storage arrays perform storage virtualization at a coarse-grained level to allow storing of virtual-to-physical mapping tables entirely in memory. However, such storage arrays are unable to integrate features such as data compression, deduplication and copy-on-modify operations. Many file systems support fine-grained virtual-to-physical mapping tables, but they do not support large storage arrays, such as device groups 173a-173m. Rather, a volume manager or a disk array manager is used to support device groups 173a-173m.

In one embodiment, one or more mapping tables may be stored in the storage devices 176a-176m, rather than memory, such as RAM 172, memory medium 130 or a cache within processor 122. The storage devices 176a-176 may be SSDs utilizing Flash memory. The low read access and latency times for SSDs may allow a small number of dependent read operations to occur while servicing a storage access request from a client computer. The dependent read operations may be used to access one or more indexes, one or more mapping tables, and user data during the servicing of the storage access request.

In one example, I/O redirection may be performed by the dependent read operations. In another example, inline deduplication may be performed by the dependent read operations. In yet another example, bulk array tasks, such as a large copy, move, or zeroing operation, may be performed entirely within a mapping table rather than accessing storage locations holding user data. Such a direct map manipulation may greatly reduce I/O traffic and data movement within the storage devices 176a-176m. The combined time for both servicing the storage access request and performing the dependent read operations from SSDs may be less than servicing a storage access request from a spinning HDD.

In addition, the information within a mapping table may be compressed. A particular compression algorithm may be chosen to allow identification of individual components, such as a key within a record among multiple records. Therefore, a search for a given key among multiple compressed records may occur. In various embodiments the search for a given key may be performed without decompressing each tuple by comparing the compressed representation of the key against the compressed information stored in the relevant fields of the tuple. If a match is found, only the matching record may be decompressed. Compressing the tuples within records of a mapping table may further enable fine-grained level mapping. This fine-grained level mapping may allow direct map manipulation as an alternative to common bulk array tasks. Further details concerning efficient storage virtualization will be discussed below.

Again, as shown, network architecture 100 includes client computer systems 110a-110c interconnected through networks 180 and 190 to one another and to data storage arrays 120a-120b. Networks 180 and 190 may include a variety of techniques including wireless connection, direct local area network (LAN) connections, wide area network (WAN) connections such as the Internet, a router, storage area network, Ethernet, and others. Networks 180 and 190 may comprise one or more LANs that may also be wireless. Networks 180 and 190 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 180 and 190. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110a-110c are representative of any number of stationary or mobile computers such as desktop personal computers (PCs), servers, server farms, work-stations, laptops, handheld computers, servers, personal digital assistants (PDAs), smart phones, and so forth. Generally speaking, client computer systems 110a-110c include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Each processor core and memory hierarchy within a client computer system may be connected to a network interface. In addition to hardware components, each of the client computer systems 110a-110c may include a base operating system (OS) stored within the memory hierarchy. The base OS may be representative of any of a variety of operating systems, such as, for example, MS-DOS®, MS-WINDOWS®, OS/2®, UNIX®, Linux®, Solaris®, AIX®, DART, or otherwise. As such, the base OS may be operable to provide various services to the end-user and provide a software framework operable to support the execution of various programs. Additionally, each of the client computer systems 110a-110c may include a hypervisor used to support virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources and access to logical storage entities (e.g., LUNs) built upon the storage devices 176a-176m within each of the data storage arrays 120a-120b.

Each of the data storage arrays 120a-120b may be used for the sharing of data among different servers, such as the client computer systems 110a-110c. Each of the data storage arrays 120a-120b includes a storage subsystem 170 for data storage. Storage subsystem 170 may comprise a plurality of storage devices 176a-176m. Each of these storage devices 176a-176m may be an SSD. A controller 174 may comprise logic for handling received read/write requests. A random-access memory (RAM) 172 may be used to batch operations, such as received write requests. In various embodiments, when batching write operations (or other operations) non-volatile storage (e.g., NVRAM) may be used.

The base OS 132, the volume manager 134 (or disk array manager 134), any OS drivers (not shown) and other software stored in memory medium 130 may provide functionality providing access to files and the management of these functionalities. The base OS 132 may be a storage operating system such as NetApp Data ONTAP® or otherwise. The base OS 132 and the OS drivers may comprise program instructions stored on the memory medium 130 and executable by processor 122 to perform one or more memory access operations in storage subsystem 170 that correspond to received requests. The system shown in FIG. 1 may generally include one or more file servers and/or block servers.

Each of the data storage arrays 120a-120b may use a network interface 124 to connect to network 180. Similar to client computer systems 110a-110c, in one embodiment, the functionality of network interface 124 may be included on a network adapter card. The functionality of network interface 124 may be implemented using both hardware and software. Both a random-access memory (RAM) and a read-only memory (ROM) may be included on a network card implementation of network interface 124. One or more application specific integrated circuits (ASICs) may be used to provide the functionality of network interface 124.

In addition to the above, each of the storage controllers 174 within the data storage arrays 120a-120b may support storage array functions such as snapshots, replication and high availability. In addition, each of the storage controllers 174 may support a virtual machine environment that comprises a plurality of volumes with each volume including a plurality of snapshots. In one example, a storage controller 174 may support hundreds of thousands of volumes, wherein each volume includes thousands of snapshots. In one embodiment, a volume may be mapped in fixed-size sectors, such as a 4-kilobyte (KB) page within storage devices 176a-176m. In another embodiment, a volume may be mapped in variable-size sectors such as for write requests. A volume ID, a snapshot ID, and a sector number may be used to identify a given volume.

An address translation table may comprise a plurality of entries, wherein each entry holds a virtual-to-physical mapping for a corresponding data component. This mapping table may be used to map logical read/write requests from each of the client computer systems 110a-110c to physical locations in storage devices 176a-176m. A "physical" pointer value may be read from the mapping table during a lookup operation corresponding to a received read/write request. This physical pointer value may then be used to locate a physical location within the storage devices 176a-176m. It is noted the physical pointer value may be used to access another mapping table within a given storage device of the storage devices 176a-176m. Consequently, one or more levels of indirection may exist between the physical pointer value and a target storage location.

In another embodiment, the mapping table may comprise information used to deduplicate data (deduplication table related information). The information stored in the deduplication table may include mappings between one or more calculated hash values for a given data component and a physical pointer to a physical location in one of the storage devices 176a-176m holding the given data component. In addition, a length of the given data component and status information for a corresponding entry may be stored in the deduplication table.

Figure 2:
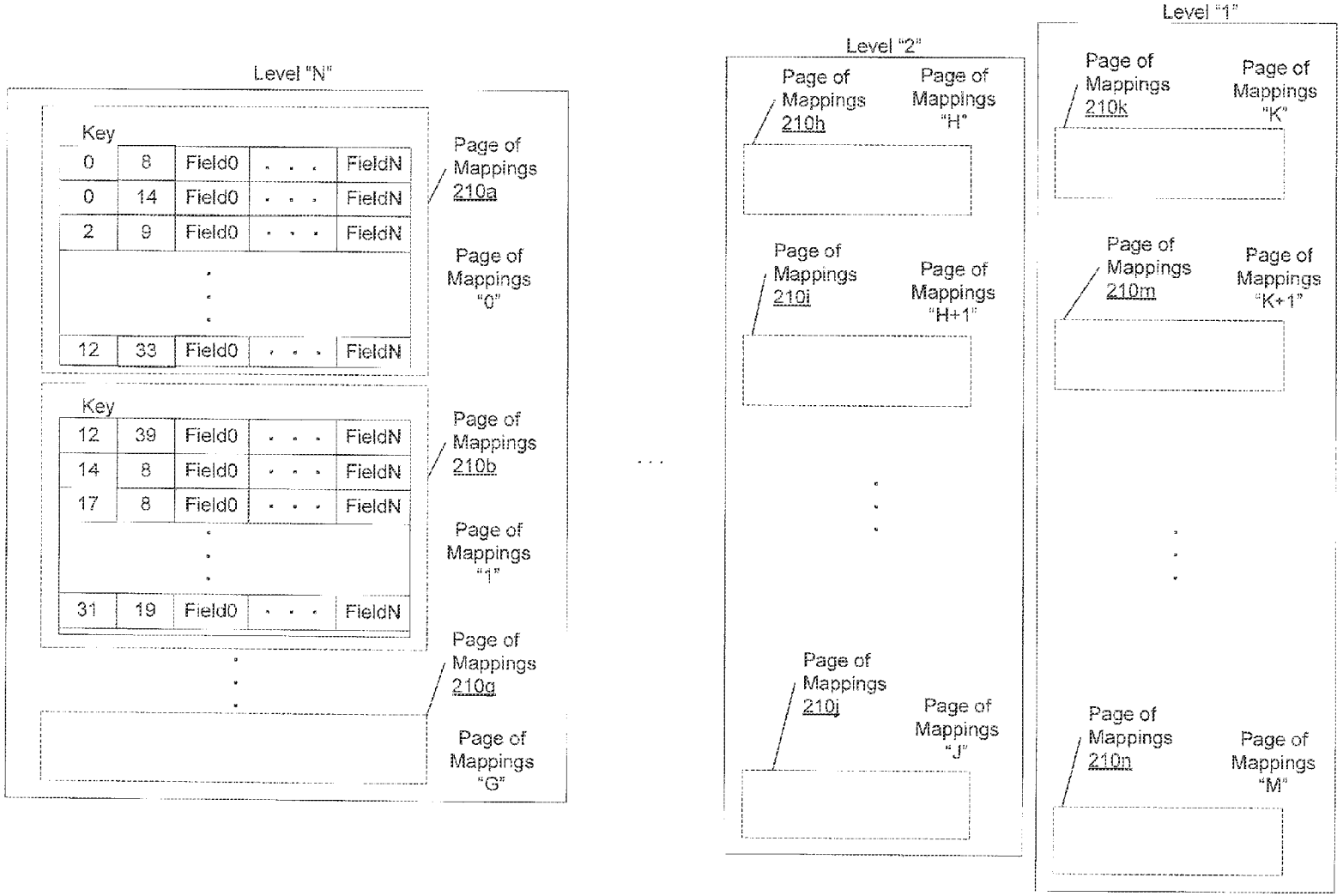
FIG. 2 is a generalized block diagram of one embodiment of a mapping table.

Turning now to FIG. 2, a generalized block diagram of one embodiment of a mapping table is shown. As discussed earlier, one or more mapping tables may be used for I/O redirection or translation, deduplication of duplicate copies of user data, volume snapshot mappings, and so forth. Mapping tables may be stored in the storage devices 176a-176m. The diagram shown in FIG. 2 represents a logical representation of one embodiment of the organization and storage of the mapping table. Each level shown may include mapping table entries corresponding to a different period of time. For example, level "1" may include information older than information stored in level "2". Similarly, level "2" may include information older than information stored in level "3". The information stored in the records, pages and levels shown in FIG. 2 may be stored in a random-access manner within the storage devices 176a-176m. Additionally, copies of portions or all of a given mapping table entries may be stored in RAM 172, in buffers within controller 174, in memory medium 130, and in one or more caches within or coupled to processor 122. In various embodiments, a corresponding index may be included in each level for mappings which are part of the level (as depicted later in FIG. 4). Such an index may include an identification of mapping table entries and where they are stored (e.g., an identification of the page) within the level. In other embodiments, the index associated with mapping table entries may be a distinct entity, or entities, which are not logically part of the levels themselves.

Generally speaking, each mapping table comprises a set of rows and columns. A single record may be stored in a mapping table as a row. A record may also be referred to as an entry. In one embodiment, a record stores at least one tuple including a key. Tuples may (or may not) also include data fields including data such as a pointer used to identify or locate data components stored in storage subsystem 170. It is noted that in various embodiments, the storage subsystem may include storage devices (e.g., SSDs) which have internal mapping mechanisms. In such embodiments, the pointer in the tuple may not be an actual physical address per se. Rather, the pointer may be a logical address which the storage device maps to a physical location within the device. Over time, this internal mapping between logical address and physical location may change. In other embodiments, records in the mapping table may only contain key fields with no additional associated data fields. Attributes associated with a data component corresponding to a given record may be stored in columns, or fields, in the table. Status information, such as a valid indicator, a data age, a data size, and so forth, may be stored in fields, such as Field0 to FieldN shown in FIG. 2. In various embodiments, each column stores information corresponding to a given type. In some embodiments, compression techniques may be utilized for selected fields which in some cases may result in fields whose compressed representation is zero bits in length. It is noted that while the following discussion generally describes the mapping tables as mapping address (e.g., virtual to physical addresses), in other embodiments the tables, methods, and mechanisms may be applied to such that the key can be a file identifier or an object identifier. For example, in such embodiments the system may be used as a file server or object server. In various embodiments, the methods and mechanisms described here may be used to serve blocks, objects, and files, and dynamically move space between them. Numerous such embodiments are possible and are contemplated.

A key is an entity in a mapping table that may distinguish one row of data from another row. Each row may also be referred to as an entry or a record. A key may be a single column, or it may consist of a group of columns used to identify a record. In some embodiments, a key may correspond to a range of values rather than to a single value. For example, a key corresponding to a range may be represented as a start and end of a range, or as a start and length, or in other ways. Additionally, the ranges corresponding to keys may overlap with other keys, including either ranges or individual values. In one example, an address translation mapping table may utilize a key comprising a volume identifier (ID), an address such as a logical address or virtual address, a snapshot ID, a sector number, and so forth. A given received read/write storage access request may identify a particular volume, sector and length. A sector may be a logical block of data stored in a volume. Sectors may have different sizes on different volumes. The address translation mapping table may map a volume in sector-size units.

A volume identifier (ID) may be used to access a volume table that conveys a volume ID and a corresponding current snapshot ID. This information along with the received sector number may be used to access the address translation mapping table. Therefore, in such an embodiment, the key value for accessing the address translation mapping table is the combination of the volume ID, snapshot ID, and the received sector number. In one embodiment, the records within the address translation mapping table are sorted by volume ID, followed by the sector number and then by the snapshot ID. This ordering may group together different versions of data components in different snapshots. Therefore, during a lookup for a storage access read request, a corresponding data component may be found with fewer read operations to the storage devices 176a-176m.

The address translation mapping table may convey a physical pointer value that indicates a location within the data storage subsystem 170 storing a data component corresponding to the received data storage access request. The key value may be compared to one or more key values stored in the mapping table. In the illustrated example, simpler key values, such as "0", "2", "12" and so forth, are shown for ease of illustration. The physical pointer value may be stored in one or more of the fields in a corresponding record.

The physical pointer value may include a segment identifier (ID) and a physical address identifying the location of storage. A segment may be a basic unit of allocation in each of the storage devices 176a-176m. A segment may have a redundant array of independent device (RAID) level and a data type. During allocation, a segment may have one or more of the storage devices 176a-176m selected for corresponding storage. In one embodiment, a segment may be allocated an equal amount of storage space on each of the one or more selected storage devices of the storage devices 176a-176m. The data storage access request may correspond to multiple sectors, which may result in multiple parallel lookups. A write request may be placed in an NVRAM buffer, such as RAM 172, and a write completion acknowledgment may be sent to a corresponding client computer of the client computers 110a-110c. At a later time, an asynchronous process may flush the buffered write requests to the storage devices 176a-176m.

In another example, the mapping table shown in FIG. 2 may be a deduplication table. A deduplication table may utilize a key comprising a hash value determined from a data component associated with a storage access request. The initial steps of a deduplication operation may be performed concurrently with other operations, such as a read/write request, a garbage collection operation, a trim operation, and so forth. For a given write request, the data sent from one of the client computer systems 110a-110c may be a data stream, such as a byte stream. As is well known to those skilled in the art, a data stream may be divided into a sequence of fixed-length or variable-length chunks. A chunking algorithm may perform the dividing of the data stream into discrete data components which may be referred to as "chunks". A chunk may be a sub-file content-addressable unit of data. In various embodiments, a table or other structure may be used to determine a particular chunking algorithm to use for a given file type or type of data. A file's type may be determined by referring to its file name extension, separate identifying information, the content of the data itself, or otherwise. The resulting chunks may then be stored in one of the data storage arrays 120a-120b to allow for sharing of the chunks. Such chunks may be stored separately or grouped together in various ways.

In various embodiments, the chunks may be represented by a data structure that allows reconstruction of a larger data component from its chunks (e.g. a particular file may be reconstructed based on one or more smaller chunks of stored data). A corresponding data structure may record its corresponding chunks including an associated calculated hash value, a pointer (physical and/or logical) to its location in one of the data storage arrays 120a-120b, and its length. For each data component, a deduplication application may be used to calculate a corresponding hash value. For example, a hash function, such as Message-Digest algorithm 5 (MD5), Secure Hash Algorithm (SHA), or otherwise, may be used to calculate a corresponding hash value. In order to know if a given data component corresponding to a received write request is already stored in one of the data storage arrays 120a-120b, bits of the calculated hash value (or a subset of bits of the hash value) for the given data component may be compared to bits in the hash values of data components stored in one or more of the data storage arrays 120a-120b.

A mapping table may comprise one or more levels as shown in FIG. 2. A mapping table may comprise 16 to 64 levels, although another number of levels supported within a mapping table is possible and contemplated. In FIG. 2, three levels labeled Level "1", Level "2" and Level "N" are shown for ease of illustration. Each level within a mapping table may include one or more partitions. In one embodiment, each partition is a 4 kilo-byte (KB) page. For example, Level "N" is shown to comprise pages 210a-210g, Level "2" comprises pages 210h-210j and Level "1" comprises pages 210k-210n. It is possible and contemplated other partition sizes may also be chosen for each of the levels within a mapping table. In addition, it is possible one or more levels have a single partition, which is the level itself.

In one embodiment, multiple levels within a mapping table are sorted by time. For example, in FIG. 2, Level "1" may be older than Level "2". Similarly, Level "2" may be older than Level "N". In one embodiment, when a condition for inserting one or more new records in the mapping table is detected, a new level may be created. In various embodiments, when a new level is created the number/designation given to the new level is greater than numbers given to levels that preceded the new level in time. For example, if the most recent level created is assigned the value 8, then a newly created level may be assigned the value 9. In this manner a temporal relationship between the levels may be established or determined. As may be appreciated, numerical values need not be strictly sequential. Additionally, alternative embodiments may reverse the numbering scheme such that newer levels have smaller numerical designations. Further, other embodiments may utilize non-numerical designations to distinguish between levels. Numerous such embodiments are possible and are contemplated. Each next older level has a label decremented by one from a label integer value of a previous younger level. A separate table not shown may be used to logically describe the mapping table. For example, each entry of the separate table may include a given level ID and a list of the page IDs stored within the given level ID.

By creating a new highest level for an insertion of new records, the mapping table is updated by appending the new records. In one embodiment, a single level is created as a new highest level and each of the new records is inserted into the signal level. In another embodiment, the new records may be searched for duplicate keys prior to insertion into the mapping table. A single level may be created as a new highest level. When a given record storing a duplicate key is found, each of the records buffered ahead of the given record may be inserted into the single level. The new records may be buffered in a manner to preserve memory ordering, such as in-order completion of requests. Then another single level may be created and the remainder of the new records may be inserted into this other single level unless another record storing a duplicate key is found. If such a record is found, then the steps are repeated. Existing records within the mapping table storing a same key value as one of the new records are not edited or overwritten in-place by the insertion of the new records.

Although the sizes of the levels are illustrated as increasing with lower levels being larger than newer levels, the higher levels may alternate between being larger or smaller than neighboring levels. The number of newer records to insert into the mapping table may vary over time and create the fluctuating level sizes. The lower levels may be larger than newer levels due to flattening of the lower levels. Two or more lower levels may be flattened into a single level when particular conditions are detected. Further details are provided later.

With no edits in-place for the records stored in the mapping table, newer records placed in higher levels may override records storing a same key value located in the lower levels. For example, when the mapping table is accessed by a given key value, one or more levels may be found to store a record holding a key value matching the given key value. In such a case, the highest level of the one or more levels may be chosen to provide the information stored in its corresponding record as a result of the access. Further details are provided later. In addition, further details about the detected conditions for inserting one or more new records into the mapping table and the storage of information are provided later.

In one embodiment, entries within a given page may be sorted by key. For example, the entries may be sorted in ascending order according to a key included in the entry. Additionally, in various embodiments, the pages within a level may be sorted according to any desired sort order. In various embodiments, the pages within a level may also be sorted (e.g., according to key values or otherwise). In the example of FIG. 2, page 210a of Level N includes records sorted according to key value in ascending order. In various embodiments, one or more columns may be used to store key values. In the example of FIG. 2, two columns or fields are shown in each tuple for storing key values. Utilizing such key values, the records then may be sorted in a desired order. Sorting may be performed based on any of the key values for a records, or any combination of key values for the record. In the example shown, the first record stores a key value including 0 and 8 stored in two columns, and the last record stores a key value including 12 and 33. In this illustrated example, each sorted record in page 210a between the first and the last record stores a key value between 0 and 12 in the first column and the records are arranged in a manner to store key values based (at least in part) on the first column in an ascending order from 0 to 12. Similarly, page 210b includes sorted records, wherein the first record stores key values of 12 and 39 and the last record stores key values of 31 and 19. In this illustrated example, each sorted record in page 210b between the first and the last record stores a key value between 12 and 31 in the first column and the records are arranged in a manner to store key values in an ascending order from 12 to 31.

In addition to the above, the pages within Level N are sorted according to a desired order. In various embodiments, pages within a level may be sorted in a manner that reflects the order in which entries within a page are sorted. For example, pages within a level may be sorted according to key values in ascending order. As the first key value in page 210b is greater than the last key value in page 210a, page 210b follows page 210a in the sort order. Page 210g would then include entries whose key values are greater than those included in pages 210a-210f (not shown). In this manner, all entries within a level are sorted according to a common scheme. The entries are simply subdivided into page, or other, size units. As may be appreciated, other sorting schemes may be used as desired.

Figure 3A:
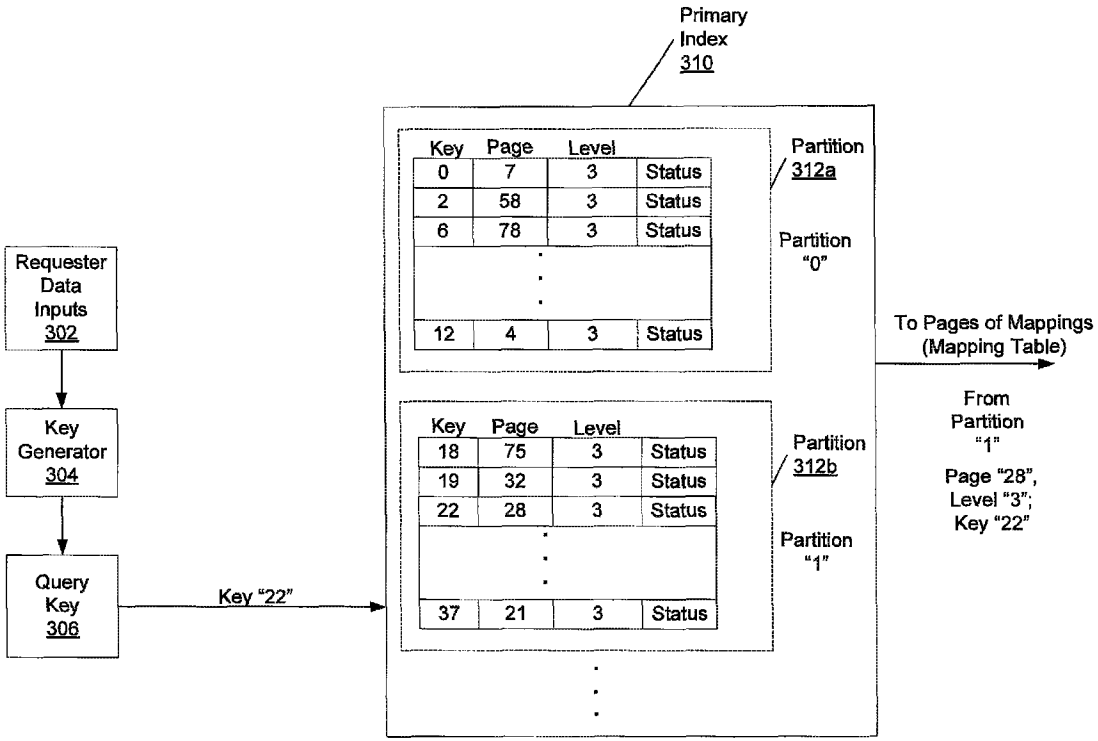
FIG. 3A is a generalized block diagram of one embodiment of a primary index used to access a mapping table.

Referring now to FIG. 3A, a generalized block diagram of one embodiment of a primary index used to access a mapping table is shown. A key generator 304 may receive one or more requester data inputs 302. In one embodiment, a mapping table is an address translation directory table. A given received read/write request may identify a particular volume, sector and length. The key generator 304 may produce a query key value 306 that includes a volume identifier (ID), a logical or virtual address, a snapshot ID, and a sector number. Other combinations are possible and other or additional values may be utilized as well. Different portions of the query key value 306 may be compared to values stored in columns that may or may not be contiguous within the mapping table. In the shown example, a key value of "22" is used for ease of illustration.

As described earlier, both a chunking algorithm and/or a segmenting algorithm associated with the key generator 304 may receive data 302 corresponding to a storage access request. These algorithms may produce one or more data components and select a hash function to calculate a corresponding hash value, or query key value 306, for each data component. The resulting hash value may be used to index the deduplication table.

A primary index 310, as shown in FIG. 3A, may provide location identifying information for data stored in the storage devices 176a-176m. For example, referring again to FIG. 2, a corresponding primary index 310 (or portion thereof) may be logically included in each of level "1", level "2" and level "N". Again, each level and each corresponding primary index may be physically stored in a random-access manner within the storage devices 176a-176m.

In one embodiment, the primary index 310 may be divided into partitions, such as partitions 312a-312b. In one embodiment, the size of the partitions may range from a 4 kilobyte (KB) page to 256 KB, though other sizes are possible and are contemplated. Each entry of the primary index 310 may store a key value. In addition, each entry may store a corresponding unique virtual page identifier (ID) and a level ID corresponding to the key value. Each entry may store corresponding status information such as validity information. When the primary index 310 is accessed with a query key value, the entries within the index 310 may be searched for one or more entries which match, or otherwise correspond to, the key value. Information from the matching entry may then be used to locate and retrieve a mapping which identifies a storage location which is the target of a received read or write request. In other words, the index 310 identifies the locations of mappings. In one embodiment, a hit in the index provides a corresponding page ID identifying a page within the storage devices 176a-176m storing both the key value and a corresponding physical pointer value. The page identified by the corresponding page ID may be searched with the key value to find the physical pointer value.

In the example of FIG. 3A, a received request corresponds to a key "22". This key is then used to access index 310. A search of the index 310 results on a hit to an entry within partition 312b. The matching entry in this case include information such as—page 28, and level 3. Based upon this result, the desired mapping for the request is found in a page identified as page 28 within level 3 of the mapping tables. Using this information, an access may then be made to the mapping tables to retrieve the desired mapping. If an access to the primary index 310 requires an access to storage, then at least two storage accesses would be required in order to obtain a desired mapping. Therefore, in various embodiments as described below, portions of the primary index are cached, or otherwise stored in a relatively fast access memory, in order to eliminate one access to the storage devices. In various embodiments, the entire primary index for the mapping tables is cached. In some embodiments, where the primary index has become too large to cache in its entirety, or is otherwise larger than desired, secondary, tertiary, or other index portions may be used in the cache to reduce its size. Secondary type indices are discussed below. In addition to the above, in various embodiments mapping pages corresponding to recent hits are also cached for at least some period of time. In this manner, processes which exhibit accesses with temporal locality can be serviced more rapidly (i.e., recently accessed locations will have their mappings cached and readily available).

Figure 3B:
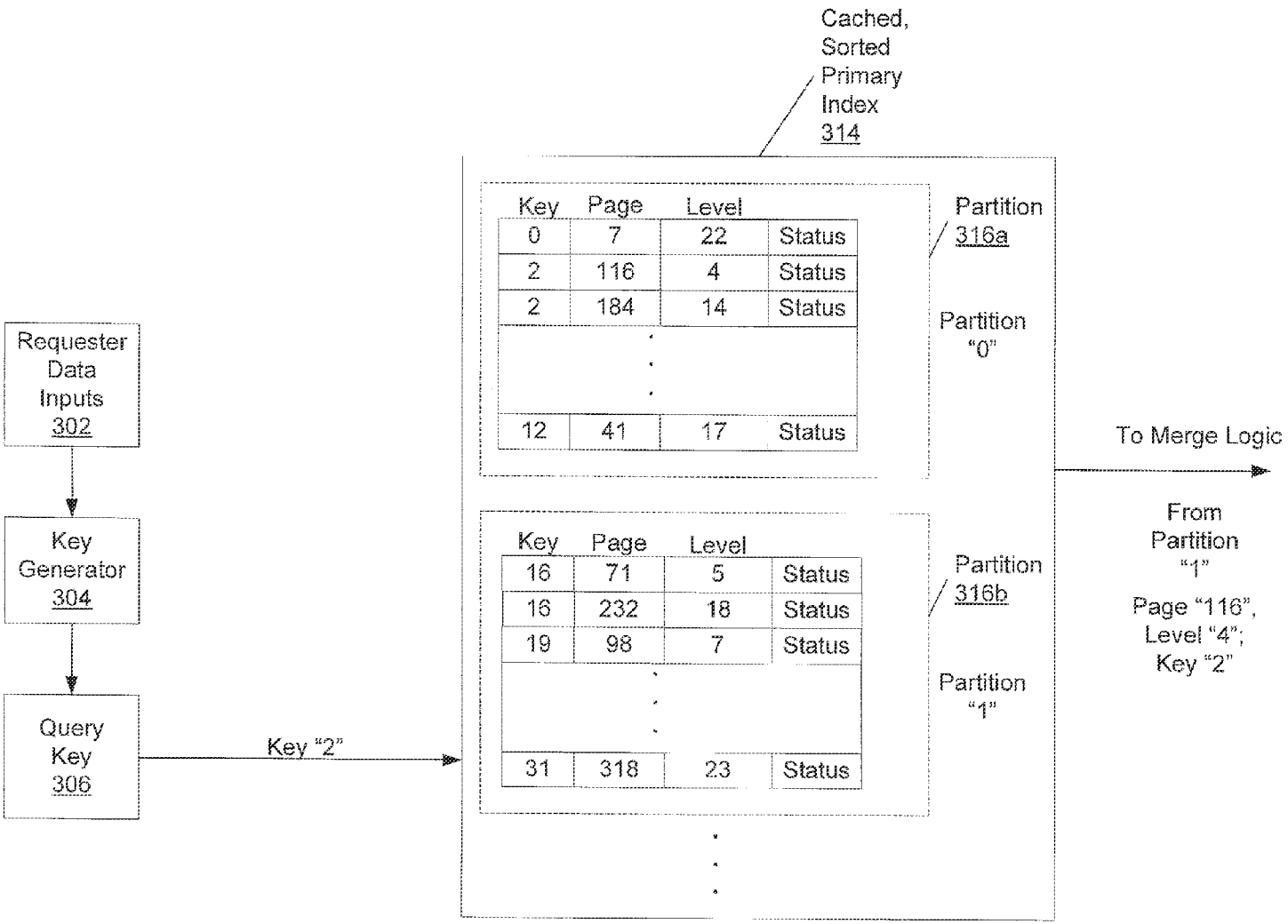
FIG. 3B is a generalized block diagram of another embodiment of a primary index used to access a mapping table.

Referring now to FIG. 3B, a generalized block diagram of one embodiment of a cached primary index used to access a mapping table is shown. Circuit and logic portions corresponding to those of FIG. 3A are numbered identically. The cached primary index 314 may include copies of information stored in each of the primary indexes 310 for the multiple levels in a mapping table. The primary index 314 may be stored in one or more of RAM 172, buffers within controller 174, memory medium 130 and caches within processor 122. In one embodiment, the primary index 314 may be sorted by key value, though sorting otherwise is possible. The primary index 314 may also be divided into partitions, such as partitions 316a-316b. In one embodiment, the size of the partitions 316a-316b may be a same size as the partitions 312a-312b within the primary index 310.

Similar to the primary index 310, each entry of the primary index 314 may store one or more of a key value, a corresponding unique virtual page identifier (ID), a level ID corresponding to the key value, and status information such as valid information. When the primary index 314 is accessed with a query key value 306, it may convey a corresponding page ID identifying a page within the storage devices 176a-176m storing both the key value and a corresponding pointer value. The page identified by the corresponding page ID may be searched with the key value to find the pointer value. As shown, the primary index 314 may have multiple records storing a same key value. Therefore, multiple hits may result from the search for a given key value. In one embodiment, a hit with a highest value of a level ID (or whatever indicator is used to identify a youngest level or most recent entry) may be chosen. This selection of one hit from multiple hits may be performed by merge logic not shown here. A further description of the merge logic is provided later.

Figure 4:
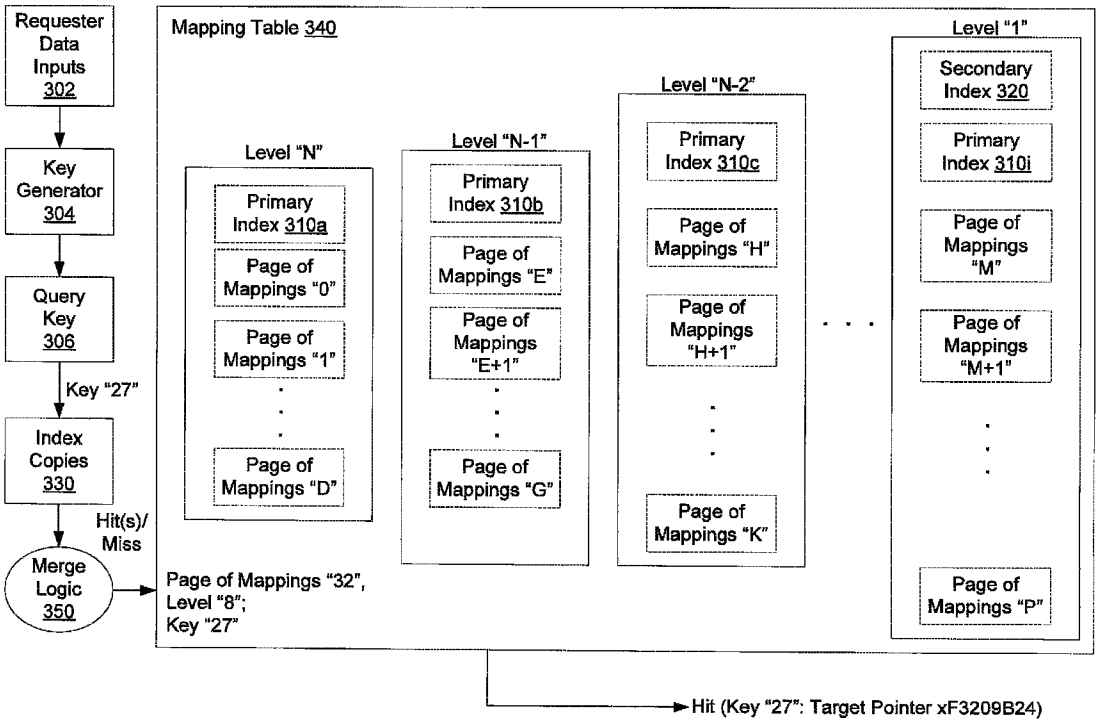
FIG. 4 is a generalized block diagram of another embodiment of a primary index and mapping table.

Turning now to FIG. 4, a generalized block diagram of another embodiment of a mapping table and primary index used to access the mapping table is shown. Circuit and logic portions corresponding to those of FIG. 3A are numbered identically. Mapping table 340 may have a similar structure as the mapping table shown in FIG. 2. However, storage of a corresponding primary index 310 for each level is now shown. A copy of one or more of the primary index portions 310a-310i may be included in index copies 330 (e.g., cached copies). Copies 330 may generally correspond to the cached index depicted in FIG. 3B. The information in index copies 330 may be stored in RAM 172, buffers within controller 174, memory medium 130, and caches within processor 122. In the embodiment shown, the information in primary indexes 310a-310i may be stored with the pages of mappings in storage devices 176a-176m. Also shown is a secondary index 320 which may be used to access a primary index, such as primary index 310i shown in the diagram. Similarly, accessing and updating the mapping table 340 may occur as described earlier.

Mapping table 340 comprises multiple levels, such as Level "1" to Level "N". In the illustrated example, each of the levels includes multiple pages. Level "N" is shown to include pages "0" to "D", Level N−1 includes pages "E" to "G", and so forth. Again, the levels within the mapping table 310 may be sorted by time. Level "N" may be younger than Level "N−1" and so forth. Mapping table 340 may be accessed by at least a key value. In the illustrated example, mapping table 340 is accessed by a key value "27" and a page ID "32". For example, in one embodiment, a level ID "8" may be used to identify a particular level (or "subtable") of the mapping table 340 to search. Having identified the desired subtable, the page ID may then be used to identify the desired page within the subtable. Finally, the key may be used to identify the desired entry within the desired page.

As discussed above, an access to the cached index 330 may result in multiple hits. In one embodiment, the results of these multiple hits are provided to merge logic 350 which identifies which hit is used to access the mapping table 340. Merge logic 350 may represent hardware and/or software which is included within a storage controller. In one embodiment, merge logic 350 is configured to identify a hit which corresponds to a most recent (newest) mapping. Such an identification could be based upon an identification of a corresponding level for an entry, or otherwise. In the example shown, a query corresponding to level 8, page 32, key 27 is received. Responsive to the query, page 32 of level 8 is accessed. If the key 27 is found within page 32 (a hit), then a corresponding result is returned (e.g., pointer xF3209B24 in the example shown). If the key 27 is not found within page 32, then a miss indication is returned. This physical pointer value may be output from the mapping table 340 to service a storage access request corresponding to the key value "27".

In one embodiment, the mapping table 340 supports inline mappings. For example, a mapping detected to have a sufficiently small target may be represented without an actual physical sector storing user data within the storage devices 176a-176m. One example may be a repeating pattern within the user data. Rather than actually store multiple copies of a repeated pattern (e.g., a series of zeroes) as user data within the storage devices 176a-176m, a corresponding mapping may have an indication marked in the status information, such as within one of the fields of field0 to fieldN in the mapping table, that indicates what data value is to be returned for a read request. However, there is no actual storage of this user data at a target location within the storage devices 176a-176m. Additionally, an indication may be stored within the status information of the primary index 310 and any additional indexes that may be used (not shown here).

In addition to the above, in various embodiments the storage system may simultaneously support multiple versions of the data organization, storage schemes, and so on. For example, as the system hardware and software evolve, new features may be incorporated or otherwise provided. Data, indexes, and mappings (for example) which are newer may take advantage of these new features. In the example of FIG. 4, new level N may correspond to one version of the system, while older level N−1 may correspond to a prior version. In order to accommodate these different versions, metadata may be stored in association with each of the levels which indicates which version, which features, compression schemes, and so on, are used by that level. This metadata could be stored as part of the index, the pages themselves, or both. When accesses are made, this metadata then indicates how the data is to be handled properly. Additionally, new schemes and features can be applied dynamically without the need to quiesce the system. In this manner, upgrading of the system is more flexible and a rebuild of older data to reflect newer schemes and approaches is not necessary.

Figure 5A:
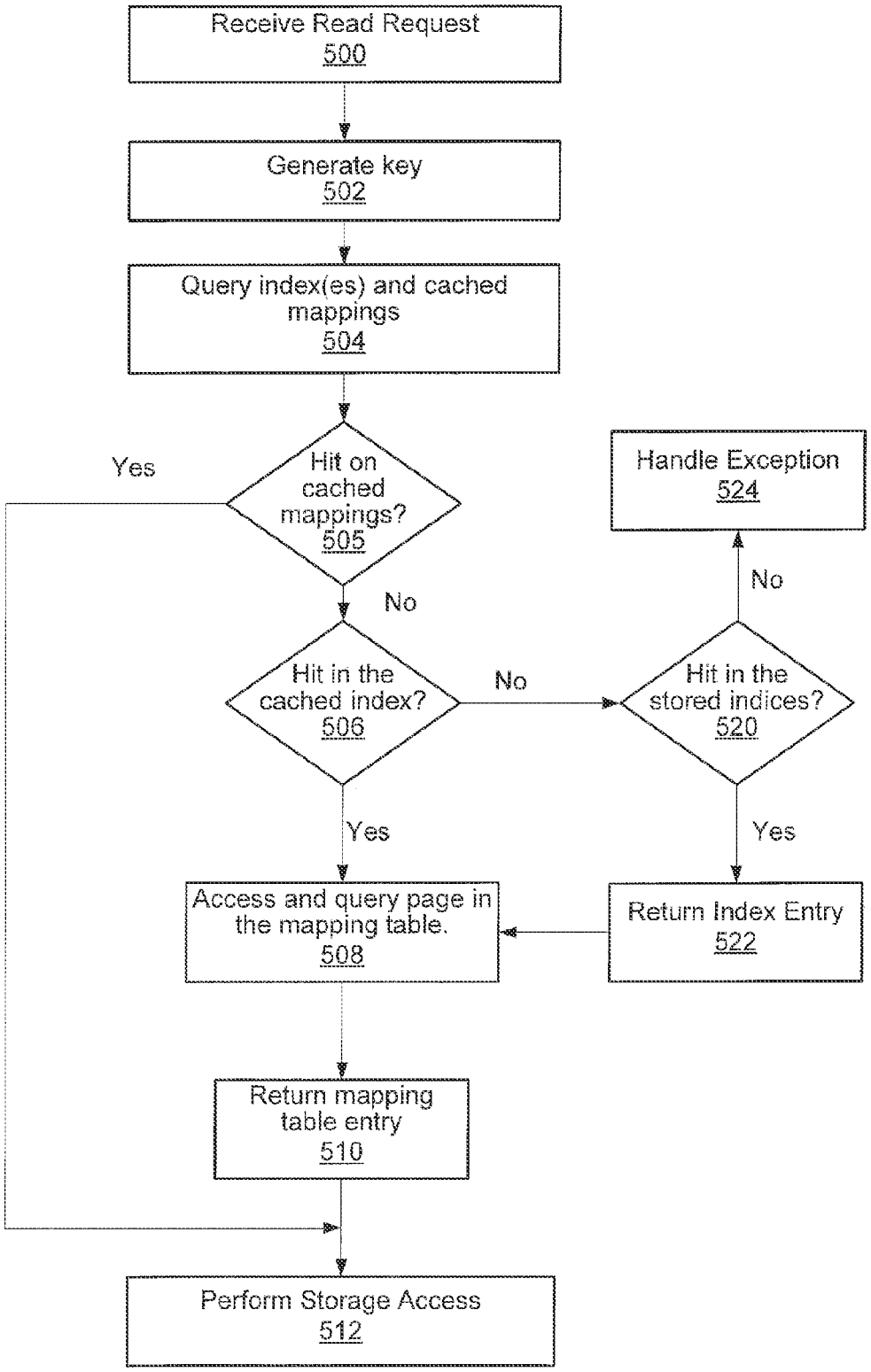
FIG. 5A is a generalized flow diagram illustrating one embodiment of a method for performing a read access.

Turning now to FIG. 5A, one embodiment of a method for servicing a read access is shown. The components embodied in the network architecture 100 and mapping table 340 described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

Read and store (write) requests may be conveyed from one of the clients 110a-110c to one of the data storage arrays 120a-120b. In the example shown, a read request 500 is received, and in block 502 a corresponding query key value may be generated. In some embodiments, the request itself may include the key which is used to access the index and a "generation" of the key 502 is not required. As described earlier, the query key value may be a virtual address index comprising a volume ID, a logical address or virtual address associated with a received request, a snapshot ID, a sector number, and so forth. In embodiments which are used for deduplication, the query key value may be generated using a hash function or other function. Other values are possible and contemplated for the query key value, which is used to access a mapping table.

In block 504, the query key value may be used to access one or more cached indexes to identify one or more portions of a mapping table that may store a mapping that corresponds to the key value. Additionally, recently used mappings which have been cached may be searched as well. If a hit on the cached mappings is detected (block 505), the cached mapping may be used to perform the requested access (block 512). If there is no hit on the cached mappings, the a determination may be made as to whether or not there is a hit on the cached index (block 506). If so, a result corresponding to the hit is used to identify and access the mapping table (block 508). For example, with the primary index 310, an entry storing the query key value also may store a unique virtual page ID that identifies a single particular page within the mapping table. This single particular page may store both the query key value and an associated physical pointer value. In block 508, the identified potion of the mapping table may be accessed and a search performed using the query key value. The mapping table result may then be returned (block 510) and used to perform a storage access (block 512) that corresponds to the target location of the original read request.

In some embodiments, an index query responsive to a read request may result in a miss. Such a miss could be due to only a portion of the index being cached or an error condition (e.g., a read access to a non-existent location, address corruption, etc.). In such a case, an access to the stored index may be performed. If the access to the stored index results in a hit (block 520), then a result may be returned (block 522) which is used to access the mapping tables (block 508). On the other hand, if the access to the stored index results in a miss, then an error condition may be detected. Handling of the error condition may be done in any of a variety of desired ways. In one embodiment, an exception may be generated (block 524) which is then handled as desired. In one embodiment, a portion of the mapping table is returned in block 510. In various embodiments, this portion is a page which may be a 4 KB page, or otherwise. As previously discussed, the records within a page may be sorted to facilitate faster searches of the content included therein.

In one embodiment, the mapping table utilizes traditional database systems methods for information storage in each page. For example, each record (or row or entry) within the mapping table is stored one right after the other. This approach may be used in row-oriented or row-store databases and additionally with correlation databases. These types of databases utilize a value-based storage structure. A value-based storage (VBS) architecture stores a unique data value only once and an auto-generated indexing system maintains the context for all values. In various embodiments, data may be stored by row and compression may be used on the columns (fields) within a row. In some embodiments, the techniques used may include storing a base value and having a smaller field size for the offset and/or having a set of base values, with a column in a row consisting of a base selector and an offset from that base. In both cases, the compression information may be stored within (e.g., at the start) of the partition.

In some embodiments, the mapping table utilizes a column-oriented database system (column-store) method for information storage in each page. Column-stores store each database table column separately. In addition, attribute values belonging to a same column may be stored contiguously, compressed, and densely packed. Accordingly, reading a subset of a table's columns, such as within a page, may be performed relatively quickly. Column data may be of uniform type and may allow storage size optimizations to be used that may not be available in row-oriented data. Some compression schemes, such as Lempel-Ziv-Welch (LZ) and run-length encoding (RLE), take advantage of a detected similarity of adjacent data to compress. Further, as described more fully below, other compression schemes may encode a value as a difference from a base value, thus requiring fewer bits to represent the difference than would be required to represent the full value. A compression algorithm may be chosen that allows individual records within the page to be identified and indexed. Compressing the records within the mapping table may enable fine-grained mapping. In various embodiments, the type of compression used for a particular portion of data may be stored in association with the data. For example, the type of compression could be stored in an index, as part of a same page as the compressed data (e.g., in a header of some type), or otherwise. In this manner, multiple compression techniques and algorithms may be used side by side within the storage system. In addition, in various embodiments the type of compression used for storing page data may be determined dynamically at the time the data is stored. In one embodiment, one of a variety of compression techniques may be chosen based at least in part on the nature and type of data being compressed and/or the expected resource requirements for the compression technique and the currently available resources in the system. In some embodiments, multiple compression techniques will be performed and the one exhibiting the best compression will then be selected for use in compressing the data. Numerous such approaches are possible and are contemplated.

If there is a match of the query key value 306 found in any of the levels of the mapping table (block 508), then in block 510, one or more indications of a hit may be conveyed to the merge logic 350. For example, one or more hit indications may be conveyed from levels "1" to "J" as shown in FIG. 4. The merge logic 350 may choose the highest level, which may also be the youngest level, of the levels "1" to "J" conveying a hit indication. The chosen level may provide information stored in a corresponding record as a result of the access.

In block 512, one or more corresponding fields within a matching record of a chosen page may be read to process a corresponding request. In one embodiment, when the data within the page is stored in a compressed format, the page is decompressed and a corresponding physical pointer value is read out. In another embodiment, only the matching record is decompressed and a corresponding physical pointer value is read out. In one embodiment, a full physical pointer value may be split between the mapping table and a corresponding target physical location. Therefore, multiple physical locations storing user data may be accessed to complete a data storage access request.

Figure 5B:
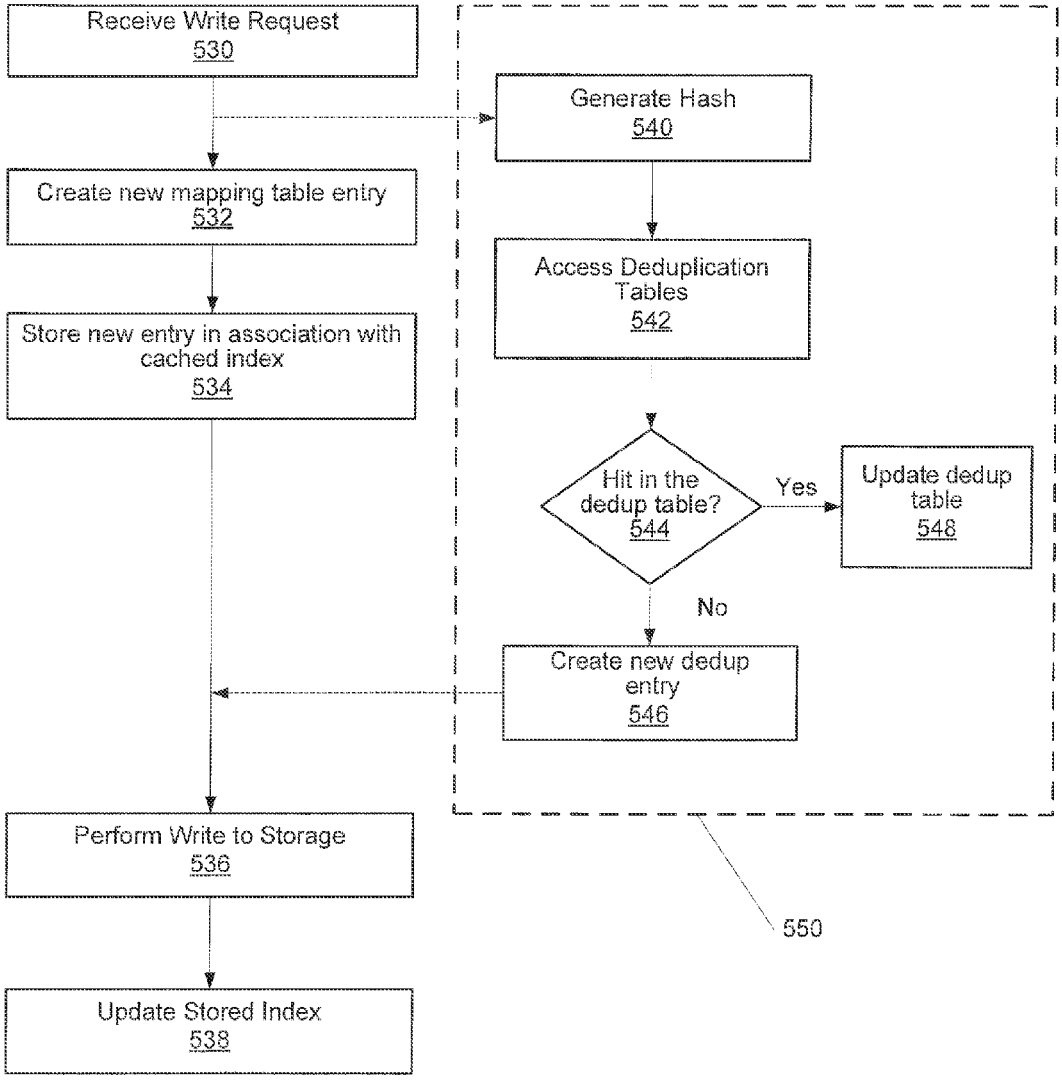
FIG. 5B is a generalized flow diagram illustrating one embodiment of a method for performing a write operation.

Turning now to FIG. 5B, one embodiment of a method corresponding to a received write request is shown. Responsive to a received write request (block 530), a new mapping table entry corresponding to the request may be created (block 532). In one embodiment, a new virtual-to-physical address mapping may be added (block 534) to the mapping table that pairs the virtual address of the write request with the physical location storing the corresponding data component. In various embodiments, the new mapping may be cached with other new mappings and added to a new highest level of the mapping table entries. The write operation to persistent storage (block 536) may then be performed. In various embodiments, writing the new mapping table entry to the mapping tables in persistent storage may not be performed until a later point in time (block 538) which is deemed more efficient. As previously discussed, in a storage system using solid state storage devices, writes to storage are much slower than reads from storage. Accordingly, writes to storage are scheduled in such a way that they minimize impact on overall system performance. In some embodiments, the insertion of new records into the mapping table may be combined with other larger data updates. Combining the updates in this manner may provide for more efficient write operations. It is noted that in the method of 5B, as with each of the methods described herein, operations are described as occurring in a particular order for ease of discussion. However, the operations may in fact occur in a different order, and in some cases various ones of the operations may occur simultaneously. All such embodiments are contemplated.

In addition to the above, deduplication mechanisms may be used in some embodiments. FIG. 5B depicts operations 550 which may generally correspond to deduplication systems and methods. In the example shown, a hash corresponding to a received write request may be generated (block 540) which is used to access deduplication tables (block 542). If there is a hit (block 544) in the deduplication tables (i.e., a copy of the data already exists within the system), then a new entry may be added to the deduplication tables (block 548) to reflect the new write. In such a case, there is no need to write the data itself to storage and the received write data may be discarded. Alternatively, if there is a miss in the deduplication table, then a new entry for the new data is created and stored in the deduplication tables (block 546). Additionally, a write of the data to storage is performed (block 536). Further, a new entry may be created in the index to reflect the new data (block 538). In some embodiments, if a miss occurs during an inline deduplicaton operation, no insertion in the deduplication tables is performed at that time. Rather, during an inline deduplication operation, a query with a hash value may occur for only a portion of the entire deduplication table (e.g., a cached portion of the deduplication table). If a miss occurs, a new entry may be created and stored in the cache. Subsequently, during a post-processing deduplication operation, such as an operation occurring during garbage collection, a query with a hash value may occur for the entire deduplication table. A miss may indicate the hash value is a unique hash value. Therefore, a new entry such as a hash-to-physical-pointer mapping may be inserted into the deduplication table. Alternatively, if a hit is detected during post-processing deduplication (i.e., a duplicate is detected), deduplication may be performed to eliminate one or more of the detected copies.

Figure 5C:
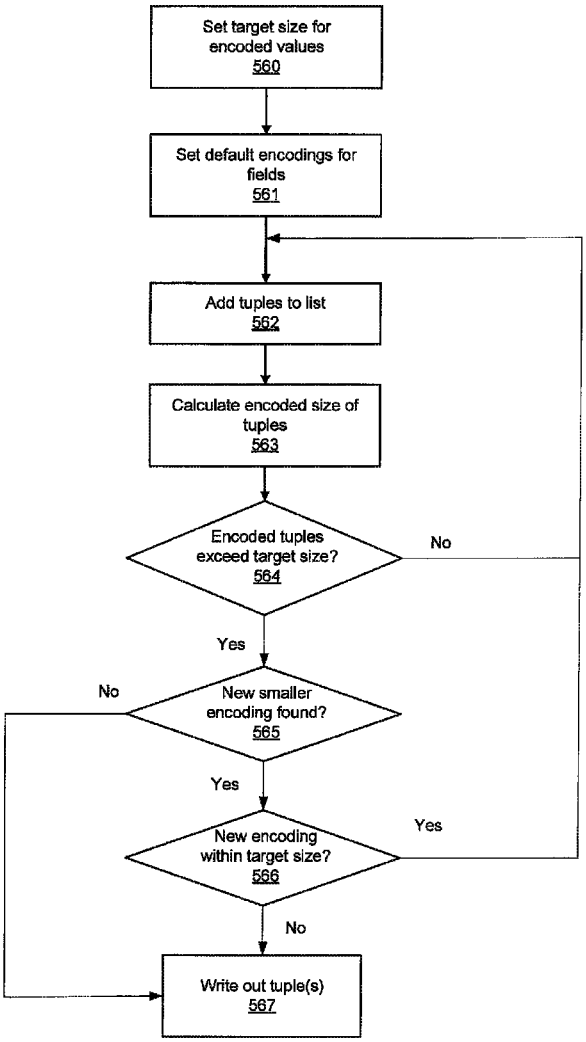
FIG. 5C is a generalized flow diagram illustrating one embodiment of a method for encoding and storing tuples.

As mentioned above, various compression schemes may be used for encoding mapping table related data in order to reduce the amount of storage required. Turning now to FIG. 5C, one embodiment of a method for compressing a set of tuples is shown. This approach may be used to write entries to a mapping table or other tables. First, a target size for a set of encoded tuples to be stored (block 560) and default encoding algorithm (block 561) may be selected. Subsequently, tuples are selected for encoding and storage in the table based on the selected size and algorithm (block 562). In such an embodiment, the encoded size of each tuple is calculated using the currently selected encoding method. If a tuple being added would cause the currently accumulated tuples in the set to exceed the target size (conditional block 564), the system may try to find a better encoding algorithm for all of the tuples accumulated to this point in order to reduce the total space required for the encoded tuples (block 565). If a smaller encoding is not found (block 565), then the most recent tuple is omitted and the remaining tuples are written using the current encoding method (block 567). If a smaller encoding is found (block 565), then it is determined whether the new smaller encoding is within the target size (block 566). If the new encoding is not within the target size, then the most recently provided tuple may be omitted and the remaining tuples are encoded and written to the table using the current encoding method (block 567). If a current tuple under consideration does not cause the currently accumulated tuples in the set to exceed the target size (conditional block 564), then an attempt to add another tuple may be made (block 562). Similarly, if a new encoding that meets the requirements is found in conditional block 566, then an attempt to add another tuple may be made (block 562).

Figure 5D:
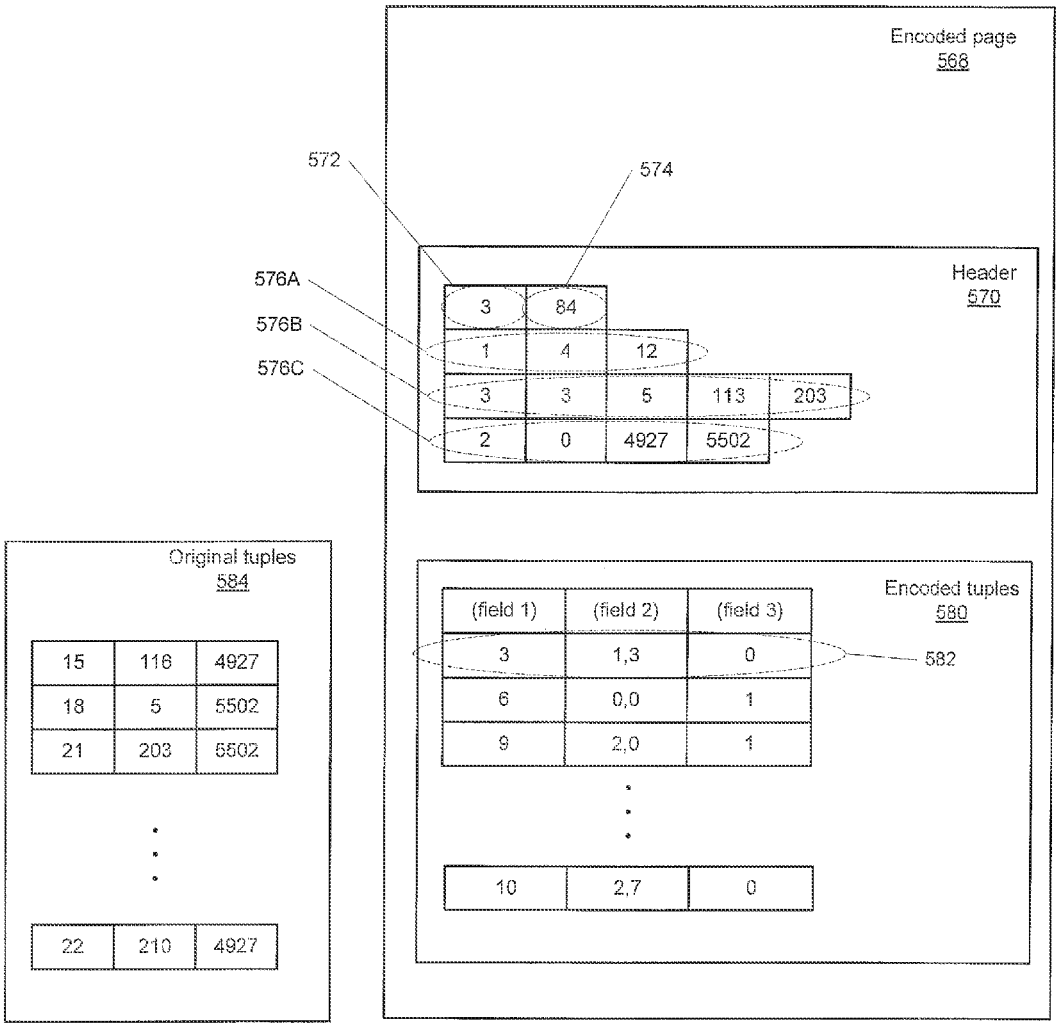
FIG. 5D illustrates one embodiment of tuple encoding.

FIG. 5D illustrates one embodiment of an approach for encoding tuples. In the example, original unencoded tuples 584 are depicted, and the tuples as encoded 580 in an encoded page 568 are depicted. Generally speaking, the illustrated example represents each field in the table using one or two values. The first value is a base value selector that is used to select a base value, and the second value is an offset from the selected base value. In one embodiment, the base selector includes b bits and the offset includes k bits, where b and k are integers. The values b and k may be chosen separately for each field, and one or both of b and k may be zero. For each encoded field, the values of b and k may be stored, along with up to $2^b$ bases, each of which can be as many bits as required to represent the base value. If b is zero, only one base is stored. Each field encoded in this way then requires at most b+k bits to encode. The encoder can consider different values for b and k to minimize the total encoded size for the field, with larger values of b typically requiring smaller values of k.

FIG. 5D shows a sample of unencoded tuples 584 and the resulting encoded page 568. The page includes a header 570, the first two values of which contain the number of fields in each tuple (572) and the number of tuples in the page (574). The header 570 then has one table or set of values for each field. The table first lists the number of bases for a given field and then the number of bits k used to encode the offset from the base. The page then stores each tuple, encoded using the information in the header. For example, the first value (572) in the header 570 indicates that there are 3 fields for each tuple. The second value (574) indicates there are 84 tuples in the page 568. The following three tables 576A-576C then provide base value and encoding information for each of the three fields. Table 576A indicates that the first field has 1 base, with 4 bits used to encode the offset. The sole base for the first field is 12 (i.e., b is zero). The second table 576B indicates there are 3 bases for the second field, and 3 bits are to be used to encode the offset. The three bases for the second field 576B are 5, 113, and 203. Finally, the third table 576C indicates the third field has 2 bases, and 0 bits are used to encode the offset.

Looking at the encoded tuples 580, the various values may be determined. In the example shown, a value in a given row/column of the encoded tuples 580 corresponds to a value in the same row/column of the original tuples. As may be appreciated, the ordering and location of values in the figure is exemplary only. The actual ordering of values and corresponding encoded values may vary widely from what is depicted. The first field in the first tuple 582 is encoded as 3 because the value 15 (the unencoded value) may be represented as an offset of 3 from the base of 12 (i.e., 15−12=3). Note in this example there is only one base and b is zero. Consequently, there are no bits used to encode the base selector value for this field. The offset value 3 is encoded using 4 bits, a substantial reduction over typical encodings that might require 8, 32, or 64 bits. The second value in the first tuple 582A is encoded as 1,3. The 1 indicates that base 1 is selected in the table 576B (i.e., select base 113), and the 3 indicates an offset of 3 from the base of 113. The value 1 is encoded in 2 bits ($2^2$ is the smallest power of 2 greater than or equal to the number of bases), and the value 3 is encoded in 3 bits, for a total of 5 bits. Again, this is much smaller than a naïve encoding of the field. Finally, the last field is encoded as an index indicating which base should be used. In this case no bits are used to represent an offset. The first tuple has a 0 here because the stored value is 4927, which is entry (base) 0 in the table for the field 576C in the header 570. The total encoded space for each tuple is thus (0+4)+(2+3)+(1+0)=10 bits, a large reduction over the unencoded space required.

In various embodiments, if the maximum size of a field is increased, as may be done to accommodate larger virtual addresses or LUN identifiers, there is no need to re-encode a page. At worst, the header may need to be modified slightly to accommodate larger base values, but this requires minimal effort. In addition, it is possible to modify many values by a fixed amount, as might be done when a range of blocks is copied to a new location, by simply modifying the base without the need to decompress and then re-encode each affected tuple.

Figure 5E:
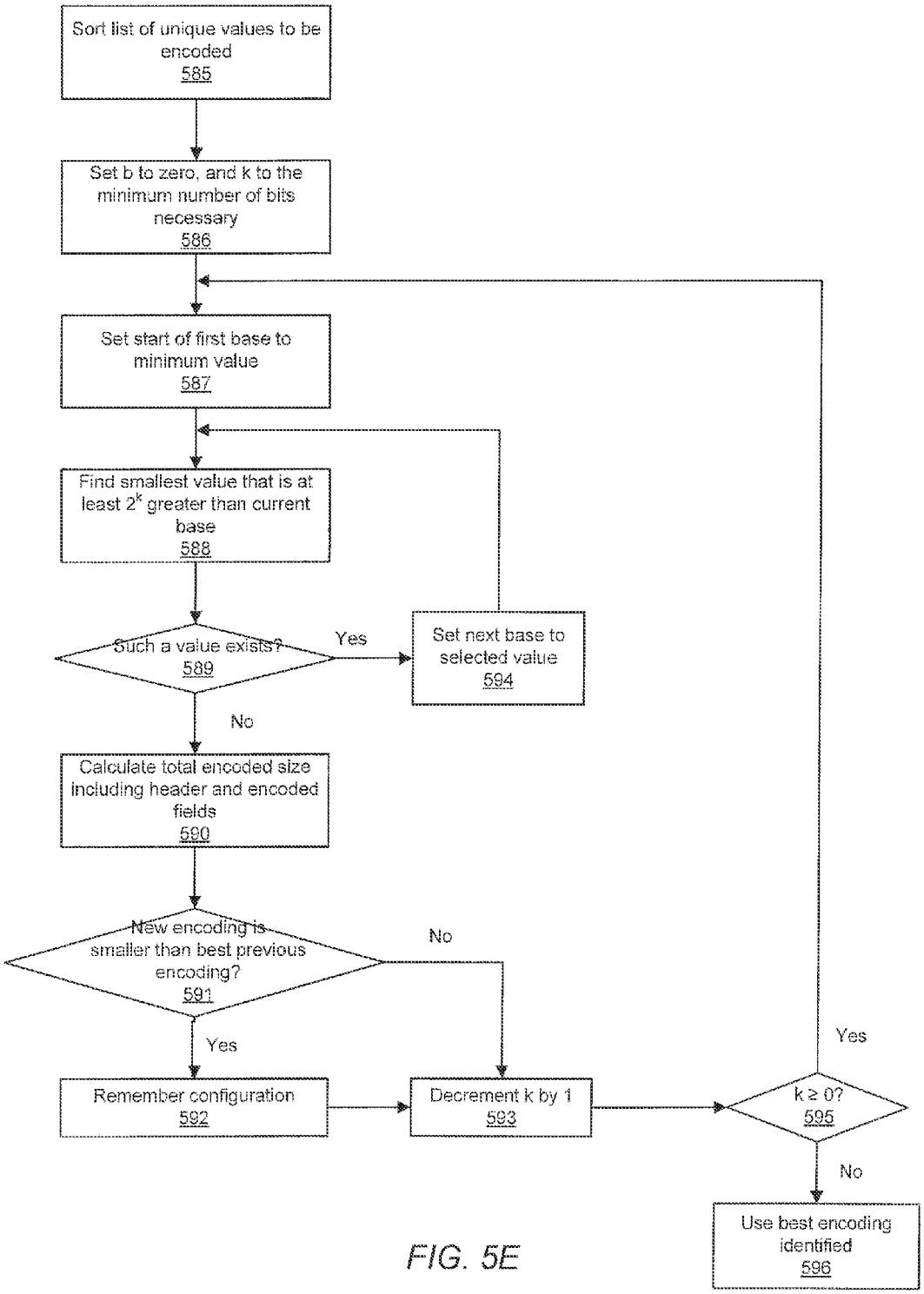
FIG. 5E is a generalized flow diagram illustrating one embodiment of a method for selecting and encoding scheme.

It is noted that there are several different methods to find optimal, or otherwise desirable, values of b and k for a particular field. FIG. 5E shows one embodiment of a method for evaluating and selecting an encoding scheme from multiple possibilities. In the method shown, each unique value to be recorded in the field in the page is recorded in a list (block 585). To find a more efficient encoding, the method starts with a representation where b is zero (one base) and k is sufficiently large (a minimum number of bits necessary) to encode the largest value in the list as a difference or offset from the minimum value in the list (block 586). The encoder then tries successively smaller values of k, which result in larger values of b (more bases). As each combination of b and k is evaluated, those which produce encodings deemed better (e.g., smaller) are retained for comparison against further possible encodings. The algorithm may then select the encoding that results in the smallest overall size, including both the table in the header and the total space required for the encoded field in the tuples. For example, starting with the minimum value as the base (block 587), the smallest value in the list that is at least $2^k$ greater than the current base is found (block 588). If such a value exists (conditional block 589), then that value is selected as a next base (block 594). If no such value exists (conditional block 589), then the total encoded size for the header and encoded fields is determined using the currently selected bases and value of k. If this encoding is desirable (e.g., the smallest so far) (conditional block 591), then this encoding is retained (block 592). Whether the encoding is retained or not, the value of k may be decremented by 1 (block 593) and if k is greater than or equal to zero (conditional block 595), then the process may be repeated by returning to block 587. If decrementing k results in k falling below zero, then the process ends and the best encoding found thus far is selected (block 596).

Figure 6:
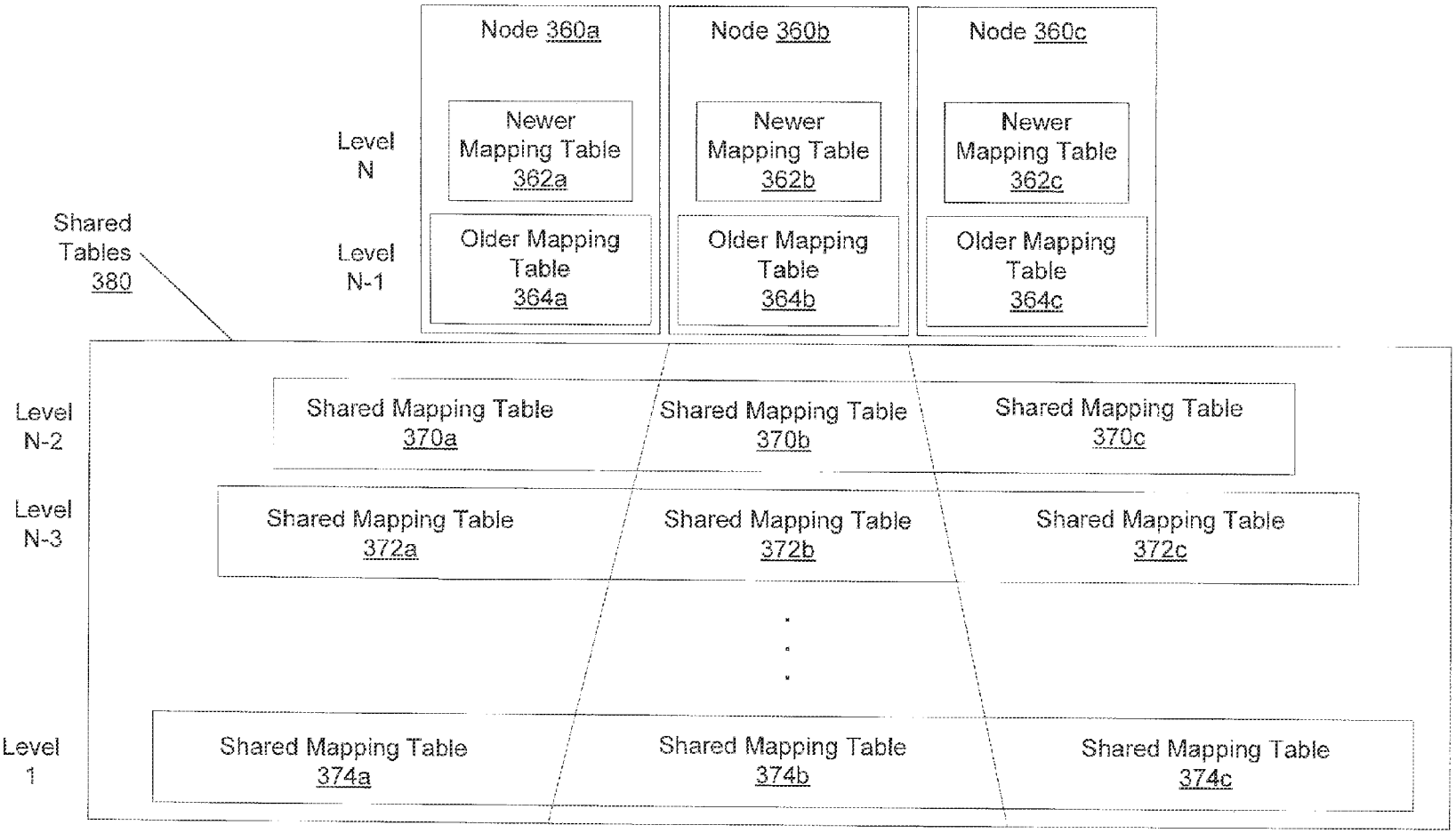
FIG. 6 is a generalized block diagram of one embodiment of a multi-node network with shared mapping tables.

Referring now to FIG. 6, a generalized block diagram of one embodiment of a multi-node network with shared mapping tables is shown. In the example shown, three nodes 360a-360c are used to form a cluster of mapping nodes. In one embodiment, each of the nodes 360a-360c may be responsible for one or more logical unit numbers (LUNs). In the depicted embodiment, a number of mapping table levels, level 1−N, are shown. Level 1 may correspond to the oldest level, while level N may correspond to the newest level. For mapping table entries of LUNs managed by a particular node, that particular node may itself have newer entries stored on the node itself. For example, node 360a is shown to store mapping subtables 362a and 364a. These subtables 362a and 362b may correspond to LUNs for which node 360a is generally responsible. Similarly, node 360b includes subtables 362b and 364b which may correspond to LUNs managed by that node, while node 360c includes subtables 362c and 364c which may correspond to LUNs managed by that node. In such an embodiment, these "newer" level mapping table entries are maintained only by their corresponding managing nodes and are generally not found on other nodes.

In contrast to the above discussed relatively newer levels, older levels (i.e., levels N−2 down to level 1) represent mapping table entries which may be shared by all nodes 360a-360c in the sense that any of the nodes may be storing a copy of those entries. In the example shown, these older levels 370, 372, and 374 are collectively identified as shared tables 380. Additionally, as previously discussed, in various embodiments these older levels are static—apart from merging or similar operations which are discussed later. Generally speaking, a static layer is one which is not subject to modification (i.e., it is "fixed"). Given that such levels are fixed in this sense, an access to any copy of these lower levels may be made without concern for whether another of the copies has been, or is being, modified. Consequently, any of the nodes may safely store a copy of the shared tables 380 and service a request to those tables with confidence the request can be properly serviced. Having copies of the shared tables 380 stored on multiple nodes 360 may allow use of various load balancing schemes when performing lookups and otherwise servicing requests.

In addition to the above, in various embodiments, the levels 380 which may be shared may be organized in a manner which reflects the nodes 360 themselves. For example, node 360a may be responsible for LUNs 1 and 2, node 360b may be responsible for LUNs 3 and 4, and node 360c may be responsible for LUNs 5 and 6. In various embodiments, the mapping table entries may include tuples which themselves identify a corresponding LUN. In such an embodiment, the shared mapping tables 380 may be sorted according to key value, absolute width or amount of storage space, or otherwise. If a sort of mapping table entries in the levels 380 is based in part on LUN, then entries 370a may correspond to LUNs 1 and 2, entries 370b may correspond to LUNs 3 and 4, and entries 370c may correspond to LUNs 5 and 6. Such an organization may speed lookups by a given node for a request targeted to a particular LUN by effectively reducing the amount of data that needs to be searched, allowing a coordinator to directly select the node responsible for a particular LUN as the target of a request. These and other organization and sort schemes are possible and are contemplated. In addition, if it is desired to move responsibility for a LUN from one node to another, the original node mappings for that node may be flushed to the shared levels (e.g., and merged). Responsibility for the LUN is then transferred to the new node which then begins servicing that LUN.

Figure 7:
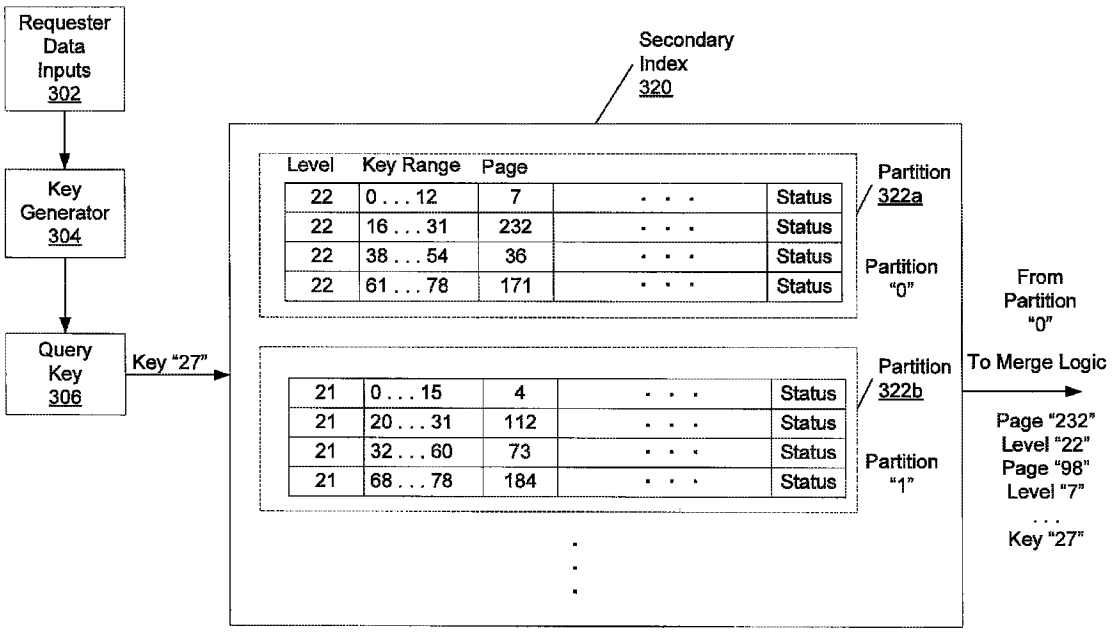
FIG. 7 is a generalized block diagram of one embodiment of a secondary index used to access a mapping table.

Referring now to FIG. 7, a generalized block diagram of one embodiment of a secondary index used to access a mapping table is shown. As described earlier, requester data inputs 302 may be received by a key generator 304, which produces a query key value 306. The query key value 306 is used to access a mapping table. In some embodiments, the primary index 310 shown in FIG. 3 may be too large (or larger than desired) to store in RAM 172 or memory medium 130. For example, older levels of the index may grow very large due to merging and flattening operations described later in FIG. 10 and FIG. 11. Therefore, a secondary index 320 may be cached for at least a portion of the primary index instead of the corresponding portion of the primary index 310. The secondary index 320 may provide a more coarse level of granularity of location identification of data stored in the storage devices 176a-176m. Therefore, the secondary index 320 may be smaller than the portion of the primary index 310 to which it corresponds. Accordingly, the secondary index 320 may be stored in RAM 172 or in memory medium 130.

In one embodiment, the secondary index 320 is divided into partitions, such as partitions 322a-322b. Additionally, the secondary index may be organized according to level with the more recent levels appearing first. In one embodiment, older levels have lower numbers and younger levels have higher numbers (e.g., a level ID may be incremented with each new level). Each entry of the secondary index 320 may identify a range of key values. For example, the first entry shown in the example may identify a range of key values from 0 to 12 in level 22. These key values may correspond to key values associated with a first record and a last record within a given page of the primary index 310. In other words, the entry in the secondary index may simply storage an identification of key 0 and an identification of key 12 to indicate the corresponding page includes entries within that range. Referring again to FIG. 3A, partition 312a may be a page and the key values of its first record and its last record are 0 and 12, respectively. Therefore, an entry within the secondary index 320 stores the range 0 to 12 as shown in FIG. 7. Since remappings are maintained in the levels within the mapping table, a range of key values may correspond to multiple pages and associated levels. The fields within the secondary index 320 may store this information as shown in FIG. 7. Each entry may store one or more corresponding unique virtual page identifiers (IDs) and associated level IDs corresponding to the range of key values. Each entry may also store corresponding status information such as validity information. The list of maintained page IDs and associated level IDs may indicate where a given query key value might be stored, but not confirm that the key value is present in that page and level. The secondary index 320 is smaller than the primary index 310, but also has a coarse-level of granularity of location identification of data stored in the storage devices 176a-176m. The secondary index 320 may be sufficiently small to store in RAM 172 or in memory medium 130.

When the secondary index 320 is accessed with a query key value 306, it may convey one or more corresponding page IDs and associated level IDs. These results are then used to access and retrieve portions of the stored primary index. The one or more identified pages may then be searched with the query key value to find a physical pointer value. In one embodiment, the level IDs may be used to determine a youngest level of the identified one or more levels that also store the query key value 306. A record within a corresponding page may then be retrieved and a physical pointer value may be read for processing a storage access request. In the illustrated example, the query key value 27 is within the range of keys 16 to 31. The page IDs and level IDs stored in the corresponding entry are conveyed with the query key value to the mapping table.

Figure 8:
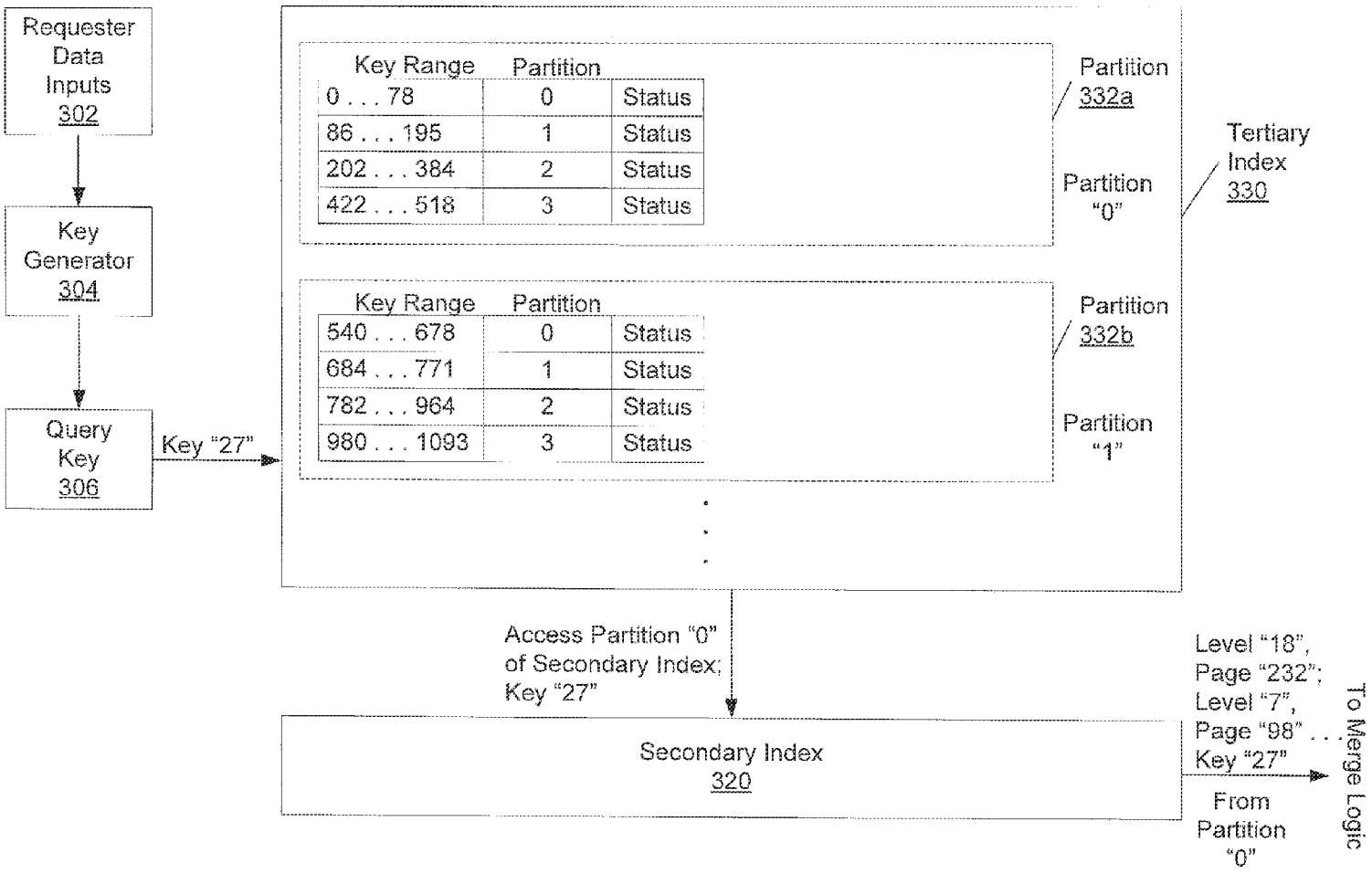
FIG. 8 is a generalized block diagram of one embodiment of a tertiary index accessing a mapping table.

Referring now to FIG. 8, a generalized block diagram of one embodiment of a tertiary index used to access a mapping table is shown. Circuit and logic portions corresponding to those of FIG. 4 are numbered identically. As described earlier, the primary index 310 shown in FIG. 3 may be too large to store in RAM 172 or memory medium 130. In addition, as the mapping table 340 grows, the secondary index 320 may also become too large to store in these memories. Therefore, a tertiary index 330 may be accessed prior to the secondary index 320, which may still be faster than accessing the primary index 310.

The tertiary index 330 may provide a more coarse level of granularity than the secondary index 320 of location identification of data stored in the storage devices 176a-176m. Therefore, the tertiary index 330 may be smaller than the portion of the secondary index 320 to which it corresponds. It is noted that each of the primary index 310, the secondary index 320, the tertiary index 330, and so forth, may be stored in a compressed format. The compressed format chosen may be a same compressed format used to store information within the mapping table 340.

In one embodiment, the tertiary index 330 may include multiple partitions, such as partitions 332a, 332b and so forth. The tertiary index 330 may be accessed with a query key value 306. In the illustrated example, a query key value 306 of "27" is found to be between a range of key values from 0 to 78. A first entry in the tertiary index 330 corresponds to this key value range. A column in the tertiary index 330 may indicate which partition to access within the secondary index 320. In the illustrated example, a key value range of 0 to 78 corresponds to partition 0 within the secondary index 320.

It is also noted a filter (not shown) may be accessed to determine if a query key value is not within any one of the indexes 310-330. This filter may be a probabilistic data structure that determines whether an element is a member of a set. False positives may be possible, but false negatives may not be possible. One example of such a filter is a Bloom filter. If an access of such a filter determines a particular value is not in the full index 142, then no query is sent to the storage. If an access of the filter determines the query key value is in a corresponding index, then it may be unknown whether a corresponding physical pointer value is stored in the storage devices 176a-176m.

In addition to the above, in various embodiments one or more overlay tables may be used to modify or elide tuples provided by the mapping table in response to a query. Such overlay tables may be used to apply filtering conditions for use in responding to accesses to the mapping table or during flattening operations when a new level is created. In some embodiments, the overlay table may be organized as time ordered levels in a manner similar to the mapping table described above. In other embodiments, they be organized differently. Keys for the overlay table need not match the keys for the underlying mapping table. For example, an overlay table may contain a single entry stating that a particular volume has been deleted or is otherwise inaccessible (e.g., there is no natural access path to query this tuple), and that a response to a query corresponding to a tuple that refers to that volume identifier is instead invalid. In another example, an entry in the overlay table may indicate that a storage location has been freed, and that any tuple that refers to that storage location is invalid, thus invalidating the result of the lookup rather than the key used by the mapping table. In some embodiments, the overlay table may modify fields in responses to queries to the underlying mapping table. In some embodiments, a key range (range of key values) may be used to efficiently identify multiple values to which the same operation (eliding or modification) is applied. In this manner, tuples may (effectively) be "deleted" from the mapping table by creating an "elide" entry in the overlay table and without modifying the mapping table. In this case, the overlay table may include keys with no associated non-key data fields.

Figure 9:
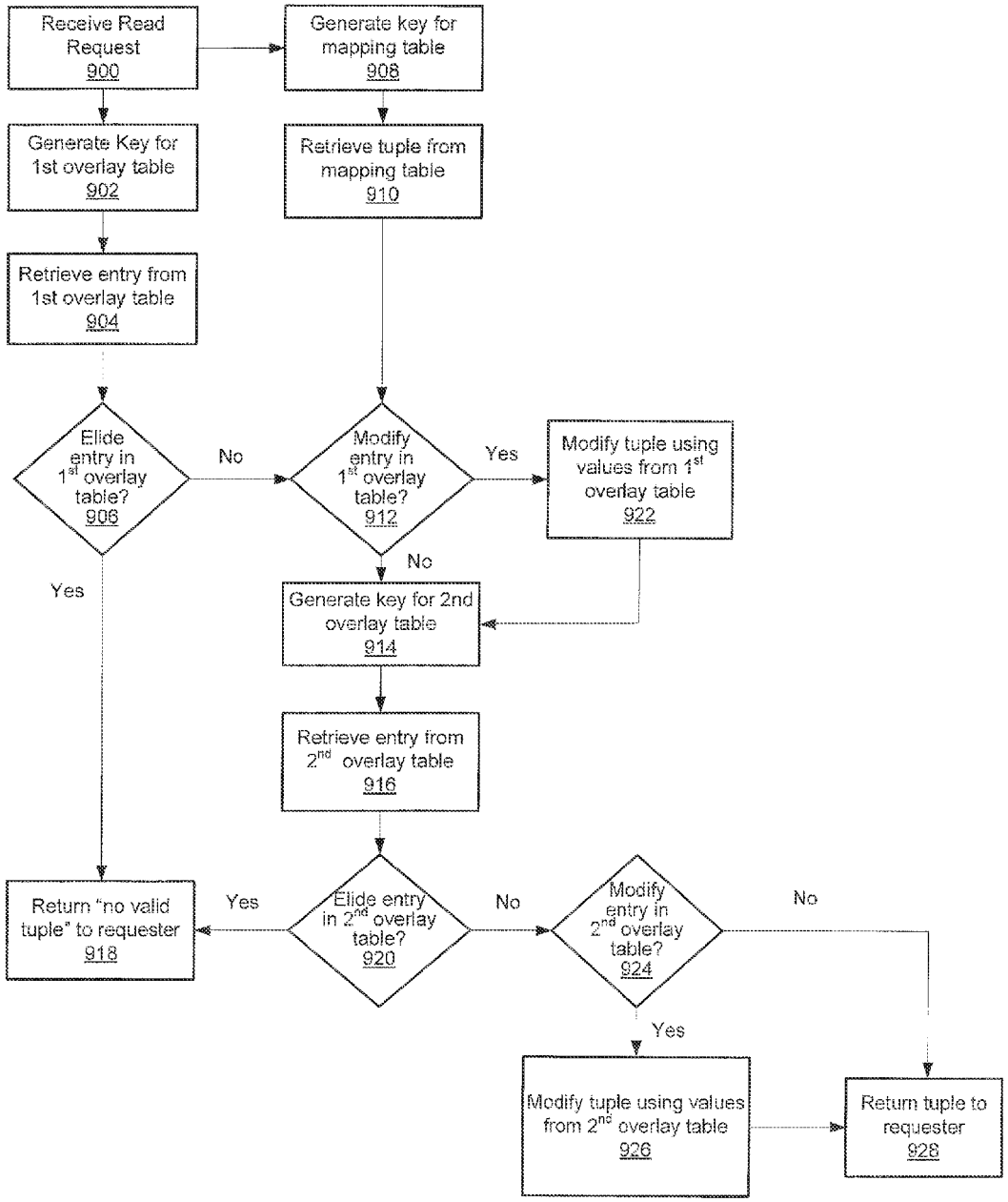
FIG. 9 illustrates one embodiment of a method that utilizes overlay tables.

Turning now to FIG. 9, one embodiment of a method for processing a read request in a system including mapping and overlay tables is shown. Responsive to a read request being received (block 900), a mapping table key (block 908) and first overlay table key (block 902) corresponding to the request are generated. In this example, access to the overlay and mapping tables is shown as occurring concurrently. However, in other embodiments, accesses to the tables may be performed non-concurrently (e.g., sequentially or otherwise separate in time) in any desired order. Using the key generated for the mapping table, a corresponding tuple may be retrieved from the mapping table (block 910). If the first overlay table contains an "elide" entry corresponding to the overlay table key (conditional block 906), any tuple found in the mapping table is deemed invalid and an indication to this effect may be returned to the requester. On the other hand, if the overlay table contains a "modify" entry corresponding to the overlay table key (conditional block 912), the values in the first overlay table entry may be used to modify one or more fields in the tuple retrieved from the mapping table (block 922). Once this process is done, a second overlay table key is generated (block 914) based on the tuple from the mapping table (whether modified or not) and a second lookup is done in a second overlay table (block 916) which may or may not be the same table as the first overlay table. If an "elide" entry is found in the second overlay table (conditional block 920), the tuple from the mapping table is deemed invalid (block 918). If a "modify" entry is found in the second overlay table (conditional block 924), one or more fields of the tuple from the mapping table may be modified (block 926). Such modification may include dropping a tuple, normalizing a tuple, or otherwise. The modified tuple may then be returned to the requester. If the second overlay table does not contain a modify entry (conditional block 924), the tuple may be returned to the requester unmodified. In some embodiments, at least some portions of the overlay table(s) may be cached to provide faster access to their contents. In various embodiments, a detected elide entry in the first overlay table may serve to short circuit any other corresponding lookups (e.g., blocks 914, 916, etc.). In other embodiments, accesses may be performed in parallel and "raced." Numerous such embodiments are possible and are contemplated.

Figure 10:
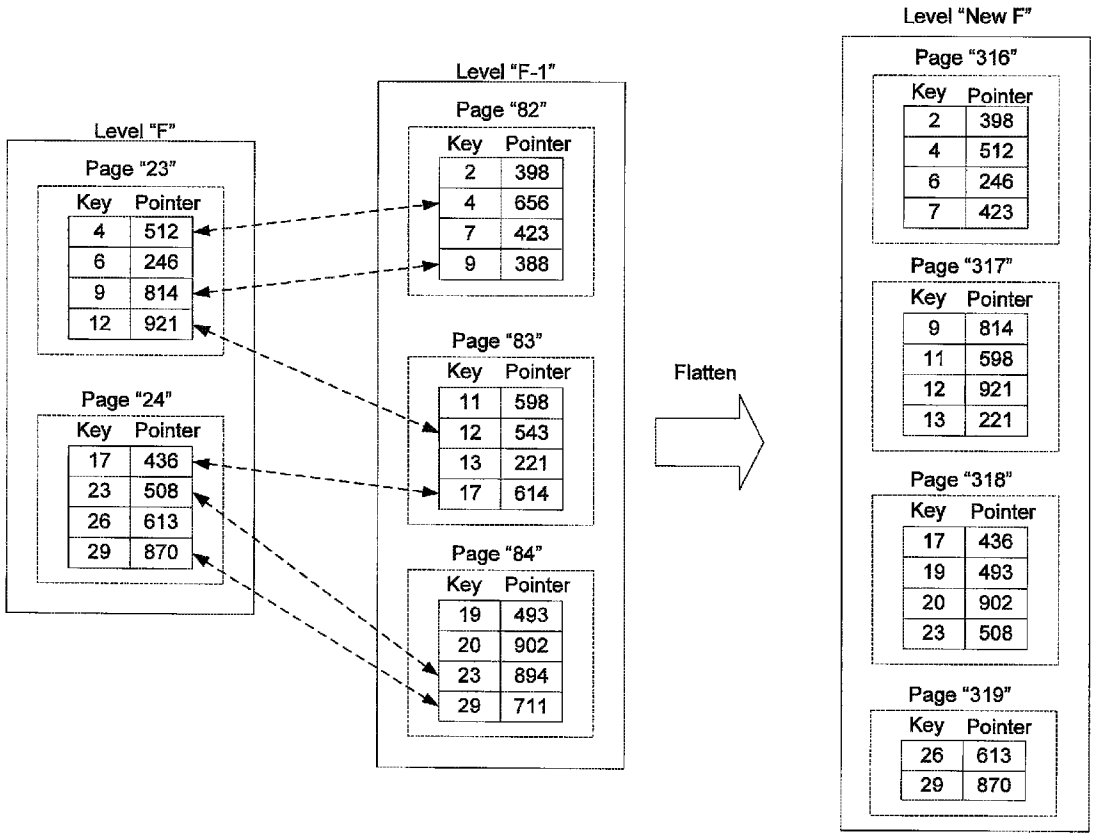
FIG. 10 is a generalized block diagram of one embodiment of a flattening operation for levels within a mapping table.

Turning now to FIG. 10, a generalized block diagram of one embodiment of a flattening operation for levels within a mapping table is shown. In various embodiments, a flattening operation may be performed in response to detecting one or more conditions. For example, over time as the mapping table 340 grows and accumulates levels due to insertions of new records, the cost of searching more levels for a query key value may become undesirably high. In order to constrain the number of levels to search, multiple levels may be flattened into a single new level. For example, two or more levels which are logically adjacent or contiguous in time order may be chosen for a flattening operation. Where two or more records correspond to a same key value, the youngest record may be retained while the others are not included in the new "flattened" level. In such an embodiment, the newly flattened level will return a same result for a search for a given key value as would be provided by a search of the corresponding multiple levels. Since the results of searches in the new flattened level do not change as compared to the two or more levels it replaces, the flattening operation need not be synchronized with update operations to the mapping table. In other words, flattening operations on a table may be performed asynchronously with respect to updates to the table.

As previously noted, older levels are fixed in the sense that their mappings are not modified (i.e., a mapping from A to B remains unchanged). Consequently, modifications to the levels being flattened are not being made (e.g., due to user writes) and synchronization locks of the levels are not required. Additionally, in a node-based cluster environment where each node may store a copy of older levels of the index (e.g., as discussed in relation to FIG. 6), flattening operations may be undertaken on one node without the need to lock corresponding levels in other nodes. Consequently, processing may continue in all nodes while flattening takes place in an asynchronous manner on any of the nodes. At a later point in time, other nodes may flatten levels, or use an already flattened level. In one embodiment, the two or more levels which have been used to form a flattened level may be retained for error recovery, mirroring, or other purposes. In addition to the above, in various embodiments, records that have been elided may not be reinserted in to the new level. The above described flattening may, for example, be performed responsive to detecting the number of levels in the mapping table has reached a given threshold. Alternatively, the flattening may be performed responsive to detecting the size of one or more levels has exceeded a threshold. Yet another condition that may be considered is the load on the system. The decision of whether to flatten the levels may consider combinations of these conditions in addition to considering them individually. The decision of whether to flatten may also consider both the present value for the condition as well as a predicted value for the condition in the future. Other conditions for which flattening may be performed are possible and are contemplated.

In the illustrated example, the records are shown simply as key and pointer pairs. The pages are shown to include four records for ease of illustration. A level "F" and its next contiguous logical neighbor, level "F−1" may be considered for a flattening operation. Level "F" may be younger than Level "F−1". Although two levels are shown to be flattened here, it is possible and contemplated that three or more levels may be chosen for flattening. In the example shown, Level "F−1" may have records storing a same key value found in Level "F". Bidirectional arrows are used to identify the records storing a same key value across the two contiguous levels.

The new Level "New F" includes a key corresponding to the duplicate key values found in Level "F" and Level "F−1". In addition, the new Level "New F" includes a pointer value corresponding to the youngest (or younger in this case) record of the records storing the duplicate key value. For example, each of Level "F" and Level "F−1" includes a record storing the key value 4. The younger record is in Level "F" and this record also stores the pointer value 512. Accordingly, the Level "F−1" includes a record storing the key value 4 and also the pointer value 512, rather than the pointer value 656 found in the older Level "F−1". Additionally, the new Level "New F" includes records with unique key values found between Level "F" and Level "F−1". For example, the Level "F−1" includes records with the key and pointer pair of 6 and 246 found in Level "F" and the key and pointer pair of 2 and 398 found in Level "F−1". As shown, each of the pages within the levels is sorted by key value.

As noted above, in various embodiments an overlay table may be used to modify or elide tuples corresponding to key values in the underlying mapping table. Such an overlay table(s) may be managed in a manner similar to that of the mapping tables. For example, an overlay table may be flattened and adjacent entries merged together to save space. Alternatively, an overlay table may be managed in a manner different from that used to manage mapping tables. In some embodiments, an overlay table may contain a single entry that refers to a range of overlay table keys. In this way, the size of the overlay table can be limited. For example, if the mapping table contains k valid entries, the overlay table (after flattening) need contain no more than k+1 entries marking ranges as invalid, corresponding to the gaps between valid entries in the mapping table. Accordingly, the overlay table may used to identify tuples that may be dropped from the mapping table in a relatively efficient manner. In addition to the above, while the previous discussion describes using overlay table to elide or modify responses to requests from the mapping table(s), overlay tables may also be used to elide or modify values during flattening operations of the mapping tables. Accordingly, when a new level is created during a flattening operation of a mapping table, a key value that might otherwise be inserted into the new level may be elided. Alternatively, a value may be modified before insertion in the new level. Such modifications may result in a single record corresponding to a given range of key values in the mapping table being replaced (in the new level) with multiple records—each corresponding to a subrange of the original record. Additionally, a record may be replaced with a new record that corresponds to a smaller range, or multiple records could be replaced by a single record whose range covers all ranges of the original records. All such embodiments are contemplated.

Figure 11:
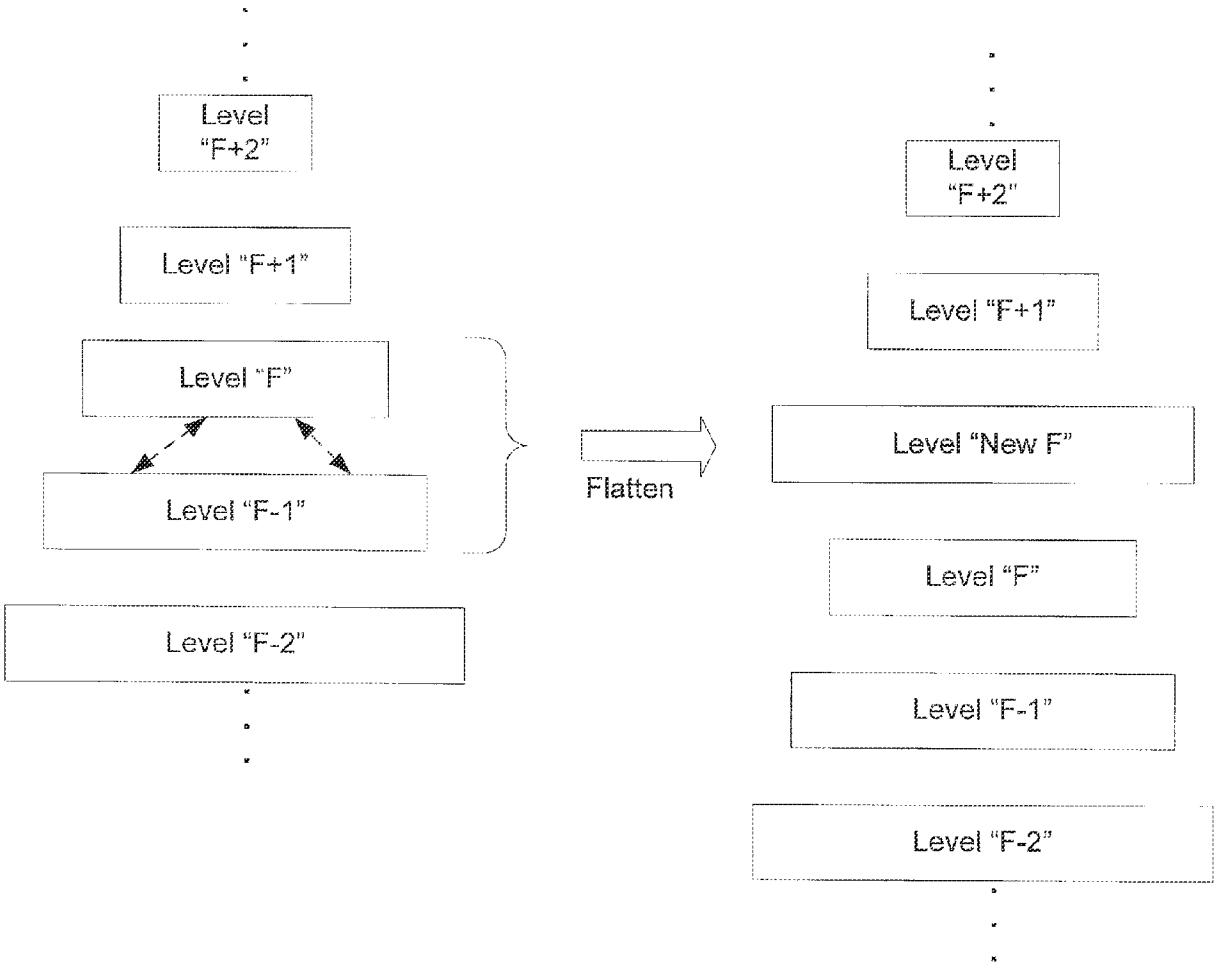
FIG. 11 is a generalized block diagram of another embodiment of a flattening operation for levels within a mapping table.

Referring now to FIG. 11, a generalized block diagram of an embodiment of a flattening operation for levels within a mapping table is shown. As previously discussed, levels may be time ordered. In the illustrated example, a Level "F" comprising one or more indexes and corresponding mappings is logically located above older Level "F−1". Also, Level "F" is located logically below younger Level "F+1". Similarly, Level "F−2" is logically located above younger Level "F−1" and Level "F+2" is logically located below older Level "F+1". In one example, levels "F" and "F−1" may be considered for a flattening operation. Bidirectional arrows are used to illustrate there are records storing same key values across the two contiguous levels.

As described earlier, a new Level "New F" includes key values corresponding to the duplicate key values found in Level "F" and Level "F−1". In addition, the new Level "New F" includes a pointer value corresponding to the youngest (or younger in this case) record of the records storing the duplicate key value. Upon completion of the flattening operation, the Level "F" and the Level "F−1" may not yet be removed from the mapping table. Again, in a node-based cluster, each node may verify it is ready to utilize the new single level, such as Level "New F", and no longer use the two or more levels it replaces (such as Level "F" and Level "F−1"). This verification may be performed prior to the new level becoming the replacement. In one embodiment, the two or more replaced levels, such as Level "F" and Level "F−1", may be kept in storage for error recovery, mirroring, or other purposes. In order to maintain the time ordering of the levels and their mappings, the new flattened level F is logically placed below younger levels (e.g., level F+1) and above the original levels that it replaces (e.g., level F and level F−1).

Figure 12:
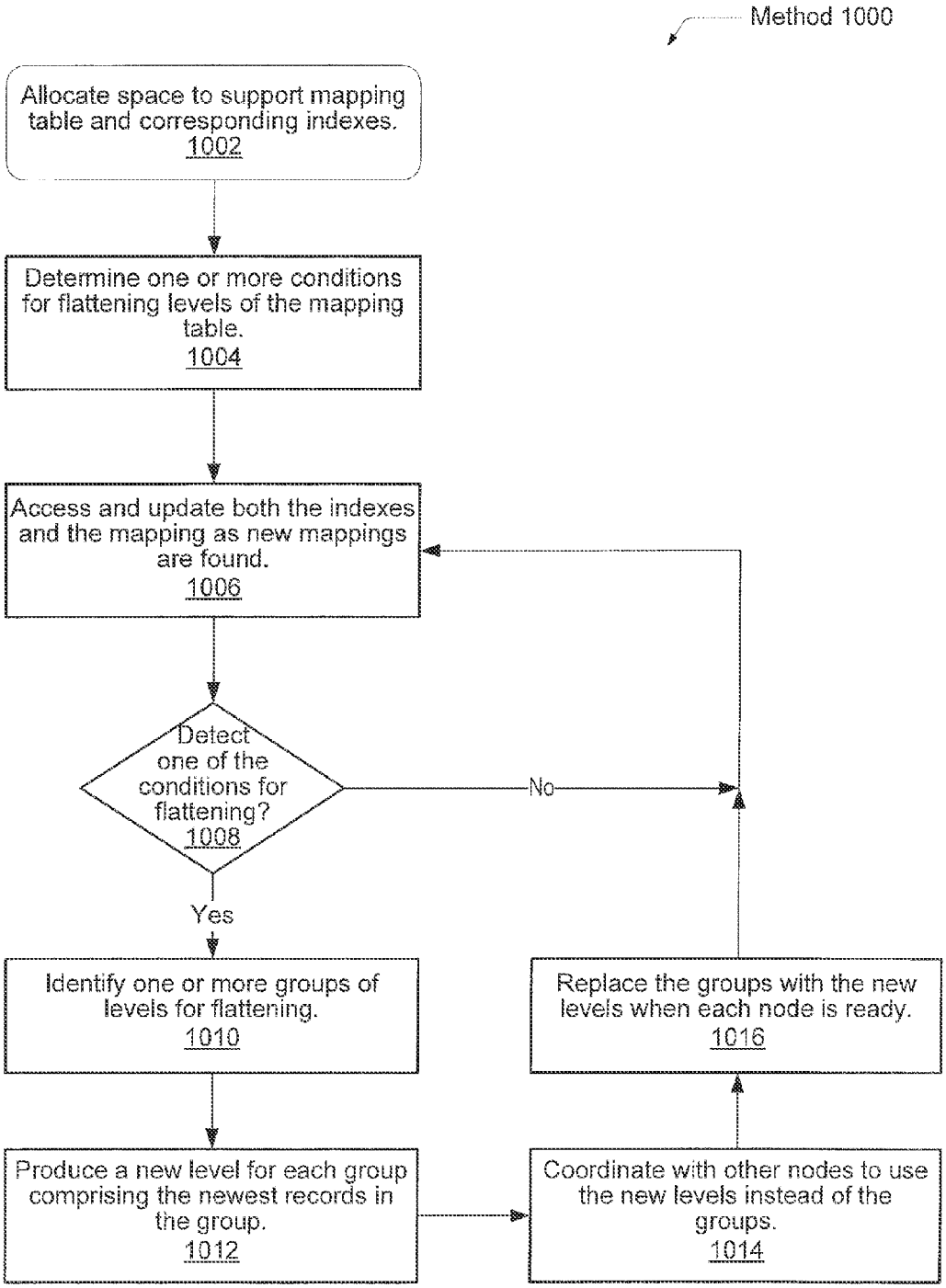
FIG. 12 is a generalized flow diagram illustrating one embodiment of a method for flattening levels within a mapping table.

Turning now to FIG. 12, one embodiment of a method 1000 for flattening levels within a mapping table is shown. The components embodied in the network architecture 100 and the mapping table 340 described above may generally operate in accordance with method 1000. For purposes of discussion, the steps in this embodiment are shown in sequential order. However, some steps may occur in a different order than shown, some steps may be performed concurrently, some steps may be combined with other steps, and some steps may be absent in another embodiment.

In block 1002, storage space is allocated for a mapping table and corresponding indexes. In block 1004, one or more conditions are determined for flattening two or more levels within the mapping table. For example, a cost of searching a current number of levels within the mapping table may be greater than a cost of performing a flattening operation. Additionally, a cost may be based on at least one of the current (or predicted) number of levels in the structure to be flattened, the number of entries in one or more levels, the number of mapping entries that would be elided or modified, and the load on the system. Cost may also include a time to perform a corresponding operation, an occupation of one or more buses, storage space used during a corresponding operation, a number of duplicate entries in a set of levels has reached some threshold, and so forth. In addition, a count of a number of records within each level may be used to estimate when a flattening operation performed on two contiguous levels may produce a new single level with a number of records equal to twice a number of records within a next previous level. These conditions taken singly or in any combination, and others, are possible and are contemplated.

In block 1006, the indexes and the mapping table are accessed and updated as data is stored and new mappings are found. A number of levels within the mapping table increases as new records are inserted into the mapping table. If a condition for flattening two or more levels within the mapping table is detected (conditional block 1008), then in block 1010, one or more groups of levels are identified for flattening. A group of levels may include two or more levels. In one embodiment, the two or more levels are contiguous levels. Although the lowest levels, or the oldest levels, may be the best candidates for flattening, a younger group may also be selected.

In block 1012, for each group a new single level comprising the newest records within a corresponding group is produced. In the earlier example, the new single Level "New F" includes the youngest records among the Level "F" and the Level "F+1".In block 1014, in a node-based cluster, an acknowledgment may be requested from each node within the cluster to indicate a respective node is ready to utilize the new levels produced by the flattening operation. When each node acknowledges that it can utilize the new levels, in block 1016, the current levels within the identified groups are replaced with the new levels. In other embodiments, synchronization across nodes is not needed. In such embodiments, some nodes may begin using a new level prior to other nodes. Further, some nodes may continue to use the original level even after newly flattened levels are available. For example, a particular node may have original level data cached and used that in preference to using non-cached data of a newly flattened level. Numerous such embodiments are possible and are contemplated.

Figure 13:
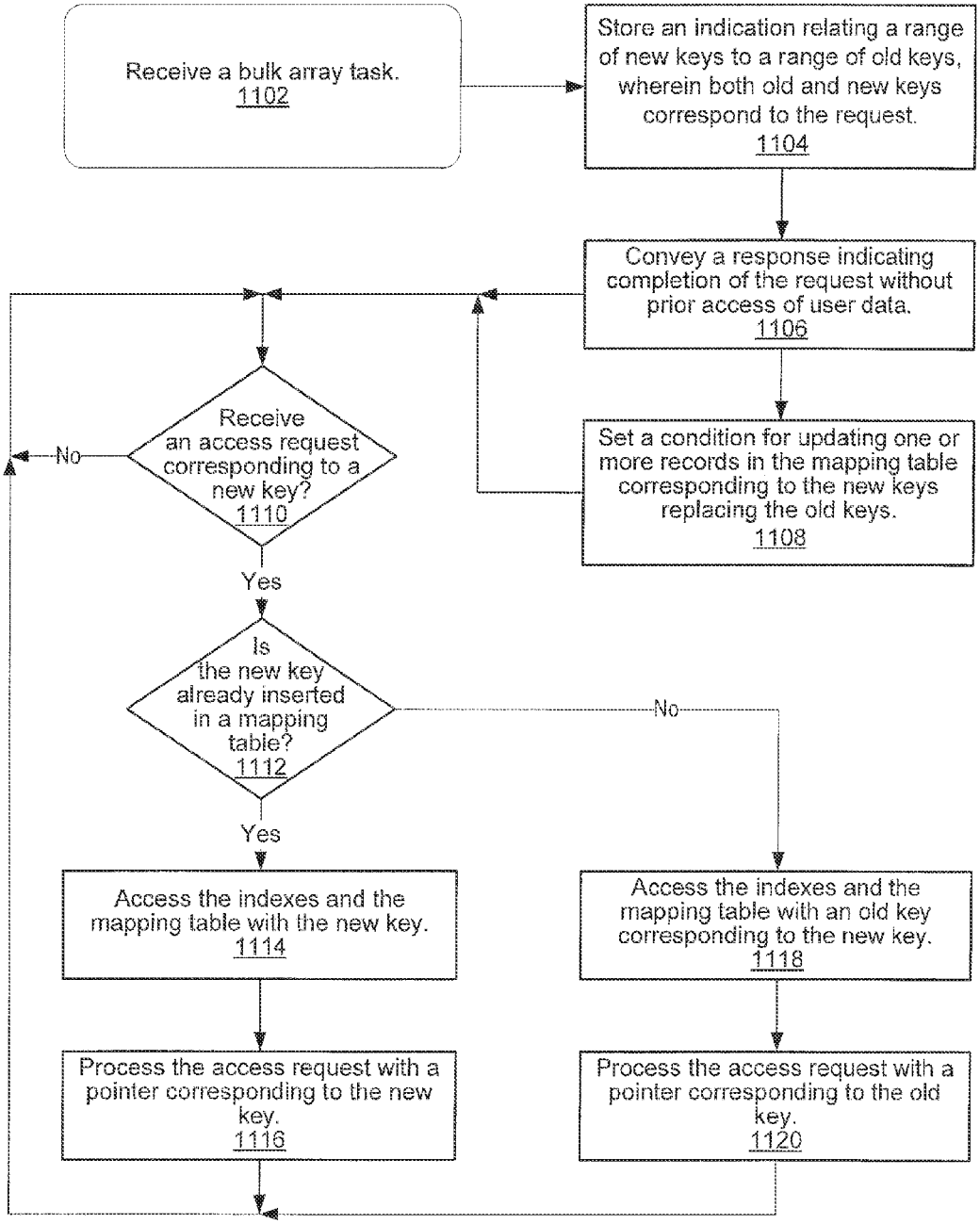
FIG. 13 is a generalized flow diagram illustrating one embodiment of a method for efficiently processing bulk array tasks within a mapping table.

Turning now to FIG. 13, one embodiment of a method 1100 for efficiently processing bulk array tasks within a mapping table is shown. Similar to the other described methods, the components embodied in the network architecture 100 and the mapping table 340 described above may generally operate in accordance with method 1100. In addition, the steps in this embodiment are shown in sequential order. However, some steps may occur in a different order than shown, some steps may be performed concurrently, some steps may be combined with other steps, and some steps may be absent in another embodiment.

Storing the information in a compressed format within the mapping table may enable fine-grained mapping, which may allow direct manipulation of mapping information within the mapping table as an alternative to common bulk array tasks. The direct map manipulation may reduce I/O network and bus traffic. As described earlier, Flash memory has a low "seek time", which allows a number of dependent read operations to occur in less time than a single operation from a spinning disk. These dependent reads may be used to perform online fine-grained mappings to integrate space-saving features like compression and deduplication. In addition, these dependent read operations may allow the storage controller 174 to perform bulk array tasks entirely within a mapping table instead of accessing (reading and writing) the user data stored within the storage devices 176a-176m.

In block 1102, a large or bulk array task is received. For example, a bulk copy or move request may correspond to a backup of a dozens or hundreds of virtual machines in addition to enterprise application data being executed and updated by the virtual machines. The amount of data associated with the received request associated with a move, branch, clone, or copy of all of this data may be as large as 16 gigabytes (GB) or larger. If the user data was accessed to process this request, a lot of processing time may be spent on the request and system performance decreases. In addition, a virtualized environment typically has less total input/output (I/O) resources than a physical environment.

In block 1104, the storage controller 174 may store an indication corresponding to the received request that relates a range of new keys to a range of old keys, wherein both the ranges of keys correspond to the received request. For example, if the received request is to copy of 16 GB of data, a start key value and an end key value corresponding to the 16 GB of data may be stored. Again, each of the start and the end key values may include a volume ID, a logical or virtual address within the received request, a snapshot ID, a sector number and so forth. In one embodiment, this information may be stored separate from the information stored in the indexes, such as the primary index 310, the secondary index 320, the tertiary index 330, and so forth. However, this information may be accessed when the indexes are accessed during the processing of later requests.

In block 1106, the data storage controller 174 may convey a response to a corresponding client of the client computer systems 110a-110c indicating completion of the received request without prior access of user data. Therefore, the storage controller 174 may process the received request with low or no downtime and with no load on processor 122.

In block 1108, the storage controller 174 may set a condition, an indication, or a flag, or buffer update operations, for updating one or more records in the mapping table corresponding to the new keys replacing the old keys in the mapping table. For both a move request and a copy request, one or more new records corresponding to the new keys may be inserted in the mapping table. The keys may be inserted in a created new highest level as described earlier. For a move request, one or more old records may be removed from the mapping table after a corresponding new record has been inserted in the mapping table. Either immediately or at a later time, the records in the mapping table are actually updated.

For a zeroing or an erase request, an indication may be stored that a range of key values now corresponds to a series of binary zeroes. Additionally, as discussed above, overlay tables may be used to identify key values which are not (or no longer) valid. The user data may not be overwritten. For an erase request, the user data may be overwritten at a later time when the "freed" storage locations are allocated with new data for subsequent store (write) requests. For an externally-directed defragmentation request, contiguous addresses may be chosen for sector reorganization, which may benefit applications executed on a client of the client computer systems 110a-110c.

If the storage controller 174 receives a data storage access request corresponding to one of the new keys (conditional block 1110), and the new key has already been inserted in the mapping table (conditional block 1112), then in block 1114, the indexes and the mapping table may be accessed with the new key. For example, either the primary index 310, the secondary index 320, or the tertiary index 330 may be accessed with the new key. When one or more pages of the mapping table are identified by the indexes, these identified pages may then be accessed. In block 1116, the storage access request may be serviced with a physical pointer value found in the mapping table that is associated with the new key.

If the storage controller 174 receives a data storage access request corresponding to one of the new keys (conditional block 1110), and the new key has not already been inserted in the mapping table (conditional block 1112), then in block 1118, the indexes and the mapping table may be accessed with a corresponding old key. The storage holding the range of old keys and the range of new keys may be accessed to determine the corresponding old key value. When one or more pages of the mapping table are identified by the indexes, these identified pages may then be accessed. In block 1120, the storage access request may be serviced with a physical pointer value found in the mapping table that is associated with the old key.

Figure 14:
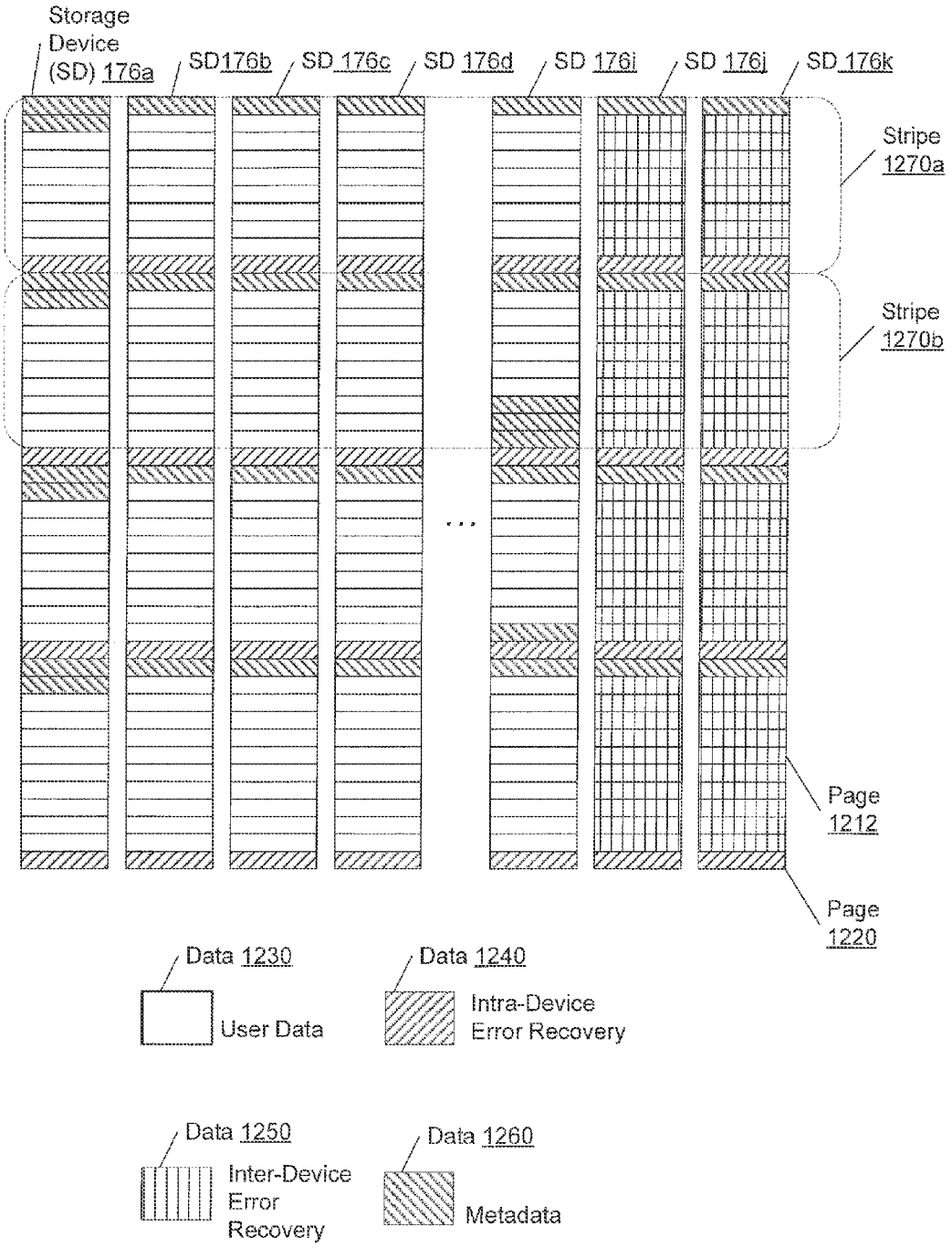
FIG. 14 is a generalized block diagram illustrating an embodiment of a data layout architecture within a storage device.

Turning now to FIG. 14, a generalized block diagram illustrating an embodiment of a data layout architecture within a storage device is shown. In one embodiment, the data storage locations within the storage devices 176a-176m may be arranged into redundant array of independent devices (RAID) arrays. As shown, different types of data may be stored in the storage devices 176a-176k according to a data layout architecture. In one embodiment, each of the storage devices 176a-176k is an SSD. An allocation unit within an SSD may include one or more erase blocks within an SSD.

The user data 1230 may be stored within one or more pages included within one or more of the storage devices 176a-176k. Within each intersection of a RAID stripe and one of the storage devices 176a-176k, the stored information may be formatted as a series of logical pages. Each logical page may in turn include a header and a checksum for the data in the page. When a read is issued it may be for one or more logical pages and the data in each page may be validated with the checksum. As each logical page may include a page header that contains a checksum for the page (which may be referred to as a "media" checksum), the actual page size for data may be smaller than one logical page. In some embodiments, for pages storing inter-device recovery data 1250, such as RAID parity information, the page header may be smaller, so that the parity page protects the page checksums in the data pages. In other embodiments, the checksum in parity pages storing inter-device recovery data 1250 may be calculated so that the checksum of the data page checksums is the same as the checksum of the parity page covering the corresponding data pages. In such embodiments, the header for a parity page need not be smaller than the header for a data page.

The inter-device ECC data 1250 may be parity information generated from one or more pages on other storage devices holding user data. For example, the inter-device ECC data 1250 may be parity information used in a RAID data layout architecture. Although the stored information is shown as contiguous logical pages in the storage devices 176a-176k, it is well known in the art the logical pages may be arranged in a random order, wherein each of the storage devices 176a-176k is an SSD.

The intra-device ECC data 1240 may include information used by an intra-device redundancy scheme. An intra-device redundancy scheme utilizes ECC information, such as parity information, within a given storage device. This intra-device redundancy scheme and its ECC information corresponds to a given device and may be maintained within a given device, but is distinct from ECC that may be internally generated and maintained by the device itself. Generally speaking, the internally generated and maintained ECC of the device is invisible to the system within which the device is included.

The intra-device ECC data 1240 may also be referred to as intra-device error recovery data 1240. The intra-device error recovery data 1240 may be used to protect a given storage device from latent sector errors (LSEs). An LSE is an error that is undetected until the given sector is accessed. Therefore, any data previously stored in the given sector may be lost. A single LSE may lead to data loss when encountered during RAID reconstruction after a storage device failure. The term "sector" typically refers to a basic unit of storage on a HDD, such as a segment within a given track on the disk. Here, the term "sector" may also refer to a basic unit of allocation on a SSD. Latent sector errors (LSEs) occur when a given sector or other storage unit within a storage device is inaccessible. A read or write operation may not be able to complete for the given sector. In addition, there may be an uncorrectable error-correction code (ECC) error.

The intra-device error recovery data 1240 included within a given storage device may be used to increase data storage reliability within the given storage device. The intra-device error recovery data 1240 is in addition to other ECC information that may be included within another storage device, such as parity information utilized in a RAID data layout architecture.

Within each storage device, the intra-device error recovery data 1240 may be stored in one or more pages. As is well known by those skilled in the art, the intra-device error recovery data 1240 may be obtained by performing a function on chosen bits of information within the user data 1230. An XOR-based operation may be used to derive parity information to store in the intra-device error recovery data 1240. Other examples of intra-device redundancy schemes include single parity check (SPC), maximum distance separable (MDS) erasure codes, interleaved parity check codes (IPC), hybrid SPC and MDS code (MDS+SPC), and column diagonal parity (CDP). The schemes vary in terms of delivered reliability and overhead depending on the manner the data 1240 is computed.

In addition to the above described error recovery information, the system may be configured to calculate a checksum value for a region on the device. For example, a checksum may be calculated when information is written to the device. This checksum is stored by the system. When the information is read back from the device, the system may calculate the checksum again and compare it to the value that was stored originally. If the two checksums differ, the information was not read properly, and the system may use other schemes to recover the data. Examples of checksum functions include cyclical redundancy check (CRC), MD5, and SHA-1.

An erase block within an SSD may comprise several pages. A page may include 4 KB of data storage space. An erase block may include 64 pages, or 256 KB. In other embodiments, an erase block may be as large as 1 megabyte (MB), and include 256 pages. An allocation unit size may be chosen in a manner to provide both sufficiently large sized units and a relatively low number of units to reduce overhead tracking of the allocation units. In one embodiment, one or more state tables may maintain a state of an allocation unit (allocated, free, erased, error), a wear level, and a count of a number of errors (correctable and/or uncorrectable) that have occurred within the allocation unit. In one embodiment, an allocation unit is relatively small compared to the total storage capacity of an SSD. Other amounts of data storage space for pages, erase blocks and other unit arrangements are possible and contemplated.

The metadata 1260 may include page header information, RAID stripe identification information, log data for one or more RAID stripes, and so forth. In various embodiments, the single metadata page at the beginning of each stripe may be rebuilt from the other stripe headers. Alternatively, this page could be at a different offset in the parity shard so the data can be protected by the inter-device parity. In one embodiment, the metadata 1260 may store or be associated with particular flag values that indicate this data is not to be deduplicated.

In addition to inter-device parity protection and intra-device parity protection, each of the pages in storage devices 176a-176k may comprise additional protection such as a checksum stored within each given page. The checksum (8 byte, 4 byte, or otherwise) may be placed inside a page after a header and before the corresponding data, which may be compressed. For yet another level of protection, data location information may be included in a checksum value. The data in each of the pages may include this information. This information may include both a virtual address and a physical address. Sector numbers, data chunk and offset numbers, track numbers, plane numbers, and so forth may be included in this information as well. This mapping information may also be used to rebuild the address translation mapping table if the content of the table is lost.

In one embodiment, each of the pages in the storage devices 176a-176k stores a particular type of data, such as the data types 1230-1260. Alternatively, pages may store more than one type of data. The page header may store information identifying the data type for a corresponding page. In one embodiment, an intra-device redundancy scheme divides a device into groups of locations for storage of user data. For example, a division may be a group of locations within a device that correspond to a stripe within a RAID layout. In the example shown, only two stripes, 1270a and 1270b, are shown for ease of illustration.

In one embodiment, a RAID engine within the storage controller 174 may determine a level of protection to use for storage devices 176a-176k. For example, a RAID engine may determine to utilize RAID double parity for the storage devices 176a-176k. The inter-device redundancy data 1250 may represent the RAID double parity values generated from corresponding user data. In one embodiment, storage devices 176j and 176k may store the double parity information. It is understood other levels of RAID parity protection are possible and contemplated. In addition, in other embodiments, the storage of the double parity information may rotate between the storage devices rather than be stored within storage devices 176j and 176k for each RAID stripe. The storage of the double parity information is shown to be stored in storage devices 176j and 176k for ease of illustration and description. Although each of the storage devices 176a-176k comprises multiple pages, only page 1212 and page 1220 are labeled for ease of illustration.

Figure 15:
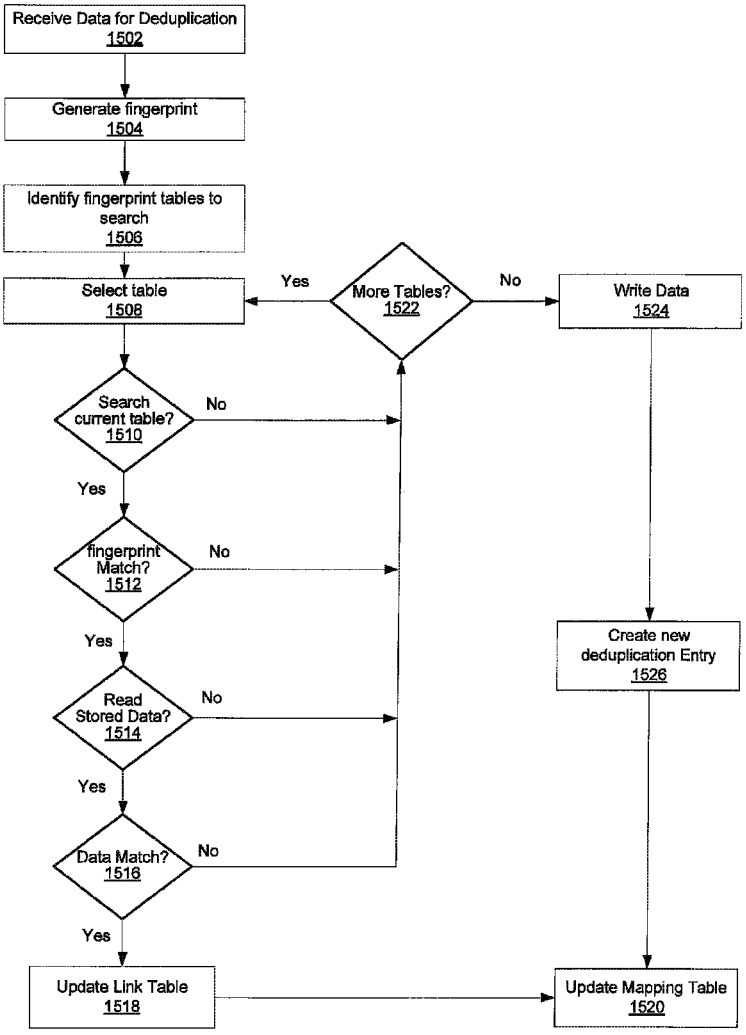
FIG. 15 illustrates one embodiment of a method for performing deduplication.

Referring now to FIG. 15, one embodiment of a method for performing deduplication is shown. The components embodied in the network architecture 100 described above may generally operate in accordance with method. For purposes of discussion, the steps in this embodiment are shown in sequential order. However, some steps may occur in a different order than shown, some steps may be performed concurrently, some steps may be combined with other steps, and some steps may be absent in another embodiment.

In block 1502, one or more given data components for an operation are received. Such data components may correspond to a received write request, a garbage collection operation, or otherwise. In various embodiments, data sent from one of the client computer systems 110a-110c may be in the form of a data stream, such as a byte stream. As is well known to those skilled in the art, a data stream may be divided into a sequence of fixed-length or variable-length data components, or "chunks", where a "chunk" is a sub-file content-addressable unit of data. A chunking algorithm may perform the dividing of the data stream. In various embodiments, a table may be used to map data corresponding to particular file types to a most appropriate chunking method. In some cases a file's type may be determined by referring to its file name extension. Alternatively, in cases where a file type corresponding to data is not indicated or otherwise directly known, guesses as to the type of file to which data corresponds may be made and used to inform the chunking algorithm used. For example, a guess as to file type could be based on the data in the block or the LUN in which the block is stored. Other methods for ascertaining a file type to which data corresponds are possible and are contemplated. The chunks later may be stored in one of the data storage arrays 120a-120b to allow for sharing of the chunks. Numerous such embodiments are possible and are contemplated.

Subsequent to receiving the data, a particular fingerprint algorithm 1504 may be chosen to produce a data component fingerprint value for a given data component. For example, a hash function, such as some or all of the output bits from MD5, SHA1, SHA-256, cyclic-redundancy code (CRC), or otherwise, may be used to calculate a corresponding fingerprint. Generally speaking, in order to know if a given data component corresponding to a received write request may already be stored in one of the data storage arrays 120a-120b, a calculated fingerprint for the given data component may be compared to fingerprints of data components stored in one or more of the data storage arrays 120a-120b. If there is no matching fingerprint, there is no copy of the data component already stored on the system. If at least one fingerprint matches, then there may already be a matching data component stored on the system. However, in some embodiments, it is also possible that two non-identical data components have the same fingerprint. Using the generated fingerprint value for a data component, a search may be performed to determine if there is another data component already present in the system that has a matching fingerprint value. In various embodiments, such fingerprint values may be stored in one or more fingerprint tables within the system. Accordingly, a determination as to which of the fingerprint tables to search may be made (block 1506).

Having established which fingerprint tables are to be searched, one of the tables is selected (block 1508) and a decision is made as to whether the selected table is searched (decision block 1510). A number of factors may be considered when deciding whether to search a given table. For example, resource usage and performance issues may be considered. If the table is searched, then a matching fingerprint may be found (decision block 1512). In various embodiments, if a matching fingerprint is found, then the corresponding data already stored in the system may be identical to the received data. However, the matching fingerprint may not be definitive proof that the data itself matches. Such might be the case where fingerprints collide or otherwise. Therefore, if a matching fingerprint is found, then a determination may be made as to whether further verification steps are to be performed. Generally speaking, verifying that data is a match entails reading the stored data (decision block 1514) and comparing the read data to the received data (decision block 1516). If the stored data is already contained in memory, there is generally no need to re-read it from its stored location. If the data matches, then the received data is deemed redundant and a new link is created between the already existing data (e.g., as identified by a physical address) and the transaction corresponding to the received data. For example, a new link may be created between a write transaction virtual address and the already stored data. In one embodiment, both a mapping table and a link table (to be discussed more fully later) may be used for storing such newly identified links.

At various steps in the process (e.g., blocks 1510, 1512, 1514, and 1516), verification of a data match has not been achieved and a determination is made as to whether the search should continue. As noted above, resource and/or performance issues may be considered when making such a determination. If more tables are to be searched (decision block 1522), then one of the tables may be selected (block 1508), and the process repeated. If verification of a data match is not achieved at this time (as in blocks 1516 and 1518), then confirmation that the data is redundant is not made and the received data is written to storage (block 1524). Additionally, a new deduplication entry may be created (block 1526) as well as updating other tables (block 1520) such as an address mapping table or otherwise.

It is noted that while the above discussion describes a process whereby tables to search are determined (block 1506) prior to proceeding, in other embodiments an identification of more than one table may not be made in advance. Rather, identification of a given table for search may be determined one at a time (or only partially) as needed. Alternatively, a combination of such approaches may be used. All such embodiments are contemplated.

In addition to the general method depicted in FIG. 15, additional processes may be included which serve to improve the overall deduplication process. In particular, various attributes may be maintained which are used to identify which fingerprint tables might be searched and whether to search a given identified table. Further, other attributes may be maintained that are used to determine into which fingerprint table(s) a given fingerprint is stored. For example, as will be described in more detail below, fingerprints whose data is expected to be deduplicated more frequently may be maintained in a fingerprint table which has a higher priority for being searched. Alternatively, fingerprints corresponding to data of a given type may be placed in one fingerprint table rather than another. By storing fingerprints within the fingerprint tables in such a manner, system performance and resource usage may be improved.

It is noted that in various embodiments the access to fingerprint tables shown in FIG. 15 may not be performed, such as when a Bloom filter or other mechanism indicates the fingerprint is not present in the fingerprint tables. Additionally, in some embodiments, an address to which a write transaction is directed may correspond to an address range which has known attributes. For example, a received write transaction could be directed to a particular volume which is known to store data unlikely to be deduplicated. For example, data corresponding to a given database may be deemed less likely to be deduplicated, while data corresponding to a virtual machine may be deemed more likely to be deduplicated. For example, a fingerprint table corresponding to a volume including data believed to be more likely to be deduplicated may be larger than would otherwise be the case. In various embodiments, a volume table may include attribute related information that may be used in such a way. In other embodiments, other tables may be used for storing and maintaining such attribute related information. In addition to controlling the selection of fingerprint tables to be searched, limits on the number of accesses to a given storage medium may be made. In addition to utilizing various attributes to limit the fingerprint table search, various conditions such conditions as those related to resource usage and performance may be considered when limiting the fingerprint table search.

In one embodiment, a deduplication table may be partitioned or otherwise comprise multiple fingerprint tables. Each entry within a given table has an associated probability or a range of probabilities of a corresponding data component being deduplicated. In one example, for a received write request, an in-line deduplication operation may access a first fingerprint table with computed fingerprint values corresponding to one or more data components. If the computed fingerprint values are not found within the first fingerprint table, then the in-line deduplication operation may stop and allow a data component to be written to one of the storage devices 176a-176m. In another example, according to a strategy based on the associated attributes, if the computed fingerprint values are not found in the first fingerprint table, then a subsequent access of a second fingerprint table may occur. If the computed fingerprint values are not found in the second fingerprint table, then the in-line deduplication operation may finish for a given data component and allow the given data component to be written to one of the storage devices 176a-176m. In one embodiment, both the first and the second fingerprint tables may be concurrently accessed. Data components written to the storage devices 176a-176m may be deduplicated during a later post-process deduplication operation. In one embodiment, although a post-process deduplication operation may be performed concurrently with a garbage collection operation, the accesses for the post-process deduplication operation may occur similarly as for an in-line deduplication operation. For example, the first fingerprint table may be accessed before a second fingerprint table. In another embodiment, the entries of the fingerprint tables may be accessed concurrently.

Figure 16:
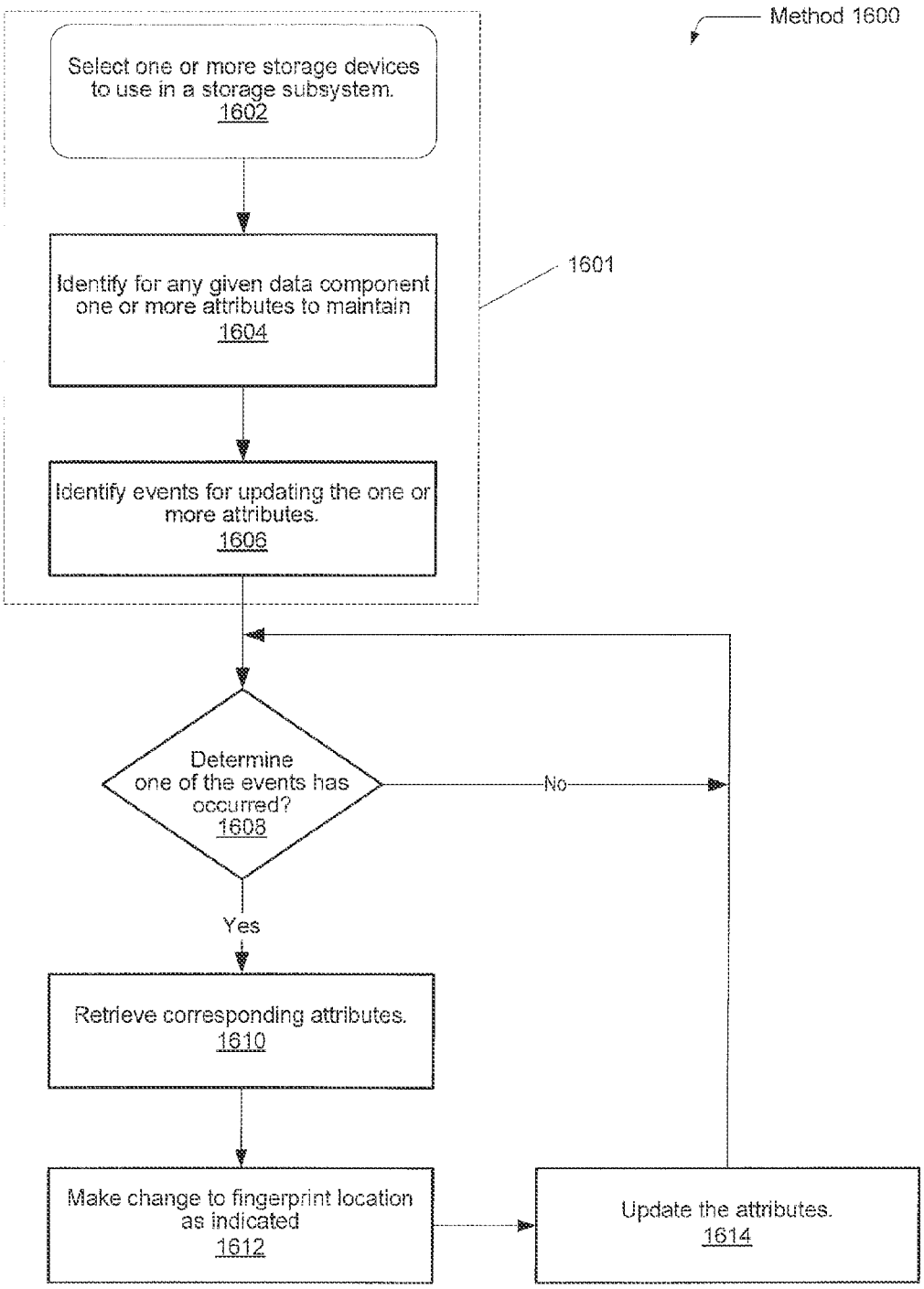
FIG. 16 illustrates one embodiment of a method for maintaining fingerprints in a deduplication table.

As noted above, in various embodiments, attributes may be used to determine where a fingerprint value is stored within multiple fingerprint tables of a larger deduplication table. FIG. 16 illustrates one embodiment of a method 1600 for using such attributes. Block 1601 generally corresponds to the establishment of a strategy to be used for the following steps. This strategy may be determined at system startup and/or dynamically at any time during system operation. In some cases, a change in strategy may result in a change in the nature of the attributes which are maintained. Should such a change in strategy occur, the system may simultaneously maintain data and attributes corresponding to multiple strategies. For example, a change in strategy may affect only subsequently stored data. In other embodiments, data and attributes maintained according to a prior strategy may be rebuilt to conform to a newer strategy. All such embodiments are contemplated. In block 1602, one or more storage devices may be selected for use in a storage subsystem. For example, one or more storage devices 176a-176m within one or more of device groups 173-173m may be chosen for data storage use. In addition, more than one of the storage data arrays 120a-120b may be chosen for this data storage use. An amount of storage space and corresponding address space may be chosen prior to choosing one or more of the storage devices 176a-176m. The data storage space may be used for end-user applications executing on client computer systems 110a-110c, corresponding inter-device parity information used in a RAID architecture, corresponding intra-device redundancy information, header and metadata information, and so forth.

In block 1604, one or more corresponding attributes are identified for a given data component. Examples of such attributes include a number of accesses to the given data component, a data component age, a data component size, a total number of times the given data component has been deduplicated, a number of times the given data component has been deduplicated for a given entry in a deduplication table, an amount and/or type of compression used for the data component, and so forth. In various embodiments, these attributes may be maintained and updated over time. For example, the attributes for a given data component may be updated responsive to an access of the given data component. In some embodiments, the granularity with which such attributes are maintained and/or updated may vary. For example, rather than updating attributes on a per data component basis, attributes corresponding to an identifiable group of data components such as a volume or subvolume may be updated. As described earlier, these maintained attributes may affect storage efficiency.

In block 1606, one or more events for updating the one or more attributes are identified. Examples of such events may include a deduplication operation, receiving a read or a write request, a garbage collection operation, a trimming operation, a secure erase operation, an update of attributes corresponding to neighboring data components, reaching a given time threshold, and so forth. If a given event of the identified events occurs (decision block 1608), one or more attributes corresponding to the given event may be retrieved (block 1610). For example, deduplication of a data component may be detected. In response, attributes associated with the data component may be retrieved (block 1610). If the current algorithm indicates a change in location for a fingerprint, then such a change may be made (block 1612). For example, if a successful deduplication of a data component results in the number of successful deduplications for that block reaching or exceeding a given threshold, then the block may move from being deemed a low(er) deduplicating block to a high(er) deduplicating block. Such a change may in turn lead to entering the fingerprint into a table with a higher deemed probability of deduplication, and potentially removing the fingerprint from the table in which it is currently stored. This may be referred to as "promoting" the fingerprint (entry). Alternatively, an entry corresponding to a block may be "demoted" if deduplication of the block falls below a given threshold. In such a case, a corresponding fingerprint may be removed from its current table and entered into one which is used for fingerprints having a lower (predicted) probability of deduplication. For example, if a given fingerprint table contains the 5% of the total number of stored data components that have the highest probability of being deduplicated, and it is determined (or predicted) that the likelihood of the data corresponding to the entry being deduplicated is not in the top 5%, then the entry may be moved out its current fingerprint table to a different fingerprint table. In addition to making any changes (block 1612), the associated attributes may be updated (block 1614). It is noted that movement of entries between fingerprint tables need not be based on determined probabilities of deduplication. Any desired algorithm for determining which fingerprint table an entry is to be stored may be used.

In addition to moving fingerprints between tables, information stored in a given entry may be removed from all fingerprint tables within a deduplication table. This eviction of an entry may occur if the entry is determined from its associated attributes to not be a probable candidate for deduplication or if the block to which the entry refers is no longer valid. For example, an entry that has not been deduplicated for a given amount of time may be evicted from the deduplication table. This eviction reduces the total size of the deduplication table by removing entries corresponding to a data component that have a relatively low probability of having a duplicate stored in one of the data storage arrays 120a-120b. It is noted that an entry may be removed from the deduplication table even if that entry is the target of multiple virtual block pointers, since such removal may only preclude future deduplications and will not affect deduplications that have already occurred.

In one embodiment, when an entry is evicted from the deduplication table, an indication of the eviction may be written to a corresponding physical location within one of the data storage arrays 120a-120b. For example, a physical location within one of the storage devices 176a-176m that currently stores or is going to store a corresponding data component may be written with the indication. In one embodiment, both the eviction from the deduplication table and the marking with a corresponding indication in a data physical storage location may occur during a write request, a garbage collection operation, a trim operation, a secure erase operation, and so forth. In such cases, both the entries in the fingerprint tables and the data components stored within the storage devices 176a-176m may be already moving or updating during these operations. Therefore, the marking of the indication may not introduce a new write operation.

Figure 17:
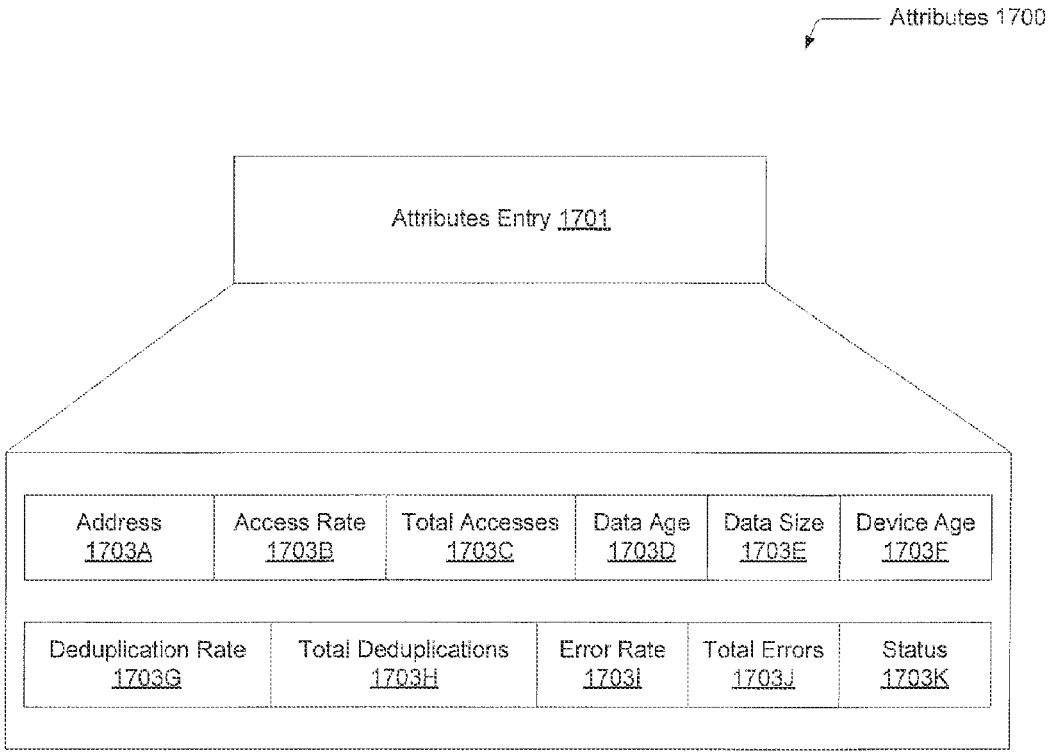
FIG. 17 is a generalized block diagram illustrating one embodiment of a table entry storing attributes.

Turning now to FIG. 17, a generalized block diagram illustrating one embodiment of an entry storing attributes 1700 is shown. It is noted that while FIG. 4 depicts all of the attribute data as being stored as part of a single entry, in various embodiments the attribute data may in fact be distributed over multiple locations. In various embodiments, attributes associated with a given block of data and/or corresponding fingerprint may be used for a variety of purposes, including where a corresponding fingerprint(s) is to be stored in the deduplication tables. For example, as discussed above, if a given data component is determined or predicted to be highly deduplicated, its fingerprint may be stored in a fingerprint table used for more highly deduplicated data. Similarly, data deemed less likely to be deduplicated has its fingerprint stored in a lower probability fingerprint table. It is noted that attributes associated with a given fingerprint may be stored anywhere within the system. For example, such attributes may be stored in association with corresponding data on a LUN. Additionally, such attributes may be stored in deduplication tables, copies may be maintained in a variety of locations in the system, and otherwise.

As shown in the example, entry 1701 may hold an address 1703A which may be a virtual address or a physical address. In various embodiments, address 1703A may refer to a single address, or it may refer to a range of addresses. The entry 1701 may be accessed by a pointer value that matches the information stored in the address field 1703A. The information stored in the remaining fields may correspond to a given data component corresponding to a physical location in the storage devices 176a-176m or a virtual address used by one of the client computer systems 110a-100c. For a given physical or virtual address the table entry 1701 may store an access rate 1703B, a total number of accesses 1703C, a data component age 1703D, a data component size 1703E, a corresponding storage device age 1703F, a deduplication rate 1703G, a total number of deduplications 1703H, an error rate 17031 and a total number of errors 1703J for the given component. In addition, a status field 1703K may store an indication of valid data within a respective entry. For a given physical or virtual address, other attributes may be included such as a total number of deduplications for an associated volume and a total number of accesses for an associated volume. Although the fields 1703-1712 are shown in this particular order, other combinations are possible and other or additional fields may be utilized as well. The bits storing information for the fields 1703-1712 may or may not be contiguous.

Figure 18:
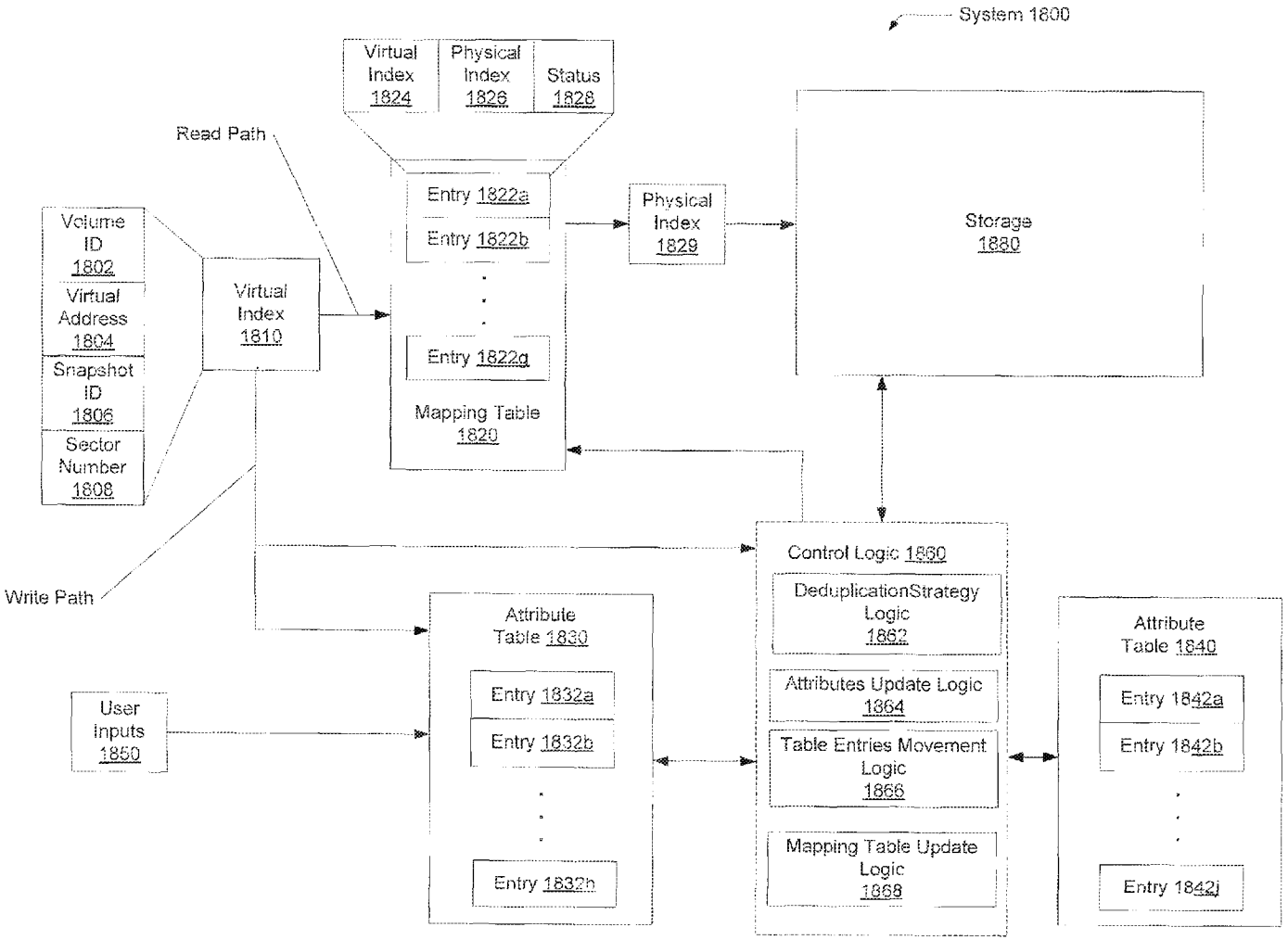
FIG. 18 is a generalized block diagram illustrating one embodiment of a system for maintaining attributes tables for data components.

Referring now to FIG. 18, a block diagram illustrating one embodiment of a system 1800 configured to maintain attributes related to deduplication is shown. In one embodiment, an attribute table 1830 may store attribute information that is used to determine how much effort is put into deduplication for a received write transaction (e.g., such as discussed in relation to FIGS. 15 and 3). Attribute table 1840 may store attribute information that is used to determine where a given fingerprint is stored within the system's fingerprint tables (e.g., as discussed in FIG. 3). For example, each of the entries 1842a-1842j in table 1840 may comprise the information shown in attributes table entry 1701. In the example shown, attribute tables 1830 and 1840 are shown as two distinct tables for ease of illustration. However, it is noted that the attributes described therein may be stored in any manner within the system and may be spread across multiple locations. In various embodiments, copies of such attributes may also be cached or otherwise stored in different levels within a storage hierarchy such that multiple copies of attribute information may exists simultaneously.

In the embodiment shown, two paths (a read path and a write path) through various components of the system may generally be traversed depending on the type of transaction received. In the example shown, a key 1810 corresponding to a received transaction may be used for further processing in the system. In one embodiment, the key 1810 may comprise a volume identifier (ID) 1802, a logical or virtual address 1804, a snapshot ID 1806, a sector number 1808, and so forth. In various embodiment, each of the previously discussed storage controllers 170 within the data storage arrays 120a-120b may support storage array functions such as snapshots, replication and high availability. In addition, each of the storage controllers 170 may support a virtual machine environment that includes a plurality of volumes with each volume including a plurality of snapshots. In one example, a storage controller 170 may support hundreds or thousands of volumes, wherein each volume includes thousands of snapshots. In one embodiment, a volume may be mapped in fixed-size sectors, such as a 4-kilobyte (KB) page within storage devices 176a-176m. In another embodiment, a volume may be mapped in variable-size sectors. In such embodiments, the volume ID 1802, snapshot ID 1806, and sector number 1808 may be used to identify a given volume. Accordingly, a given received read or write request may identify a particular volume, sector and length. Although the fields 1802-1808 are shown in this particular order, other combinations are possible and other or additional fields may be utilized as well. The bits storing information for the fields 1802-1808 may or may not be contiguous.

In one embodiment, the key 1810 corresponding to a read transaction may generally follow a read path, while a key 1810 that is part of a write transaction may follow a write path. As shown, during a read, the key 1810 may be used to index a mapping table 1820. The mapping table 1820 may comprise a plurality of entries 1822a-1822g, wherein each entry holds a virtual-to-physical mapping for a corresponding data component. In this manner, the mapping table 1820 may be used to map logical read requests from each of the client computer systems 110a-110c to physical locations in storage devices 176a-176m. It is noted that in various embodiments, identified physical locations (e.g., represented by a physical address) may be further remapped by storage 1880. As shown, each of the entries 1822a-1822g may hold a virtual index 1824, a corresponding physical index 1826, and status information 1828. Similar to the fields 1802-1808 within the key 1810, the fields 1824-1828 are shown in a particular order. However, other combinations are possible and other or additional fields may be utilized as well. The physical index 1826 may generally be an identifier (e.g., a physical pointer or address) used to identify a given physical location within the storage devices 176a-176m. As described earlier, the physical index 1826 may include sector numbers, data chunk and offset numbers, track numbers, plane numbers, a segment identifier (ID), and so forth. In addition, the status information 1828 may include a valid bit which may be used to indicate the validity of a corresponding mapping.

In one embodiment, the entries 1822a-1822g within the mapping table 1820 may be sorted such that the sorting is done first by the volume ID 1802, then by the sector number 1808, and then by the snapshot ID 1806. This sorting may serve to group the entries 1822a-1822g corresponding to different versions of data components within different snapshots together. Such an arrangement may lead to fewer read operations to find a given data component during a lookup operation for a read request. During a garbage collection operation, the operation may arrange the data components within the storage devices 176a-176m in a sorted manner, wherein the sorting is done first by the volume ID 1802, then by the snapshot ID 1806, and then by the sector number 1808. This may serve to group the data components in storage devices 176a-176m that are logically adjacent into physically adjacent locations.

In one embodiment, a physical index 1829 may be read from the mapping table 1820 during a lookup operation corresponding to a received read request. The physical index 1829 may then be used to locate a physical location within the storage devices 176a-176m. In some cases, a read request may include a length that spans multiple sectors. Therefore, there may be multiple parallel lookups performed on the mapping table 1820. In addition, there may be multiple read operations sent to the storage devices 176a-176m to complete a received read request from one of the client computer systems 110a-110c.

In addition to the above, the key 1810 may correspond to a received write request and may follow a write path as shown. In the example shown, the key 1810 may be conveyed to either (or both) of attribute table 1830 and control logic 1860. In one embodiment, attribute table 1830 stores attribute information regarding the storage environment and/or data stored within the system. In some embodiments, attribute table 1830 may correspond to a volume table. The attribute table 1830 may comprise a plurality of entries 1832a-1832h, wherein each entry holds attributes associated with a virtual address, addresses, or range of addresses. Generally speaking, attributes may be maintained for a subset of addresses in the system. However, maintaining attributes for all addresses is contemplated.

When a write request is received, control logic 1860 may receive or otherwise access associated attributes from the table 1830. In addition, control logic 1860 may receive user inputs 1850. Received write requests may be placed in a buffer upon receipt, such as a buffer within a non-volatile random access memory (NVRAM). When the received write request is buffered, an acknowledgment may be sent to the corresponding one of the client computer systems 110a-110c. At a later time, an asynchronous process may flush the buffered write operations to the storage devices 176a-176m. However, deduplication may occur both prior to sending write requests from the DRAM to the NVRAM and prior to sending write requests from the NVRAM to the storage devices 176a-176m. In cases where inline deduplication detects a copy of the received write data already exists in the system, the received write data may be discarded.

The user inputs 1850 may include identification of particular application and corresponding volumes that may have a high probability of deduplication during the execution of the identified particular applications. The identified applications may include storage backup operations, given virtual machine support applications, development software producing a particular type of development data, and so forth. The user inputs 1850 may include identification of a range or a pattern of virtual addresses used to identify corresponding data components with an associated virtual index that satisfies the range or pattern with respect to a virtual index of a current read/write request. For example, a given data component may have a high probability of deduplication if the given data component is located near a data component that is currently being deduplicated. A stride may be used to identify corresponding virtual data component indexes. In addition, the user inputs 1850 may include administrative settings.

Control logic 1860 may comprise deduplication strategy logic 1862, attributes update logic 1864, table entries movement logic 1866, and mapping table update logic 1868 which is configured to update mapping table 1820 (e.g., as described in step 1520 of FIG. 15). The deduplication strategy logic 1862 may determine, for a search of a deduplication table, a number of lookup operations to use for a search for both an inline and a post-process deduplication operation. In addition, the deduplication strategy logic 1862 may determine a number of lookup operations to use for each given storage medium used to store information corresponding to the deduplication table. Further details are provided later.

The attributes update logic 1864 within the control logic 1860 may determine which entries in the tables 1830 and 1840 may be updated during an identified event, such as the events listed above corresponding to block 414 of method 400. The table entries movement logic 1866 may determine how entries within a deduplication table (e.g., fingerprint tables corresponding to the deduplication table) are stored and moved within the table. In addition, the logic 1866 may determine a manner for storage and movement of stored data in physical locations in storage devices 176a-176m. Similarly, the logic 1866 may determine how virtual-to-physical mappings are performed. For example, the logic 1866 may perform mappings to group together deduplicated data components. It is noted that while FIG. 17 (and other figures) depicts selected arrows as being bidirectional and others as unidirectional, this is not intended to be limiting. In various embodiments, communication may occur in either or both directions between any of the components in the system.

Figure 19:
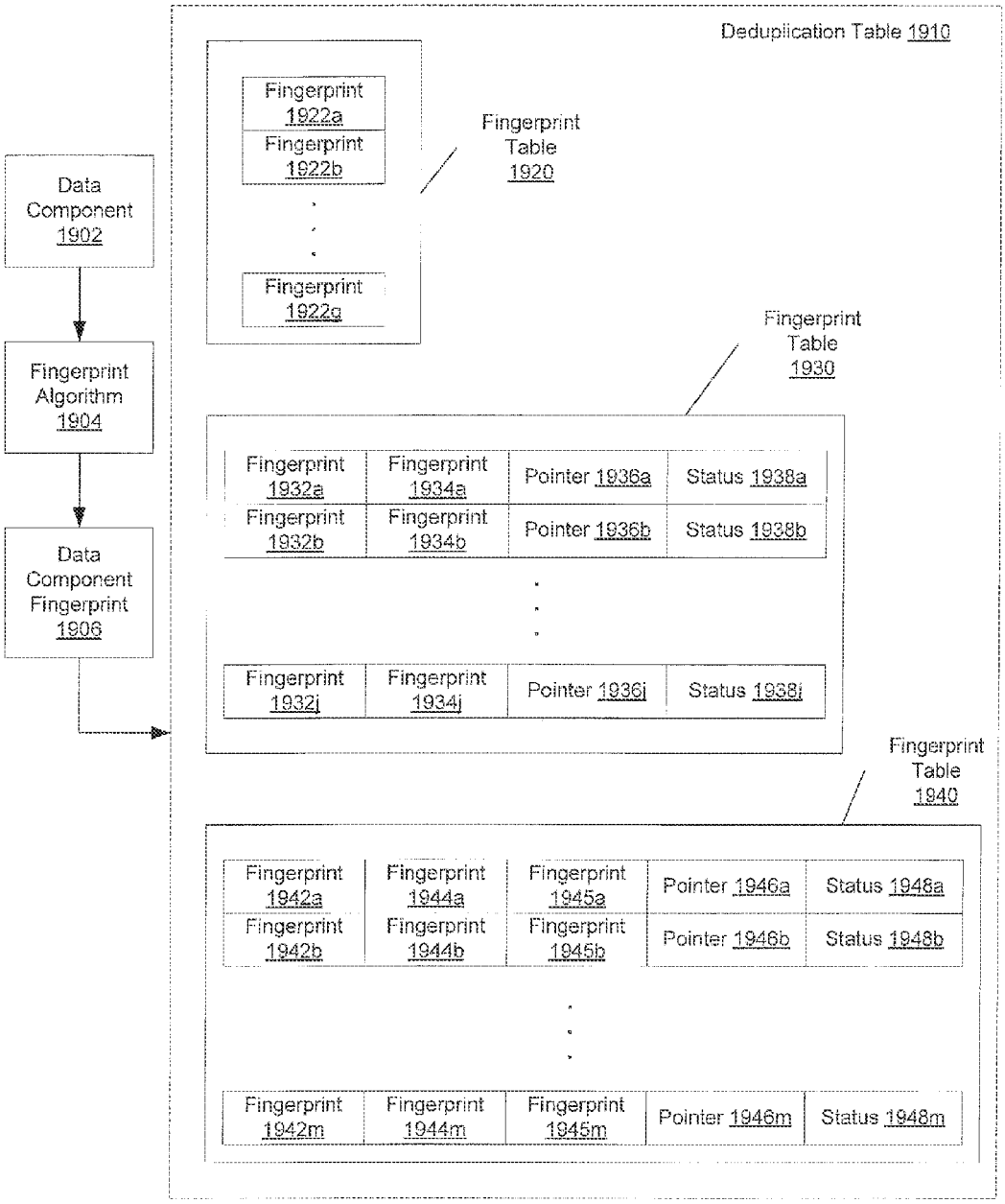
FIG. 19 is a generalized block diagram illustrating one embodiment of a deduplication table.

Referring now to FIG. 19, a generalized block diagram illustrating one embodiment of a logical representation of a deduplication table 1910 is shown. The information stored in the deduplication table 1910 may provide a fast location identification of data components stored in the data storage arrays 120a-120b. The information stored in the deduplication table 1910 may include mappings between one or more calculated fingerprint values for a given data component and a physical pointer to a physical location in one of the storage devices 176a-176m holding the given data component. In addition, a length of the given data component and status information for a corresponding entry may be stored in the deduplication table 1910.

As described earlier, a chunking/partitioning algorithm may produce a given data component 1902 from data corresponding to a received request. A fingerprint algorithm 1904 of multiple fingerprint algorithms may then be selected and used to produce a data component fingerprint 1906. The resulting fingerprint value may then be used to access the deduplication table 1910. In various embodiments, one or more fingerprint algorithms may be supported and one fingerprint algorithm may be more complex to perform than another fingerprint algorithm. Accordingly, the given fingerprint algorithm may consume more computation time than another. Additionally, some fingerprint algorithms may produce larger fingerprints than others and consume more storage space. For example, an MD5 type fingerprint algorithm may be more complex to perform than a CRC32C fingerprint algorithm. However, there may be fewer collisions, or false matches, associated with the first algorithm. In another example, the result of the fingerprint algorithm may be determined by keeping only some of the bits generated by a function such as MD5 or CRC32C. Keeping more bits requires more space, but may also reduce the likelihood of a collision. A collision may cause a read of data stored in persistent storage, such as the storage devices 176a-176m, for a subsequent comparison operation. The comparison may be performed to verify whether a match found in the deduplication table 1910 corresponds to data stored in persistent storage that matches the value of the given data component 1902. In addition, read operations for both data and attributes followed by comparison operations may be performed to determine which one of multiple matches may remain in persistent storage during deduplication of redundant data. The read operations and the comparison operations add processing time to a deduplication operation.

Switching between a first and a second fingerprint algorithm of multiple fingerprint algorithms may occur when a strategy for deduplication changes. In one embodiment, attributes such as those discussed above may be used by control logic to determine a strategy and changes to a strategy for deduplication. For example, a first strategy that utilizes less storage space for fingerprint values, but results in more collisions, may be chosen. At a later time, a second strategy may be chosen to replace the first strategy. The second strategy may utilize more storage space for fingerprint values resulting in fewer collisions. The later time for such a change in strategy for deduplication may occur during a given identified event, such as the events described earlier in FIG. 3, or otherwise.

Deduplication table 1910 may comprise entries for all or only a portion of the data components stored in one or more of data storage arrays 120a-120b. In one embodiment, the deduplication table 1910 may not be complete and therefore may not have an entry for each stored data component. Also, one or more entries within the deduplication table 1910 may be evicted as further described later. In one embodiment, the fingerprint tables 1920-1940 together comprise some or all of a deduplication table depending on a chosen implementation. In other embodiments, the fingerprint tables 1920 and 1930 store copies of information stored in fingerprint table 1940. Further, the fingerprint table 1940 may be stored in volatile and/or non-volatile storage within the system (e.g., such as storage devices 176a-176m, RAM 172, processor cache(s), etc.).

In one embodiment, a lookup operation into the deduplication table 1910 may be controlled by control logic in a storage controller. For example, attribute information may be used to determine how many of the fingerprint tables 1920-1940 to search. In addition, a type of a storage medium storing a given fingerprint table may determine how many input/output (I/O) accesses may be used to search a given fingerprint table. For example, a search determined to have a limited amount of time for lookup may access fingerprint tables stored in a processor cache or a non-persistent storage, but not access any fingerprint tables stored in persistent storage. Alternatively, a limited number of I/O accesses may be allowed to persistent storage. In addition, a lookup may access only particular portions of the deduplication table 1910 based on an estimated probability of success.

Each entry in the fingerprint table 1940 may comprise one or more calculated fingerprint values corresponding to a given data component, such as fingerprints 1942a-1945a in a first entry. Additionally, each of the fingerprints 1942a-1945a may be calculated from a different fingerprint algorithm. The pointer 1946a may be a physical pointer or address for a given physical location within the storage devices 176a-176m. In addition, each entry may comprise status information, such as the status field 1948a in the first entry. The status information may include a valid bit, a flag to indicate whether or not a corresponding data component is a candidate for deduplication, a length of the corresponding data component, and so forth.

Similar to the storage arrangement in the fingerprint table 1940, each entry in the fingerprint table 1930 may comprise one or more calculated fingerprint values corresponding to a given data component, such as fingerprint values 1932a-1934a in a first entry. In some embodiments, the fingerprint tables may be inclusive such that some of the fingerprint values 1932a-1934a stored in the fingerprint table 1930 may be copies of one or more of the fingerprint values 1942a-1945a, 1942b-1945b, 1942m-1945m, and so forth, stored in the fingerprint table 1940. In other embodiments, fingerprint values stored in one table are exclusive of those stored in another. All such embodiments are contemplated.

In one embodiment, the fingerprint table 1930 holds a smaller number of entries than a number of entries in the fingerprint table 1940. In addition, each entry in the fingerprint table 1930 holds less information than an entry in the fingerprint table 1940. Similarly, the fingerprint table 1920 may hold a smaller number of entries than a number of entries in the fingerprint table 1930 and each entry in the fingerprint table 1920 may hold less information than an entry in the fingerprint table 1930. In other embodiments, fingerprint table 1930 may not hold a smaller number of entries than that of fingerprint table 1940. Rather, fingerprint table 1930 could hold more entries, and each entry could hold more information. Similarly, fingerprint table 1920 could be larger than one or both of fingerprint table 1930 and fingerprint table 1940. Although the fields 1922a-1948m within the fingerprint tables 1920-1940 are shown in a particular order, other combinations are possible and other or additional fields may be utilized as well. The bits storing information for the fields 1922a-1948m may or may not be contiguous.

While fingerprint tables 1920-1940 are shown as tables, the tables 1920-1940 may be data structures such as a binary search tree, or an ordered binary tree, comprising a node-based data structure. In addition, while three fingerprint tables 1920-1940 are shown, different numbers of fingerprint tables are possible and contemplated. Further, one or more filters such as a Bloom filter may be included in the deduplication table 1910. In such an embodiment, the filter may be accessed to quickly determine whether a calculated data component fingerprint 1906 is within one or more of the fingerprint tables. For example, a filter may be configured to definitively indicate that a data component is not stored in a data table. If the filter does not rule out its presence, deduplication processing may continue or the data component may be stored in the data table.

As described earlier, a chosen fingerprint algorithm may be used to calculate the data component fingerprint 1906. Subsequently, the data component fingerprint 1906 may be used to access the deduplication table 1910. The chosen fingerprint algorithm may be also used to determine which fingerprint values stored in the fingerprint tables 1920-1940 to compare to the data component fingerprint 1906. For example, the fingerprint table 1920 may store fingerprint values corresponding to data components predicted to have a relatively high probability of being deduplicated. In one embodiment, fingerprint table 1920 may store information corresponding to the 5% of the total number of stored data components that have the highest probability of being deduplicated. The probability of deduplication for a given data component may be based, at least in part, on the attributes stored in the attributes table 640.

The data component fingerprint 1906 may access one or more tables within deduplication table 1910. If no matching fingerprint is found, then the corresponding data may be scheduled to be written to one of the storage devices 176a-176m. If a matching fingerprint is found, then the data corresponding to the matching fingerprint may be retrieved from storage and compared to the received write data. If the data is determined to be identical, then a new link for the stored data is created and the write data discarded. If the retrieved data is not identical to the write data or no matching fingerprint for the write data is found, then the write data is stored. In both cases, a new virtual to physical mapping table entry (e.g., in table 1820) may be created for the write as previously discussed.

In one embodiment, the deduplication table 1910 may store multiple entries for a given data component. For example, the deduplication table 1910 may store an entry for a given 4 KB page as well as a separate entry for each 1 KB block within the given 4 KB page. Alternatively, a lookup into the deduplication table 1910 may occur at a granularity of a 512-byte block. If a match is found and a duplicate copy of data stored in one of the data storage arrays 120a-120b is found and verified, a subsequent lookup of the next contiguous 512 bytes may be performed. If a fingerprint value match is found for this data block and a duplicate copy of data stored in one of the data storage arrays 120-120b is found and verified, a subsequent lookup of the next contiguous 512 bytes may be performed. This process may be repeated until no match is found. Therefore, deduplication of data components may be found at a finer granularity while also still maintaining table entries in the deduplication table 1910 for larger sized data components.

For a deduplication table 1910 that supports a finer granularity of sizes for data components, more fingerprint value hits may be produced during a lookup operation for a given received write request. For a deduplication table 1910 that supports a more coarse granularity of sizes for data components, a higher storage efficiency may be achieved and fewer fingerprint value hits may be produced during a lookup operation for a given received write request. In some embodiments, a deduplicated data component may have neighboring data components that have also been deduplicated. For example, a given 512-byte data component may have a neighboring 512-byte deduplicated component; thus forming a 1 KB deduplicated block. In such a case, an entry may be added to the deduplication table 1910 associated with the deduplicated 1 KB block. In this manner, data components and their corresponding entries are effectively coalesced to form larger blocks. Alternatively, a table entry within the deduplication table 1910 corresponding to a larger data size may be divided to produce multiple table entries with corresponding smaller data sizes. Such a division may produce more fingerprint value hits during a lookup into the deduplication table 1910.

Both a fingerprint algorithm and a data size or length corresponding to a table entry within the deduplication table 1910 may be reconsidered. Such reconsideration may occur periodically, during identified events as described earlier in FIG. 3, or at any other desired time. As may be appreciated, making changes to the algorithm(s) used and/or data sizes used may result in changes to calculation times and may alter the probability of a collision. For example, increased data collisions may incur additional read operations of a persistent storage data location for a data comparison. Changes in the supported data size may result in more deduplications of smaller blocks or fewer deduplications of larger blocks. All such ramifications should be taken into account when making such changes.

In one embodiment, one or more entries within the deduplication table 1910 may store a first fingerprint value for a corresponding data component. A second fingerprint value may be stored with the corresponding data component in one of the storage devices 176a-176m. In various embodiments, the first fingerprint value is a different and smaller fingerprint value than the second fingerprint value. Different fingerprint algorithms may be used to compute the first fingerprint value and the second fingerprint value. In another example, the first fingerprint value is a function of the fingerprint value (e.g., a subset of bits of the fingerprint value) and the second fingerprint value is also a function of the same fingerprint value (e.g., some or all of the remaining bits of the fingerprint value). During a lookup into the deduplication table 1910, when a subset or an entire value of the data component fingerprint 1906 matches a first fingerprint value in a given table entry, such as fingerprint 1932j in the fingerprint table 1930, a corresponding data storage location may be read. In embodiments in which the first fingerprint value is a subset of bits of the fingerprint value, a second fingerprint value may be stored in this data location in addition to a corresponding data component. Either a second fingerprint value different from the data component fingerprint 1906 or a subset of the data component fingerprint 1906 may be compared to the stored second fingerprint value. If there is a match, then a comparison may be performed between the stored data component and a data component value corresponding to a received read/write request, a garbage collection operation, or otherwise.

In one embodiment, the deduplication table 1910 may be partitioned in a manner to allow one or more nodes in a cluster to process lookup operations for a given partition of the table. Therefore, deduplication may occur across multiple nodes to reduce storage space on a given node. A virtual-to-physical mapping table, such as the mapping table 1820, may refer to data components across multiple nodes for increased storage efficiency. The deduplication table 1910 may still be stored across storage devices within a cluster in the cluster and may be repartitioned without moving any of the stored data. A smaller portion of the deduplication table 1910, such as the fingerprint tables 1920-1930 may be stored on each node while a larger portion, such as the fingerprint table 1940, may be partitioned. Each time a node joins or leaves a given cluster, the deduplication table 1910 may be repartitioned among the current nodes in the given cluster. The deduplication table 1910 may support one deduplication address space across one or more volumes and snapshots on one or more nodes in the given cluster. In various embodiments, the deduplication table 1910 may be divided among several nodes to increase the effective cache storage efficiency for a fingerprint lookup operation. This division of the deduplication table 1910 may occur by fingerprint value, by fingerprint algorithm, by an estimated probability of success, by a storage strategy, by a random process, or otherwise.

In one embodiment, an entry is allocated, or registered, within the deduplication table 1910 when a fingerprint lookup operation into the deduplication table 1910 results in a miss. This miss may occur during an inline deduplication operation or a post-process deduplication operation. Additionally, as previously discussed in FIG. 15, on a hit a link table may be updated that stores links for deduplicated data. For example, responsive to successfully deduplicating received write data, a new entry is created in the link table. In some embodiments, new table entries may be registered during a post-process deduplication operation. In other words, during an inline deduplication operation, a miss during a fingerprint lookup into the deduplication table 1910 does not produce registration of a table entry. During a post-process deduplication operation, a miss during a fingerprint lookup into the deduplication table 1910 does produce registration of a table entry. In one embodiment, a duplicate copy is verified during deduplication by a matching fingerprint value. In another embodiment, a duplicate copy is verified by both a matching fingerprint value and a matching value for a corresponding data component. Numerous such embodiments are possible and are contemplated.

Figure 20:
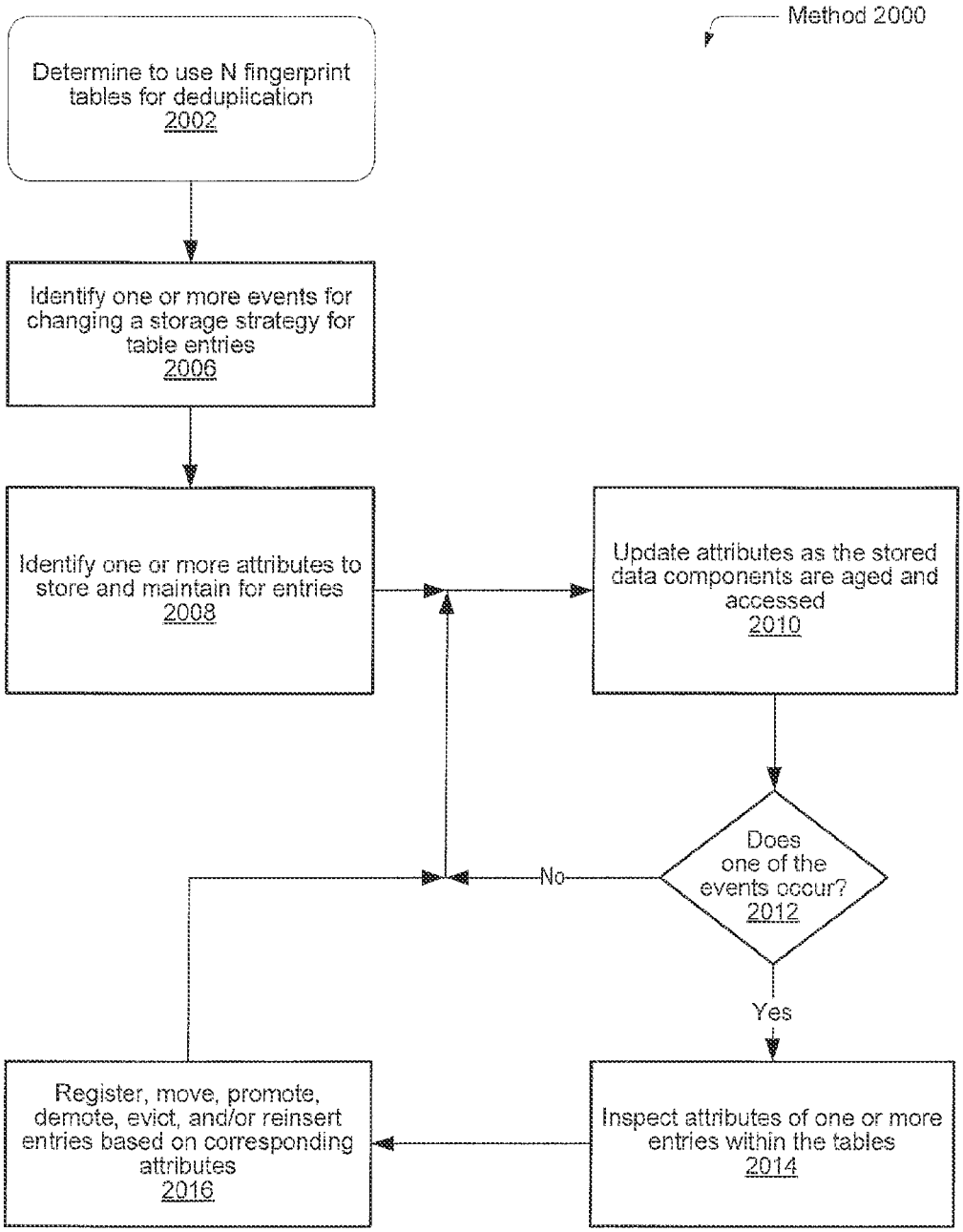
FIG. 20 illustrates one embodiment of a method for supporting multiple fingerprint tables.

Referring now to FIG. 20, one embodiment of a method 2000 for supporting multiple fingerprint tables is shown. In various embodiments, the components discussed above, such as network architecture 100, deduplication table 1910 and fingerprint table(s) 1920 described above may generally operate in accordance with method 2000. For purposes of discussion, the steps in this embodiment are shown in sequential order. However, some steps may occur in a different order than shown, some steps may be performed concurrently, some steps may be combined with other steps, and some steps may be absent in another embodiment.

In block 2002, a number N (where N is an integer) of fingerprint tables are determined to be supported and store values, such as fingerprint values, corresponding to stored data components. Each of the N fingerprint tables may have an associated probability for corresponding data components to be deduplicated. One or more of the N fingerprint tables may be stored on a separate storage medium from the other fingerprint tables. One or more of the N fingerprint tables with the higher associated probabilities of deduplication may be stored in a higher level of a memory hierarchy than the remainder of the N fingerprint tables. For example, one or more of the N fingerprint tables may be stored in RAM 172, whereas the remainder of the N fingerprint tables may be stored in persistent storage in storage devices 176a-176m. In some embodiments, copies of one or more of the N fingerprint tables may be stored in a higher level of the storage hierarchy. Therefore, there may be two copies of the one or more N fingerprint tables on separate storage media.

In block 2006, one or more events are identified for changing (or reevaluating) a storage strategy or arrangement for entries within the N fingerprint tables. Examples of such events may include a garbage collection operation, a pruning/trimming operation, a secure erase operation, a reconstruct read operation, a given stage in a read/write pipeline for a received read/write request, a received batch operation that accesses physical locations within persistent storage, a received batch operation that transforms or relocates data components within the persistent storage.

In block 2008, one or more attributes corresponding to data components stored in the persistent storage are identified for storage. The attributes may be used to change a storage strategy or arrangement for entries within the N fingerprint tables. Examples of such attributes include at least those discussed above in relation to FIG. 17. In block 2010, one or more of the stored attributes may be updated as data components are aged or accessed. In one embodiment, a given period of time and each data storage access may be included as an event with the events described regarding block 2006. If one of the identified events occurs (decision block 2012), then in block 2014 one or more of the attributes corresponding to one or more stored data components are read for inspection. In block 2016, based on the attributes that are read, one or more entries within the N fingerprint tables may be moved from one fingerprint table to another. Additionally, entries may be reordered within a given fingerprint table based on their corresponding attributes. For example, the entries may be sorted by one or more stored fingerprint values for ease of lookup. One or more entries may be promoted from a lower-level fingerprint table to a higher-level fingerprint table, wherein entries within the higher-level fingerprint table correspond to stored data components that have a higher probability of being deduplicated based on their attributes.

In addition to the above, one or more entries within the N fingerprint tables may be evicted from the fingerprint table 1920 altogether. This eviction of one or more entries may occur when a determination is made based on associated attributes that the one or more entries correspond to stored data components with a low probability of being deduplicated. In addition, based on associated attributes, entries within the N fingerprint tables may be evicted in order to prevent deduplication among data components with a large number of references, to remove entries that cause false matches, or collisions, during a deduplication operation, and to remove entries that no longer have a valid physical address for the data component to which they refer.

As described earlier, for each entry that is evicted, in one embodiment, an indication of the eviction may be written to a corresponding physical location within one of the data storage arrays 120a-120b. In another embodiment, an indication of the eviction may be written in an associated entry of another data structure. A stored indication may allow for reevaluation at a later time of a given evicted data component. The associated attributes may be read and used to determine whether the given evicted data component may now have a probability of being deduplicated above a given threshold. If it is determined the given evicted data component has a probability of being deduplicated above a given threshold, then a corresponding entry may be allocated in one of the N fingerprint tables.

Figure 21:
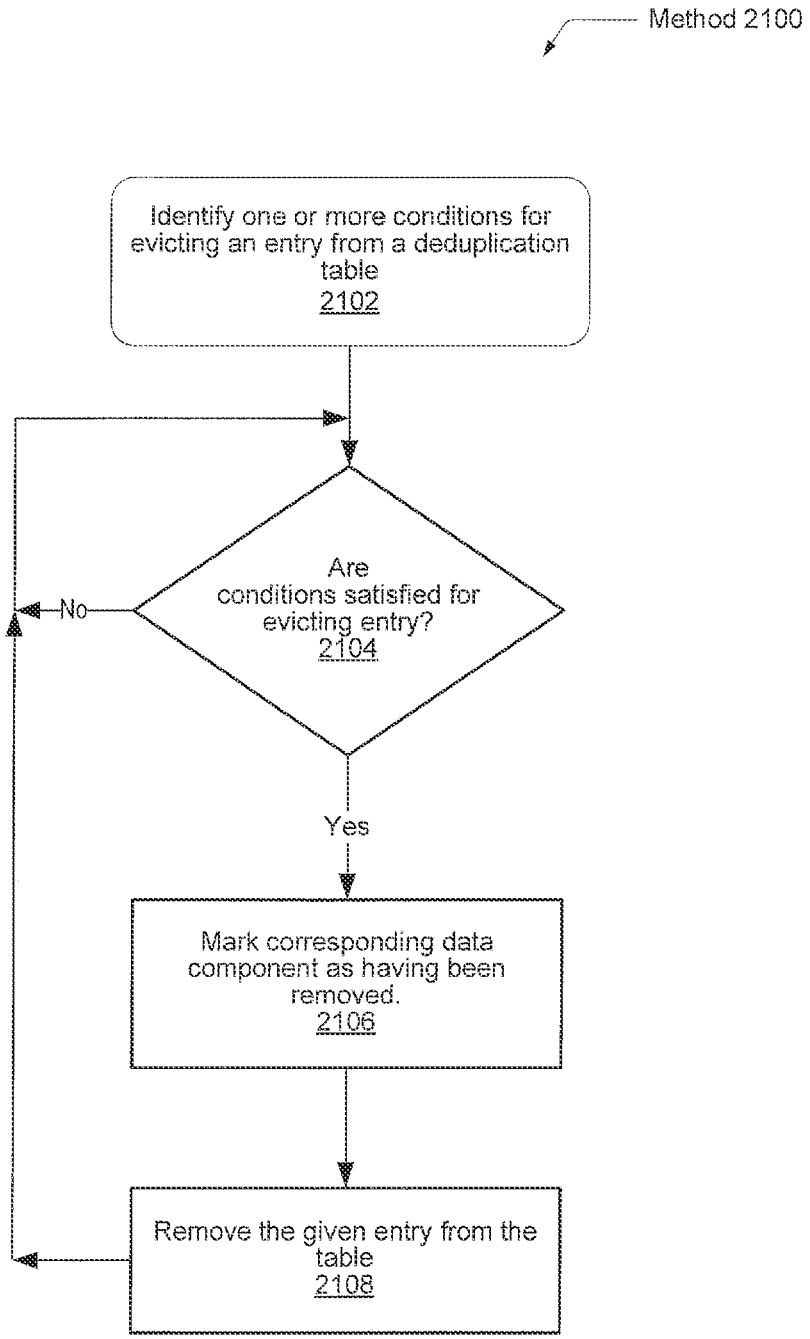
FIG. 21 illustrates one embodiment of a method for eviction from a deduplication table.

Referring now to FIG. 21, one embodiment of a method 2100 for eviction from a deduplication table is shown. In block 2102, one or more conditions are identified for evicting an entry from a deduplication table. Here, eviction refers to removing information stored in a given entry from the entire deduplication table. If a deduplication table includes multiple fingerprint tables, such as tables 1920-1940, information stored within a given entry may be removed and no longer be stored in any of the fingerprint tables. In various embodiments, data that is deemed to have a relatively low probability of being deduplicated may have its entry removed from the deduplication table(s). This eviction may in turn reduce the size of the deduplication table and reduce an amount of effort required to maintain the table.

In the example shown, the identified conditions for use in determining eviction may include one or more of a size of the deduplication table reaching a given threshold, a given data component has a predicted probability of being deduplicated that falls below a given threshold, a given data component has a history of being deduplicated that falls below a given threshold, a given data component with an associated large number of references is identified as being removed from a deduplication operation, a given data component reaches a given threshold for a number of false matches (collisions), and a given data component does not have a valid physical address. One or more attributes, such as the attributes discussed above may be used to determine whether eviction may occur and to identify one or more entries within a deduplication table for eviction. In various embodiments, eviction may also occur during garbage collection operations.

If conditions are satisfied for evicting a given entry in a deduplication table (decision block 2104), then a corresponding data component may be marked as being removed from the table (block 2106). In one embodiment, an indication of the eviction may be written to a corresponding physical location within one of the data storage arrays 120a-120b, and the given entry in the deduplication table may be deallocated (block 2108). A stored indication may allow for reevaluation at a later time of a given evicted data component.

Figure 22:
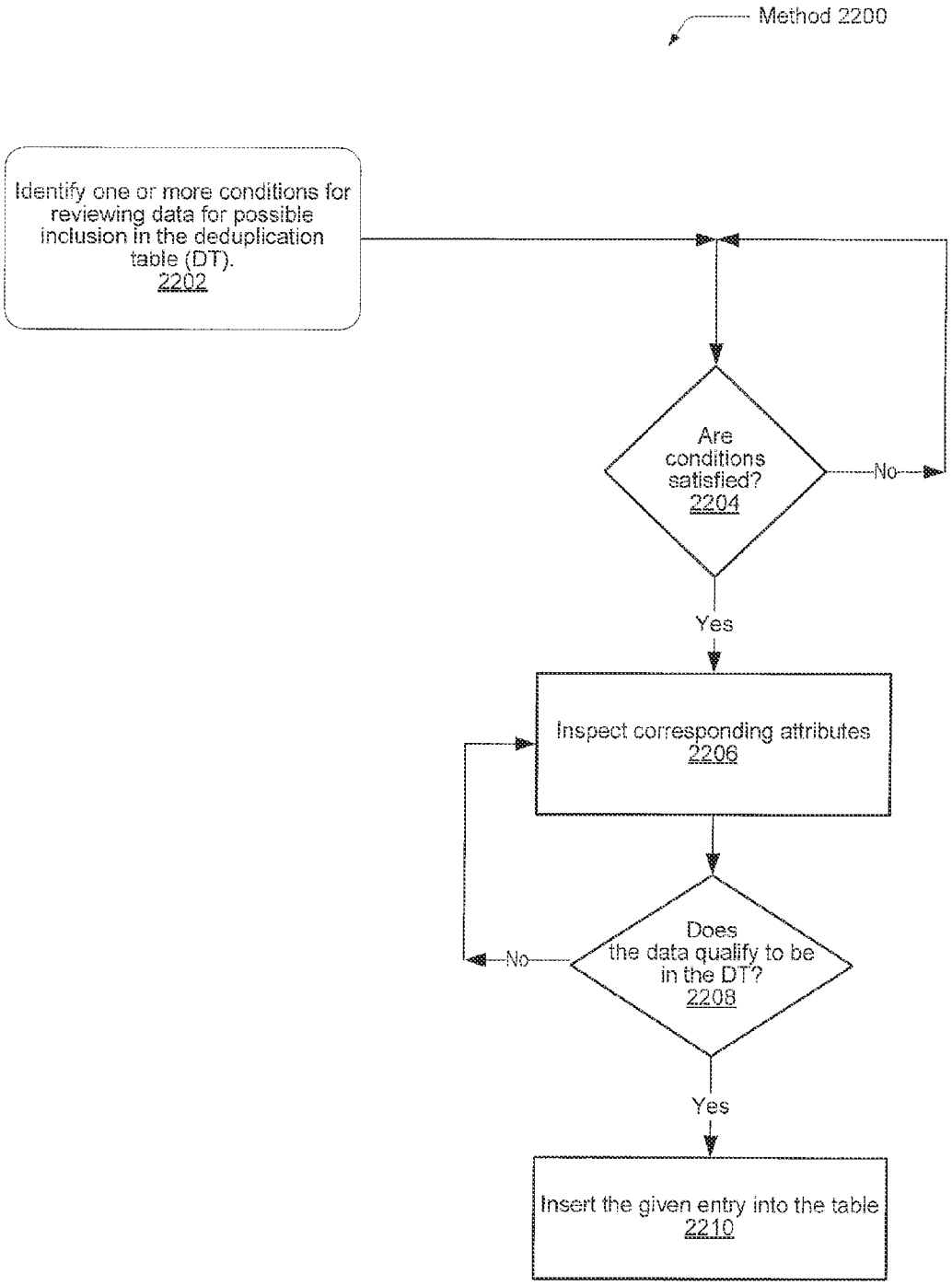
FIG. 22 illustrates one embodiment of a method for inserting an entry into a deduplication table.

Turning now to FIG. 22, one embodiment of a method 2200 for inserting an entry into a deduplication table is shown. In block 2202, one or more conditions are identified for reviewing a data component which does not currently have an entry in the deduplication table. In one embodiment, one condition for performing such a review may be initiation of a garbage collection operation. Other examples of conditions may include the occurrence of events identified in block 1606 in method 1600, the conditions discussed in relation to method 2000, or otherwise. The timing of such a review may be set in a manner to minimize or otherwise reduce the impact on other system operations.

If conditions are satisfied for reviewing a data component (decision block 2204), then corresponding attributes for the given data component may be read and inspected (block 2206). For example, one or more attributes such as those discussed above may be used to determine whether insertion may occur. In various embodiments, metadata within the system indicates whether a corresponding data component does or does not have a corresponding entry in the deduplication table. A given data component/entry may qualify for insertion in the deduplication table when one or more conditions for its exclusion are no longer valid, such as the conditions described above regarding block 2102 of method 2100. The attributes of a corresponding data component may change over time and allow the data component to have an associated entry in the deduplication table again.

If a given evicted entry qualifies to be reinserted in the deduplication table (decision block 2208), then an entry in the deduplication table is allocated for a corresponding data component (block 2210) and any markings that indicate the data component does not have an entry in the deduplication table may be removed or invalidated.

Figure 23:
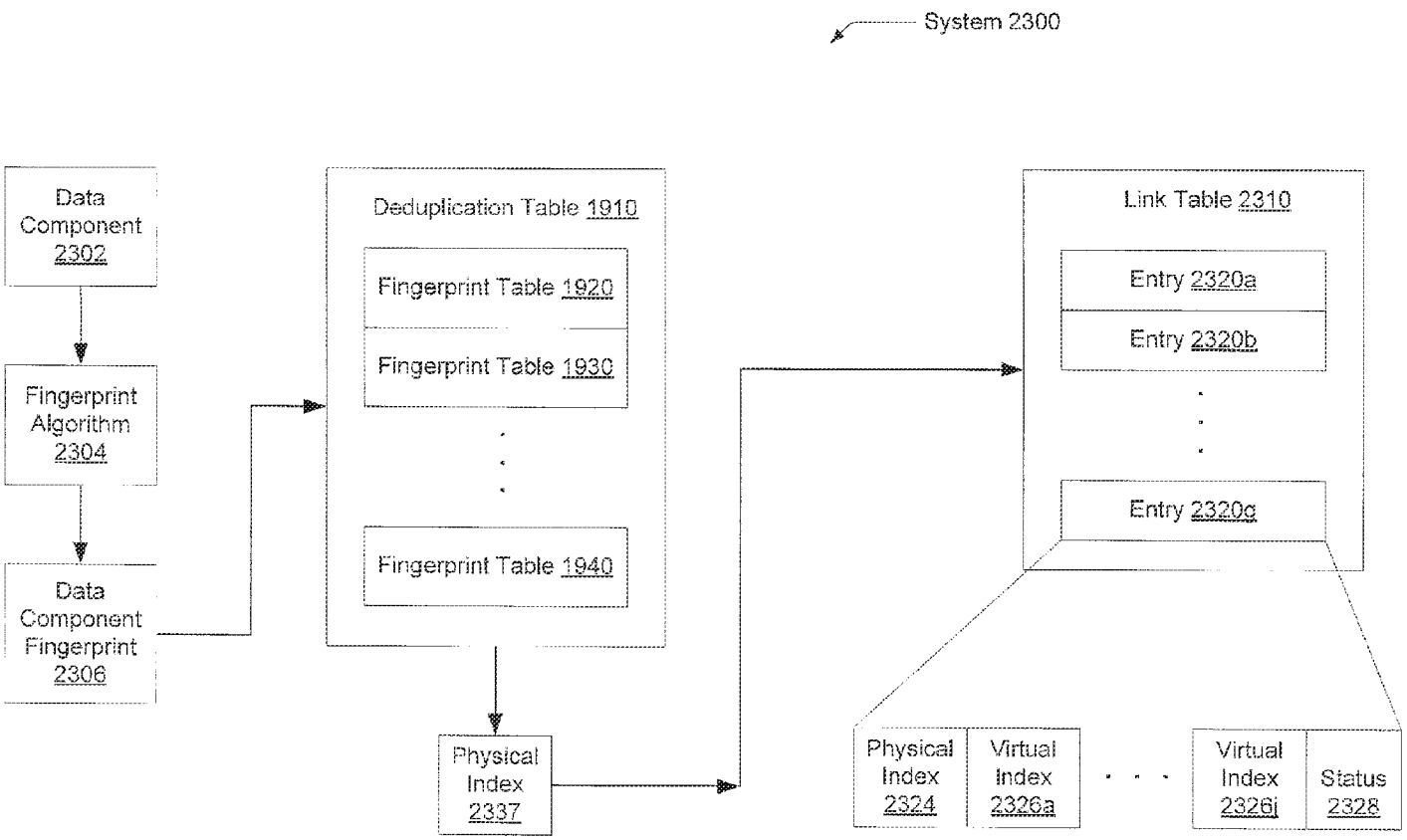
FIG. 23 illustrates one embodiment of a system for maintaining reverse address mappings using a link table.

Referring now to FIG. 23, a generalized block diagram illustrating one embodiment of a system 2300 for maintaining reverse address mappings using a link table 2310 is shown. As described above, virtual-to-physical mapping information may be stored in mapping table 1820. In addition, address-mapping information may be stored in each page of data within each of the storage devices 176a-176m. Each of the data storage arrays 120a-120b supports multiple virtual addresses in requests from each of the client computer systems 110a-110c referencing a same, single physical address. For example, a first virtual address corresponding to client 110a and a second virtual address corresponding to client 110b may reference a same data component or a same data block identified by a same given physical address. In this example, the first virtual address may have a value of "VX". The second virtual address may have a value of "VY". The same given physical address may have a value of "PA". These values are arbitrary and chosen to simplify the illustrated example. The mapping table 1820 may store mapping information such as "VX-to-PA" and "VY-to-PA".

Over time, the first virtual address, "VX", may later be included in a write request from client 110a with modified data. The new modified data may be written to one or more of the storage devices 176a-176m. The new information for the physical block may be stored in a physical location identified by a new physical address different from the given physical address. For example, the new physical address may have a value "PB", which is different from the value "PA" of the given physical address. A new virtual-to-physical mapping may be stored in a mapping table 1820, such as "VX-to-PB". The given physical address, "PA", still has a link to one virtual address, which is the second virtual address corresponding to client 110b, or "VY-to-PA" stored in the table 1820. Subsequently, the second virtual address, "VY", may later be included in a write request from client 110b with modified data. Again, the new modified data may be written to one or more of the storage devices 176a-176m. The new information for the physical block may be stored in a physical location identified by a new physical address different from the given physical address. For example, the new physical address may have a value "PC", which is different from the value "PA" of the given physical address. A new virtual-to-physical mapping may be stored in a corresponding table 1820, such as "VY-to-PC". The given physical address, "PA", now has no links to it. A garbage collection operation may deallocate the physical block corresponding to the given physical address "PA" due to a count of zero currently valid links and/or other corresponding status information.

A problem may occur during garbage collection if inline deduplication causes no update of mapping information. For example, when a write request from client 100a to virtual address VX occurs, no matching fingerprint value 2306 may be found in the fingerprint table 1920 during an inline deduplication operation. Consequently, mapping may be stored in the mapping table 1820, such as "VX-to-PA", and a physical data block may be scheduled to be written to the physical address "PA". In addition, the mapping information "VX-to-PA" may be written with the data in the physical location identified by physical address "PA". Alternatively, the mapping information may be stored in a corresponding log in a storage device, wherein the log corresponds to multiple physical locations such as the location identified by the physical address A. In one embodiment, at this time, an entry may be registered in the deduplication table 1910 corresponding to this write request. In another embodiment, an entry may be registered in the deduplication table 1910 corresponding to this write request during a post-process deduplication operation. Regardless of when an entry is registered in the deduplication table 1910, a corresponding entry may exist in the deduplication table 1910 when a write request is received from client 110b to virtual address VY.

When the write request from client 100b to virtual address "VY" is received, a matching fingerprint value 2306 may be found in the deduplication table 1910 corresponding to physical address PA and a match of the data verified. In such a case, a mapping may be stored in the table 1820, such as "VY-to-PA". As a write of the data is not performed, the mapping information "VY-to-PA" is not written with the data in the physical location identified by physical address "PA". Subsequently, a later write request from client 100a to virtual address "VX" may occur with new modified data. No matching fingerprint value 2306 may be found in the deduplication table 1910 during an inline deduplication operation, and a corresponding mapping stored in the table 1820, such as "VX-to-PB". In this case, the mapping information "VX-to-PB" may be written with the data in the physical location identified by the physical address "PB".

When the garbage collector is executed, the application may inspect both the physical location identified by the physical address "PA" and the table 1820. The garbage collector may find the mapping information, "VX-to-PA", stored with (or otherwise in association with) the corresponding page identified by the physical address "PA". However, no valid corresponding entry in the table 1820 storing the same mapping information "VX-to-PA" is found. In addition, no other valid links to the physical address "PA" may be found, although virtual address "VY" is referencing physical address "PA". Therefore, a count of links to the physical address "PA" is erroneously determined to be zero. The garbage collector may then deallocate the physical location identified by the physical address "PA". Consequently, the link corresponding to the mapping "VY-to-PA" is broken and data corruption may have occurred.

In order to avoid the above problem without scheduling a data write request to the storage devices 176a-176m, a link table 2310 may be used. Although scheduling a write request to update the mapping information from ("VX-to-PA") to ("VX-to-PA", "VY-to-PA") stored in the physical location identified by the physical address "PA" may prevent broken links, the benefit of the inline deduplication operation would be reduced and write amplification of SSDs may be increased. Therefore, in order to address at least these issues, the link table 2310 may be utilized to hold reverse mapping information. The link table 2310 may comprise a plurality of entries 2320a-2320g. Each of the entries 2320a-2320g may include a physical index 2324 that identifies a physical location in the storage devices 176a-176m. In addition, one or more virtual indexes 2326a-2326j may be included to provide reverse mapping information. The status information 2328 may indicate whether a corresponding entry stores one or more valid reverse mappings.

In one embodiment, the link table 2310 has an entry allocated or updated when an inline deduplication operation determines a duplicate copy exists in storage for a corresponding data component 2302. A corresponding physical index 2337 found during the inline deduplication operation may be used to update the link table 2310. Referring to the above example, the link table 2310 may be updated with the reverse mapping information "PA-to-VY" during processing of the write request from client 110b to virtual address "VY". When the garbage collector is executed, it may inspect both the physical location identified by the physical address "PA", the mapping table 1820 and the link table 2310. The garbage collector may find the mapping information, "VX-to-PA", stored in the corresponding page identified by the physical address "PA". A valid corresponding entry in the table 1820 storing the same mapping information, "VX-to-PA", may not be found. However, the garbage collector may access the link table 2310 with the physical address "PA" and find a valid entry with the reverse mapping information "PA-to-VY". Therefore, a count of links to the physical address "PA" is one, or nonzero. Accordingly, the garbage collector does not deallocate the physical location identified by the physical address "PA" and the problem discussed above is avoided. In another embodiment, the data corresponding to "PA" is stored in one location and the mapping information "VX to PA" and "VY to PA" stored in another location. In yet another embodiment, the data corresponding to "PA" is stored in one location and the mappings "VX to PA" and "VY to PA" are stored in a link table, but not adjacent to one another. Instead, they may be stored in a table with a structure similar to that described in FIG. 4, with the key for both mapping entries being the physical address "PA" (or based at least in part on the "PA"). For example, in such a table, "VX to PA" may be stored in Level N−2 and "VY to PA" stored in Level N. A lookup of "PA" in the table would then return both mappings.

In addition to the above, during garbage collection the physical location identified by the physical address "PA" may be updated with the mapping information "VY-to PA" due to the valid entry in the link table 2310. Given such an update, the entry in the link table 2310 may be deallocated. If the table 1820 is ever lost, the mapping information stored in the physical locations in the storage devices 176a-176m and the reverse mapping information stored in the link table 2310 may be used to rebuild the table 1820. In one embodiment, the deduplication table 2310, or a portion of the table 2310, may be organized in a same manner as that of the mapping table 1820. Additionally, the link table 2310 may also be organized in a same manner as the mapping table 1820.

As described above, when an inline deduplication operation determines a duplicate copy of data is stored in the system, corresponding mapping information may be stored in each of the table 1820 and the link table 2310 with no write of the data to storage. These steps coordinate with garbage collection that frees physical locations in the persistent storage. The coordination may be relatively coarse since freeing physical locations may be performed later and batched separately from garbage collection migrating physical blocks within a corresponding one of the storage devices 176a-176m. Since migration may occur prior to deallocation of physical locations during garbage collection, when a physical block is moved a new physical location for data may have stored mapping information updated with its own physical address and updates stored in the mapping table 1820. Both corresponding log areas and page header information may be updated. Afterward, the table 1820 may be updated with the new physical addresses. Following this, the deduplication table 1910 and then the link table 2310 may be updated with the new physical addresses. This update removes links to the old physical addresses.

If the deduplication table 1910 or the link table 2310 contains old references, then the corresponding physical locations may be cleaned once more before it is freed. The deduplication table 1910 may not be as compressible as the table 1820, since the fingerprint value and physical pointer pairs may be random or more random than the entries in the table 1820. Further, the deduplication table 1910 may be less cacheable, since the fingerprint values may be random and table 1910 is indexed by fingerprint values. Regarding the table 1820, entries corresponding to idle data, such as in idle volumes, may be kept out of caches. Such factors result in more read operations for a deduplication operation. Therefore, the multiple fingerprint tables 1920-1940 are used and allow one or more smaller tables to be cached. In one embodiment, the tables corresponding to data components with a higher probability being deduplicated may be accessed during inline deduplication. The other tables may be accessed during post-process deduplication, such as during garbage collection.

Figure 24:
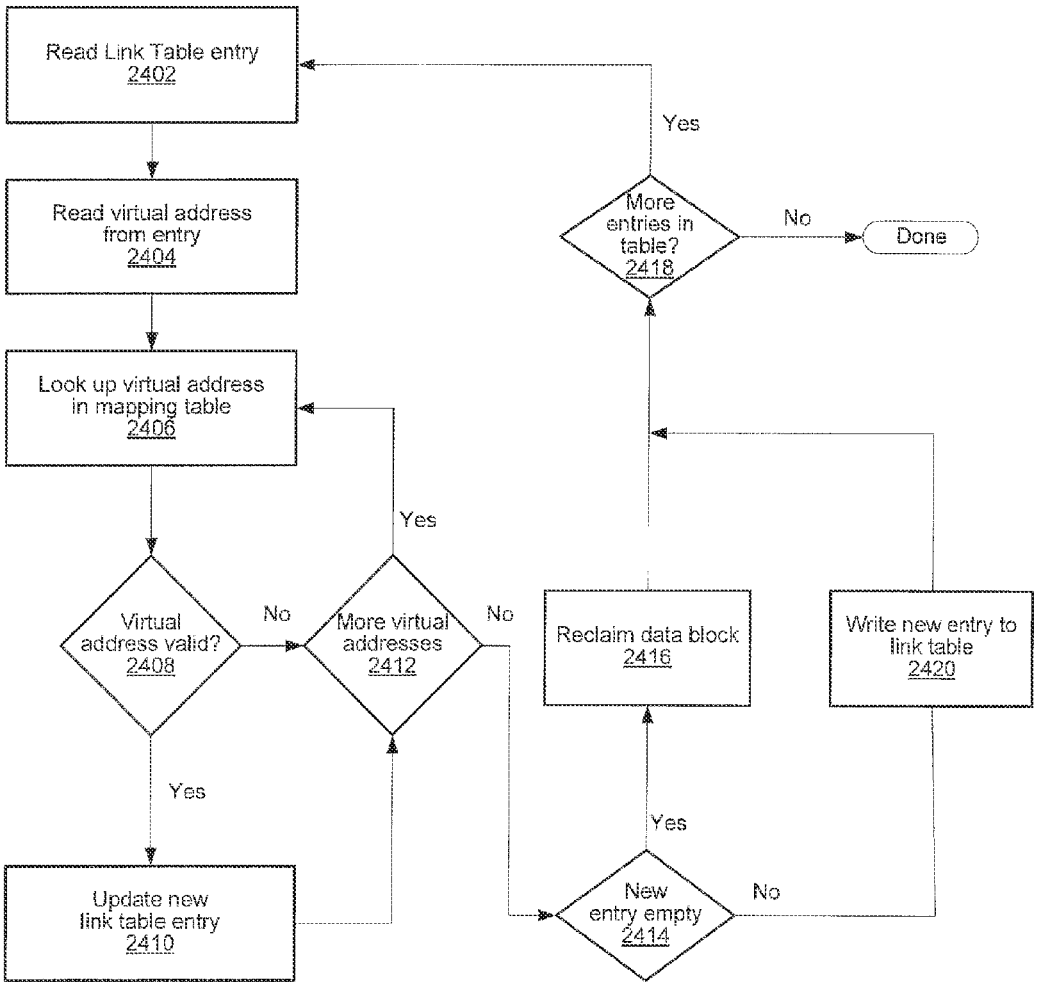
FIG. 24 illustrates embodiment of a portion of a garbage collection process.

FIG. 24 illustrates one embodiment of a portion of a garbage collection process that may, for example, be used in a storage system that supports deduplication. In the example shown, an entry in the link table is read (block 2402) and a virtual address read from the entry (block 2404). Using at least a portion of the virtual address, an access of the mapping table is performed (block 2406) and a determination made as to whether there exists a valid address mapping for the virtual address (decision block 2408). If there is a valid mapping, then a new link table entry is updated to include the mapping (block [2406] *2410*), and a determination made as to whether there are further virtual addresses to check in the current link table entry (decision block [2408] *2412*). If so, then the process continues with block [2410] *2406*. If there is no valid mapping for the virtual address (decision block 2408), the process continues with block 2412. Once there are no further virtual addresses to check for the current link table entry (decision block 2412), then a determination is made as to whether the new entry is empty (i.e., no valid mappings have been found that correspond to the current link table entry (decision block 2414). If the new entry is empty, then the currently allocated block corresponding to the current link table entry may be reclaimed (block 2416). Otherwise, the new entry is written to the link table (block 2420). If there are more link table entries to examine (decision block 2418), then the process may proceed with block 2402. In addition to reclaiming storage, this process may serve to consolidate link table mapping entries into fewer entries.

Figure 25:
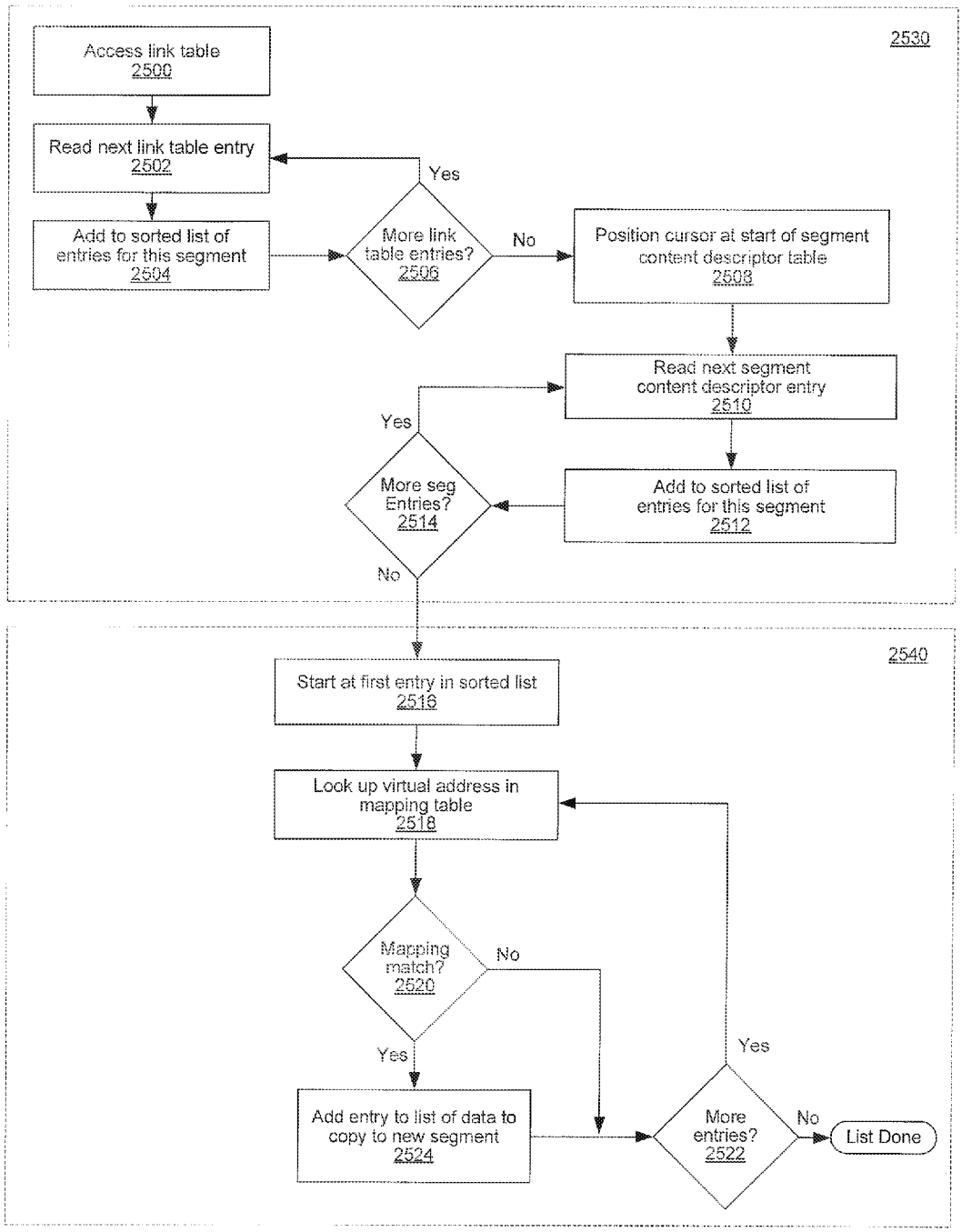
FIG. 25 illustrates embodiment of a portion of a garbage collection process.
Figure 26:
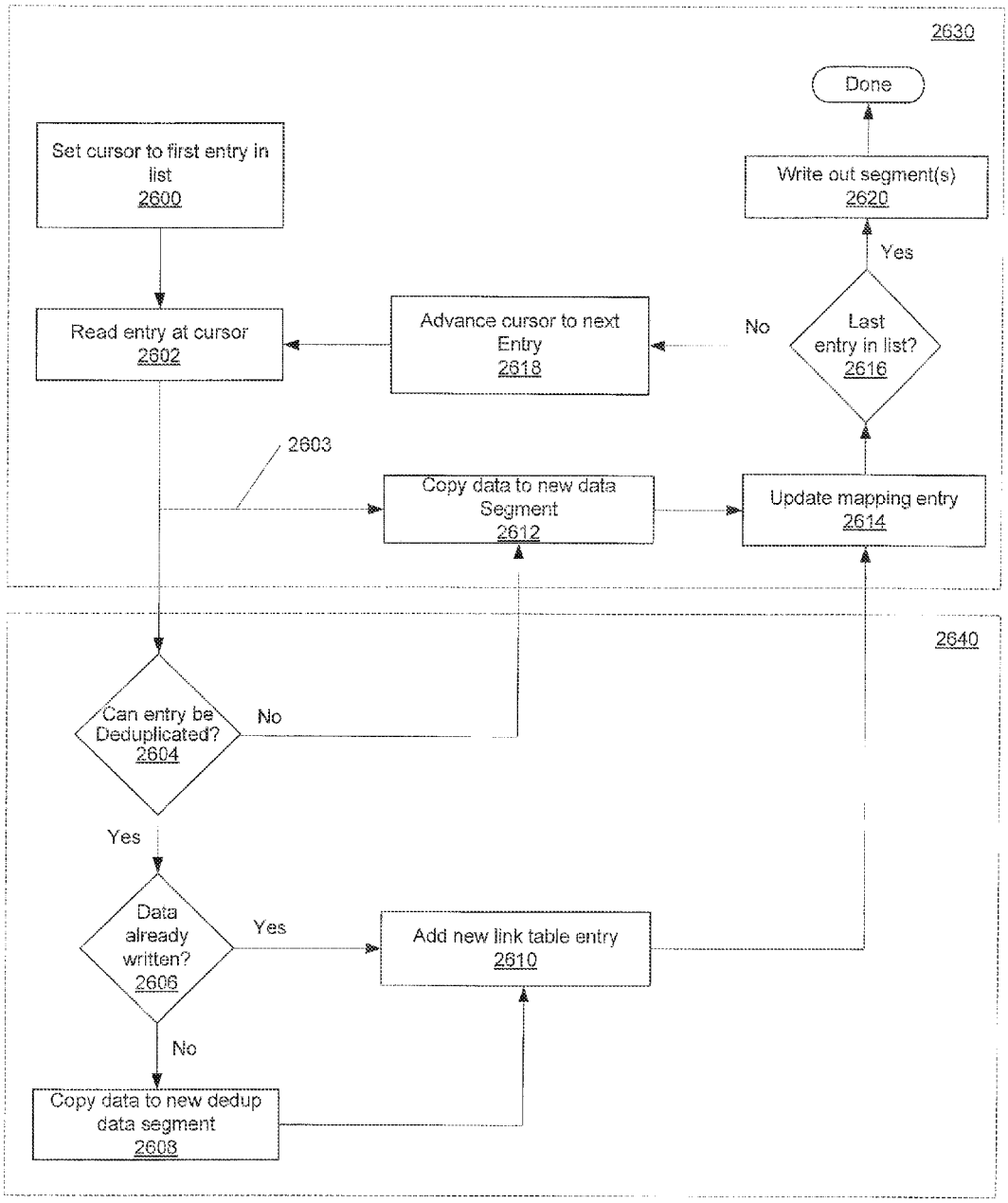
FIG. 26 illustrates embodiment of a portion of a garbage collection process.

Turning now to FIG. 25 and FIG. 26, further embodiments and details regarding a garbage collection mechanism are described. Generally speaking, the following describes a garbage collection method whereby log entries and content blocks are examined. Blocks which are identified as still being in use are written to a new segment, while the remaining blocks are reclaimed. For each block in the segment, we see if there are any valid logical or virtual addresses that reference it. This is done by reading the link table and looking up each virtual address to see if it's still a valid reference. If so, the reference is added to a list of valid references for this block. We also check the "direct" mapping entry that we get from the log entries in the segment itself. Again, if this virtual address mapping is still valid, we add it to the list of valid pointers for this block.

In addition to the above, the garbage collector can (optionally) attempt to find more duplicates for this block elsewhere in the system by referencing deduplication tables. If any are found, the logical addresses for them are added to the list of valid references. FIG. 25 depicts one embodiment of a method for identifying blocks which are still in use. In the example shown, a list of currently valid blocks is generated by examining link table entries and mapping table entries. The upper block 2530 shown in FIG. 25 corresponds to examination of the link table and segment content descriptor table, while the lower block 2540 corresponds to examination of the mapping table.

In various embodiments, the segment content descriptor table for a given segment includes mappings which refer to blocks within the given segment. In various embodiments, the segment content descriptor table is accurate at the time the segment is written. However, after the segment is written, writes to virtual addresses corresponding to blocks that are stored in the segment may be received and the new write data stored in a segment other than the given segment. These new writes in turn cause new entries to be added to the mapping table (e.g., table 340 or table 1820) for those virtual addresses. These newer entries in the mapping table will supercede the previous entries. While the mapping table is updated to reflect these new writes, the segment content descriptor table for the original segment is not updated. Rather, the segment content descriptor table for the new segment which stores the new write data reflects the new mapping. Consequently, there will now exist multiple segment content descriptor tables which include a mapping for a given virtual address. However, as will be discussed in greater detail below, during garbage collection an access to the mapping table may be used to identify that the mapping in the original segment content descriptor table is out of date.

In this example, garbage collection is performed by going through segments in the log data which contains mapping entries and content blocks (which may be compressed) themselves. The mapping entries in the log may include mapping table entries, deduplication table entries, and link table entries. In the embodiment of FIG. 25, the method includes building a sorted list of link table entries for a segment. As shown, the method begins with an access to the link table (block 2500), link table entries are read from the link table (block 2502), and added to a sorted list of entries for the given segment (block 2504). If more link table entries remain (conditional block 2506), the process continues at block 2502 by adding more entries to the sorted list. In various embodiments, the link table is ordered by segment number and then logical address, and content blocks within a segment are ordered by logical address. Consequently, the content blocks in the segment may be traversed in the same order as they occur in the link table. In alternative embodiments, the system may scan several segments and order the list of entries by logical address.

When it is determined that there are no further link table entries to be processed for the current segment (conditional block 2506), examination of the content descriptor table is initiated (block 2508). In various embodiments, processing may include utilization of a control structure such as a database type cursor for traversing records in the table. In such an embodiment, the cursor may be positioned at the start of the segment content descriptor table (block 2508). Those skilled in the art will appreciate other methods for traversing such content are possible, utilizing different types of control structures. Such alternative methods for traversal are contemplated herein.

Subsequent to positioning the cursor at the beginning of the content descriptor table, the next segment content descriptor entry is read (block 2510), which is then added to the sorted list of entries for the segment (block 2512). If there are more segment content descriptor entries (conditional block 2514), then the next entry is read (block 2510). If there are no further segment content descriptor entries (conditional block 2514), the sorted list to be used in further processing may be deemed complete, and processing continues in lower block 2540.

While the steps in block 2530 are shown as operating on a single segment, alternative embodiments may scan multiple segments using similar steps, and combine the results into a single sorted list to be processed in lower block 2540.

Lower block 2540 begins by examining the sorted list created by upper block [2540] *2430*. In the embodiment shown, the first entry in the sorted list is accessed (block 2516). A virtual address included in the list entry is then used as part of a query to the mapping table (e.g., mapping table 1820 of FIG. 18). If a valid mapping is identified for the virtual address in the mapping table (conditional block 2520) and the mapping corresponds to the data in the current segment, then the corresponding block is determined to be in use and the entry is added to a list of entries which identify blocks to be copied to a new segment (block 2524) and processing continues at block 2522. If there is no match found in the mapping table (conditional block 2520), then the entry is not added to the list of blocks to be copied, and processing continues at block 2522. If there are more entries to be processed in the list (conditional block 2522), then the next virtual address is used in a query to the mapping table (block 2520). Once there are no further entries to process (conditional block 2522), the list of current blocks which will be copied to a new segment is complete.

Having identified those blocks which remain in use, the reclamation process may proceed as depicted in FIG. 26. In the embodiment of FIG. 26, an upper block 2630 and lower block 2640 are shown. Generally speaking, the upper block 2630 depicts the process of writing current blocks to a new segment. In various embodiments, the upper block 2630 may be performed without the lower block 2640. Lower block 2640 illustrates an embodiment in which deduplication may be performed as part of the garbage collection process. As will be discussed below, in such an embodiment current blocks are first deduplicated before being written to a new segment.

In block 2600 of FIG. 26, a cursor is set to a first entry in the list created as described above in FIG. 25 and the first entry read (block 2602). As discussed above, the list includes an identification of blocks which are in use and are to be written to a new segment. Further, as noted above, various embodiments may utilize other control structures than a database type cursor. In an embodiment in which multiple segments were scanned in block 2530, the system may maintain multiple cursors (e.g., one cursor per segment). In an embodiment in which deduplication is not performed as part of the garbage collection process, processing may proceed (as shown by the dashed line) from block 2602 to block 2612 where the identified block is copied to the new data segment (block 2612) and a new mapping table entry created (block 2614). However, in embodiments in which deduplication is performed, processing proceeds from block 2602 to block 2604.

In conditional block 2604, the currently identified block is deduplicated. Deduplication may be performed as described above. If no duplicates are identified, then processing may proceed with block 2612 where the data is copied to the new data segment. However, if it determined that the current block can be deduplicated, then a further determination may be made (conditional block 2606) as to whether the corresponding data has already been written (i.e., this is not the first instance of the data seen during this process 2640. If the data has not yet been written, then the data is written to a new data segment. In various embodiment, data which is deduplicated as part of the garbage collection process may be written to a different segment than data which is not deduplicated. However, it is noted that such segregation is not required. Subsequent to writing the data to a new segment (block 2608), a new link table entry is created to map the data's new location to a virtual address (block 2610), and the mapping table updated to include a corresponding virtual to physical address mapping entry (block 2614). If in conditional block 2606 it is determined that deduplicated data has already been written to a new data segment, then processing bypasses block 2608 and proceeds with the new link table entry creation (block 2610). New entries written to the link table and mapping table may supercede existing entries in those tables.

Subsequent to updating the mapping table (block 2614), a determination is made as to whether this is the last entry in the list of blocks to be copied to a new segment (block 2616), if so then segments built as part of the process(es) 2630 and 2640 are written to storage (block 2620). In an alternative embodiment, an output segment is queued to be written as soon as it is full, rather than waiting until all of the entries in the list are processed. If there are further entries to process, then the cursor is advanced to the next entry (block 2618), and the next entry read (block 2602). Blocks identified in FIG. 25 and FIG. 26 as not being in use may be reclaimed. The method of FIG. 25 and FIG. 26 may be repeated for all of the blocks in the segment(s) being garbage collected. Alternatively, garbage collection may combine multiple segments in block 2530 and process the combined result in blocks 2540, 2630, and 2640.

In various embodiments, old segments (the ones that were garbage collected) are resubmitted to a queue for garbage collection. They aren't necessarily marked as being invalid at this time. Rather, a segment may be marked as invalid when the review of the segment reveals no valid information. Under normal circumstances, this may happen when an already-cleaned segment is submitted to a cleaner.

It is noted that if garbage collection does not run to completion (e.g., crashes in the midst of a garbage collection process), garbage collection may be run again on a partially-collected segment. Blocks from an old segment that were written out to a new segment will not be garbage collected again, since they are no longer valid in the old segment. Blocks that were not written out, but should have been, will be garbage collected as normal. Accordingly, a separate process is not needed to determine if there has been an error in garbage collection, and a "roll back" of garbage collection will not be needed. Instead, the same process for garbage collection may be run on segments that may have few valid blocks, and a segment marked as invalid when an entire census finds no currently valid information in the segment.

It is also noted that in various embodiments multiple segments may be garbage collected concurrently. Such an approach may permit blocks from multiple segments to be sorted into fewer new segments, and possibly create multiple "new" segments in order to group related blocks together in different segments. "Related" blocks could be, for example, related in that they compress well when compressed together or they are likely to be accessed together. As noted above, deduplicated blocks may be placed in a separate segment because such blocks will typically live longer than blocks that aren't referenced multiple times.

Still further, garbage collection may be used for other processes at the same time as eliminating unreferenced data blocks. For example, it may be used to change segment geometry by creating larger or smaller segments, segments spread across a different number of drives, or otherwise. This may be accomplished by having the destination segment be a different "shape" from the source segment(s). Garbage collection may also be used to rebuild segments that have been damaged by media failure. For example, when an attempt to read a damaged block fails, the block may be rebuilt using redundancy in the original segment.

In various embodiments, garbage collection may be optimized in a variety of ways. First, selection of a segment to submit for garbage collection may be optimized. In one embodiment, it is not necessary to scan an entire segment to determine if it is a good candidate. Rather, the process may use the log entries at the front of the segment and see what fraction are still valid. An estimate of how many deduplicated blocks are in the segment can be made by traversing a small range of the link table. In both cases, this may provide an estimate of how many blocks may be recovered if garbage collection is run. It is possible to remember the result of multiple runs of this kind of scan and project how full a segment is likely to be at some future time.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A [computing] *storage* system comprising:

[a data storage medium] *one or more storage devices*;

[a data storage controller] *the storage system* configured to:

determine that a current segment within the [data storage medium] *one or more storage devices* is in use by identifying a valid mapping of a location in the current segment to one or more virtual addresses, *including:*

*creating a sorted list of potentially valid entries from a first table comprising entries mapping an address of a location in the one or more storage devices to one or more virtual addresses; and*

*creating a list of valid entries using the sorted list of potentially valid entries and a second table comprising entries mapping a virtual address to a location in the one or more storage devices*;

copy data from the location in the current segment to a new storage location in the [data storage medium] *one or more storage devices*; and reclaim the location in the current segment.

2. The *storage* system as recited in claim 1, wherein [the data storage controller is further configured to] *identifying the valid mapping of a location in the current segment to one or more virtual addresses further comprises*:

identify*ing* one or more entries in [a] *the* first table [comprising a plurality of entries, wherein each of the one or more entries of the first table comprises a reverse mapping of an address of a location in the data storage medium to one or more virtual addresses; determine that the first table includes a valid mapping for a virtual address]; and

[determine] *determining* the mapping is valid responsive to determining the first table includes at least one valid mapping for a virtual address.

3. The *storage* system as recited in claim 1, wherein the [data storage controller] *storage system* is further configured to maintain [a] *the* second table [comprising a plurality of entries, wherein each of the plurality of entries of the second table maps a virtual address to a location in the data storage medium] *using multi-level shared tables*.

4. The *storage* system as recited in claim 1, wherein prior to copying the data from the location to the new location, [the method further comprises deduplicating] the data *is deduplicated*.

5. The *storage* system as recited in claim 4, wherein the [data storage controller] *storage system* is configured to *copy* the data from the location to the new location in further response to determining the data has not yet been copied to the new location.

6. The *storage* system as recited in claim 1, wherein the first table is organized as a plurality of time ordered levels, each level comprising a plurality of entries.

7. A method for use in a [computing] *storage* system *that includes one or more storage devices*, the method comprising:

determining that a current segment within [a data storage medium] *the one or more storage devices* is in use by identifying a valid mapping of a location in the current segment to one or more virtual addresses, *including:*

*creating a sorted list of potentially valid entries from a first table comprising entries mapping an address of a location in the one or more storage devices to one or more virtual addresses; and*

*creating a list of valid entries using the sorted list of potentially valid entries and a second table comprising entries mapping a virtual address to a location in the one or more storage devices*;

copying data from the location in the current segment to a new storage location in the [data storage medium] *one or more storage devices*; and reclaiming the location in the current segment.

8. The method as recited in claim 7, [further comprising] *wherein identifying the valid mapping of a location in the current segment to one or more virtual addresses further comprises*:

identifying one or more entries in [a] *the* first table [comprising a plurality of entries, wherein each of the one or more entries of the first table comprises a reverse mapping of an address of a location in the data storage medium to one or more virtual addresses;

determining that the first table includes a valid mapping for a virtual address]; and determining the mapping is valid responsive to determining the first table includes at least one valid mapping for a virtual address.

9. The method as recited in claim 8, further comprising maintaining [a] *the* second table [comprising a plurality of entries, wherein each of the plurality of entries of the second table maps a virtual address to a location in the data storage medium] *using multi-level shared tables*.

10. The method as recited in claim 8, wherein the first table is organized as a plurality of time ordered levels, each level comprising a plurality of entries.

11. The method as recited in claim 7, wherein prior to copying the data from the location to the new location, the method further comprises deduplicating the data.

12. The method as recited in claim 11, further comprising copying the data from the location to the new location in further response to determining the data has not yet been copied to the new location.

13. A non-transitory computer readable storage medium [comprising] *with* program instructions *stored thereon*, wherein said program instructions are executable to:

determine that a current segment within [a data storage medium] *one or more storage devices* is in use by identifying a valid mapping of a location in the current segment to one or more virtual addresses, *including:*

*creating a sorted list of potentially valid entries from a first table comprising entries mapping an address of a location in the one or more storage devices to one or more virtual addresses; and*

*creating a list of valid entries using the sorted list of potentially valid entries and a second table comprising entries mapping a virtual address to a location in the one or more storage devices*;

copy data from the location in the current segment to a new storage location in the [data storage medium] *one or more storage devices*; and reclaim the location in the current segment.

14. The non-transitory computer readable storage medium as recited in claim 13, wherein [said program instructions are further executable to] *identifying the valid mapping of a location in the current segment to one or more virtual addresses further comprises*:

identify*ing* one or more entries in [a] *the* first table [comprising a plurality of entries, wherein each of the one or more entries of the first table comprises a reverse mapping of an address of a location in the data storage medium to one or more virtual addresses; determine that the first table includes a valid mapping for a virtual address]; and

[determine] *determining* the mapping is valid responsive to determining the first table includes at least one valid mapping for a virtual address.

15. The non-transitory computer readable storage medium as recited in claim 14, wherein said program instructions are further executable to maintain [a] *the* second table [comprising a plurality of entries, wherein each of the plurality of entries of the second table maps a virtual address to a location in the data storage medium] *using multi-level shared tables*.

16. The non-transitory computer readable storage medium as recited in claim [14] *13*, wherein said program instructions are further executable to organize the first table as a plurality of time ordered levels, each level comprising a plurality of entries.

17. The non-transitory computer readable storage medium as recited in claim 13, wherein prior to copying the data from the location to the new location, the program instructions are further executable to deduplicate the data.

* * * * *